US008660886B1

(12) United States Patent
McLean et al.

(10) Patent No.: US 8,660,886 B1
(45) Date of Patent: Feb. 25, 2014

(54) CONTINUOUSLY UPDATED DATA PROCESSING SYSTEM AND METHOD FOR MEASURING AND REPORTING ON VALUE CREATION PERFORMANCE THAT SUPPORTS REAL-TIME BENCHMARKING

(75) Inventors: Robert I.G. McLean, Colborne (CA); Rodney J. Anderson, Cobourg (CA)

(73) Assignee: Chartered Professional Accountants of Canada, Toronto (CA)

( * ) Notice: Subject to any disclaimer, the term of this patent is extended or adjusted under 35 U.S.C. 154(b) by 941 days.

(21) Appl. No.: 12/133,313

(22) Filed: Jun. 4, 2008

Related U.S. Application Data

(60) Division of application No. 10/173,904, filed on Jun. 17, 2002, now Pat. No. 7,386,466, which is a continuation-in-part of application No. 09/809,544, filed on Mar. 14, 2001, now abandoned, which is a continuation-in-part of application No. 09/809,502, filed on Mar. 14, 2001, now abandoned, and a continuation-in-part of application No. 09/809,758, filed on Mar. 14, 2001, now abandoned, which is a continuation-in-part of application No. 09/586,722, filed on Jun. 5, 2000, now abandoned, and a continuation-in-part of application No. 09/587,646, filed on Jun. 5, 2000, now abandoned, which is a continuation-in-part of application No. 09/574,569, filed on May 17, 2000, now Pat. No. 7,389,260.

(51) Int. Cl.
*G06Q 10/00* (2012.01)
(52) U.S. Cl.
USPC .......................................................... 705/7.39

(58) Field of Classification Search
USPC .......................................................... 705/7.39
See application file for complete search history.

(56) References Cited

U.S. PATENT DOCUMENTS

| | | |
|---|---|---|
| 5,018,096 A | 5/1991 | Aoyama |
| 5,189,608 A | 2/1993 | Lyons et al. |
| 5,220,500 A | 6/1993 | Baird et al. |
| 5,414,844 A | 5/1995 | Wang |
| 5,446,903 A | 8/1995 | Abraham et al. |
| 5,574,826 A | 11/1996 | Russo et al. |
| 5,644,727 A | 7/1997 | Atkins |
| 5,812,988 A | 9/1998 | Sandretto |
| 5,838,903 A | 11/1998 | Blakely et al. |
| 5,884,285 A | 3/1999 | Atkins |
| 5,893,072 A | 4/1999 | Zizzamia |
| 5,999,908 A | 12/1999 | Abelow |
| 6,016,480 A | 1/2000 | Houvener et al. |
| 6,304,973 B1 | 10/2001 | Williams |
| 6,321,205 B1 | 11/2001 | Eder |
| 6,321,225 B1 | 11/2001 | Heckerman et al. |
| 6,356,920 B1 | 3/2002 | Vandersluis |
| 6,363,333 B1 | 3/2002 | Deco et al. |

(Continued)

OTHER PUBLICATIONS

Basic Financial Management by John D. Martin et al, Prentice-Hall, Inc., 1991 (PTO Library No. HG 42026B318 1991).

(Continued)

*Primary Examiner* — Romain Jeanty
(74) *Attorney, Agent, or Firm* — DLA Piper LLP (US)

(57) ABSTRACT

The invention affords a data processing system and method for assessing the performance of a business enterprise in creating and realizing value. More particularly, the invention affords a data processing system and method that supports the provision of real-time benchmarking through a network of benchmarking service providers.

10 Claims, 39 Drawing Sheets

(56) References Cited

U.S. PATENT DOCUMENTS

| | | |
|---|---|---|
| 6,411,936 B1 | 6/2002 | Sanders |
| 6,442,533 B1 | 8/2002 | Hinkle |
| 6,456,982 B1 | 9/2002 | Pilipovic |
| 6,792,399 B1 | 9/2004 | Phillips et al. |
| 6,944,777 B1 | 9/2005 | Belani et al. |
| 7,010,681 B1 | 3/2006 | Fletcher et al. |
| 7,069,437 B2 | 6/2006 | Williams |
| 7,305,431 B2 * | 12/2007 | Karnik et al. ............ 709/203 |
| 8,015,056 B1 * | 9/2011 | Fenstermaker et al. ..... 705/7.39 |
| 2005/0119922 A1 | 6/2005 | Eder |
| 2005/0154769 A1 * | 7/2005 | Eckart et al. ............ 707/201 |

OTHER PUBLICATIONS

Robert Muksian "Financial Mathematics Handbook", Prentice-Hall, Inc., 1984.

Bogan et al. "Benchmarking for Best Practices", 1994, Library Congress Cataloging-in-Publication Data, pp. 1-14.

Hitchcoch et al "Performance Metric and Life-cycle Information Management for Building Performance Assurance", Jun. 1998, Building Technologies Department, pp. 1-15.

Gordon et al, 2nd edition (1994) and 3rd edition (2000) "Valuation of Intellectual Property and Intangible Assets", selected pages only.

Financial Management—by Jae K. Shim and Joel G. Siegel, second Edition publisher, Barron's, 2000, total of 11 pages. ISBN 0-7641-1402-6.

Gushee, fifth edition (1971) "Financial Compound Interest and Annuity Tables"Financial Publishing Company, Publication No. 376 (provided by Applicant, Exhibit A).

Chriss (1997) "Black-Scholes and Beyond Otion Pricing Models", McGraw-Hill (provided by Application, Exhibit B).

Steven N. Kaplan and Richard S. Ruback "The valuation of cash flow forecasts: An Empirical Analysis", The Journal of Finance, vol. 50, No. 4 (Sep. 1995, pp. 1059-1093).

* cited by examiner

CAPABILITIES EXAMPLE

CAPABILITIES: STRATEGIES

KEY CAPABILITIES IDENTIFIED
1. RATIONAL DRUG DESIGN
2. INTELLECTUAL CAPITAL MANAGEMENT
3. STAKEHOLDER RELATIONSHIP MANAGEMENT

INTELLECTUAL MANAGEMENTS
1. INTELLECTUAL PROPERTY MANAGEMENT STRATEGIES
2. KNOWLEDGE MANAGEMENT STRATEGIES
3. INTELLECTUAL CAPITAL CREATION STRATEGIES
4. INTELLECTUAL CAPITAL VALUE MANAGEMENT STRATEGIES
5. STRATEGIC INTELLECTUAL CAPITAL MANAGEMENT STRATEGIES

INTELLECTUAL PROPERTY MANAGEMENT STRATEGIES

1. PROTECTING INTELLECTUAL PROPERTY: THE COMPANY WILL AS A MATTER OF COURSE SEEK TO PROTECT ALL FORMS OF INTELLECTUAL PROPERTY. THE COMPANY IS SENSITIVE TO THE ISSUES SURROUNDING PATENTING OF GENETIC MATERIAL AND WILL ACTIVELY PARTICIPATE IN INTERNATIONAL DISCUSSIONS AIMED AT DEVELOPING CLEARER STANDARDS TO DEFINE WHAT IS PATENTABLE AND WHAT SHOULD REMAIN IN THE PUBLIC DOMAIN

2. IP DATABASE AND AUTOMATION: THE COMPANY WILL MAINTAIN A COMPREHENSIVE DATABASE COMPRISING ALL FORMS OF IP, AND WILL DEVELOP TOOLS AND EXPERT SYSTEMS TO AUTOMATE THE PROCESS OF IP CREATION, DOCUMENTATION, FILING, ADMINISTRATION, INWARD AND OUTWARD LICENSING AND CROSS-LICENSING. THE COMPANY'S IP DATABASE WILL BE ACCESSIBLE ON A CONTROLLED BASIS TO PARTICIPANTS IN THE COMPANY'S GLOBAL HUMAN GENOMICS EXTRANET.

| TVC Event Matrix | | At time t | | | |
|---|---|---|---|---|---|
| Events | Event Stream 1 | Probability | Event Stream 2 | Probability | Event Stream 3 | Probability | etc. |
| Affected Assumptions | Assumption a | | Assumption a | | Assumption a | |
| | Assumption d | | Assumption b | | | |
| | Assumption e | | Assumption f | | | |

| Event Stream 1 | | | | | |
|---|---|---|---|---|---|
| Events | Anticipated date of occurrence | Evidence of occurrence | Evidence of increasing likelihood | Evidence of decreasing likelihood | Designated observers |
| Event 1-1 | Date 1-1 | Evidnc 1-1 Occ | Evidnc 1-1 Inc | Evidnc 1-1 Dec | Employee A |
| Event 1-2 | Date 1-2 | Evidnc 1-2 Occ | Evidnc 1-2 Inc | Evidnc 1-2 Dec | Employee B |
| Event 1-3 | Date 1-3 | Evidnc 1-3 Occ | Evidnc 1-3 Inc | Evidnc 1-3 Dec | Employee C | fig. 13

Past → Future

Calculation of Outcome Variance

| | |
|---|---|
| PV of Bio-tech drug projects | 468.999 |
| PV of Bio-informatics tools | 134.424 |
| Free cash PV | 2.649 |
| Current PV of GreenGene | 600.774 |
| Last year's PV | 471.418 |
| Delta PV | 129.356 |
| CoCr on last yr PV | 75.427 |
| Outcome Variance | 53.929 |

Analysis of Outcome Variance

| cause | effect $ mins |
|---|---|
| revised projection tool #4 sales from 0.07% to 0.015% | 25.009 |
| world bio-tech sales growth thru 2005 from 11.5% to 12.5% | 14.931 |
| revised projection drug #26 sales from 0.45% to 0.70% | 10.196 |
| last yr world sales grew 12.9% not 11.5% | 7.000 |
| increased R&D spending last year | -1.607 |
| increased future R&D spending | -1.461 |
| effect of WIIO donation | -0.306 |
| last yr's investment income better | 0.167 |
| | 53.929 | fig. 17

Stakeholders Stored Assumptions

At time t

| TVC Event/VSM Matrix | | | | | | |
|---|---|---|---|---|---|---|
| Event View | | Stakeholder Reference | | Stakeholder Reference | | Stakeholder Reference |
| Events | Event 1 | Management | Event 2 | Management | Event 3 | User A |
| Related Assumptions | Assumption a | Management | Assumption b | Management | Assumption c | User A |
| | Assumption a | User B | Assumption c | Management | Assumption c | User B |
| | Assumption a | User C | Assumption d | Management | | etc. | fig. 19

FIG. 24A

| EVENTS | SAMPLE EVENT ATTRIBUTES | | | | |
|---|---|---|---|---|---|
| | DATE ENTERED: | ENTERED BY: | DATE UPDATED: | UPDATED BY: | ASSUMPTION/KNOWN |
| FUTURE EVENT 99-0 | 01-JAN-99 | JOHN P. | | | ASSUMPTION |
| FUTURE EVENT 99-0001 | | | | | ASSUMPTION |
| PAST EVENT 99-4127 | 02-JUL-99 | ALICE C. | | | KNOWN |
| PAST EVENT 99-4690 | 20-JUL-99 | JOHN P. | | | KNOWN |
| PAST EVENT 99-5201 | 25-JUL-99 | JOHN P. | 25-JUL-99 | JOHN P., 99-5201 | KNOWN |
| PAST EVENT 99-6374 | 20-AUG | ALICE C. | | | KNOWN |

FIG. 24B

| EVENT TYPE | OBJECT RELATIONSHIP 1: | OBJECT RELATIONSHIP 2: | OBJECT RELATIONSHIP 3 |
|---|---|---|---|
| REVENUE | PRODUCT A, 900,000 UNITS | | |
| REVENUE | PRODUCT A, 895,000 UNITS | | |
| ORDER | CUSTOMER A | | |
| MANUFACTURE | PRODUCT A, 100 UNITS | | |
| SALE | CUSTOMER A | PRODUCT A, 100 UNITS | |
| PAYMENT | CUSTOMER A | CASH, $5000 | |

| | /—908 |
|---|---|
| Customer Object<br>Sample Attributes | |
| Customer information<br>Name:<br>Address:<br>Contact:<br>Other customer details<br><br>Event references:<br>Event Relationships:<br>Event Relationships:<br>Event Relationships: | Customer 1<br>123 Main Street<br>Steven Jones, President<br>Customer since 1989<br><br><br>99-4127 (Order)<br>99-5201 (Sale)<br>99-6371 (Payment) | fig. 25A

| | 909 |
|---|---|
| Product Object Sample Attributes | |
| Product information: | |
| Name | Product A |
| Components | Parts 24, 48, 67 |
| Price: | $50 |
| Cost:: | $28.50 |
| Other product details | Engineering drawing 472 |
| Event references: | |
| Event Relationships: | 99-4127 (Order) |
| Event Relationships: | 99-4690 (Manufacture) |
| Event Relationships: | 99-5201 (Sale) | fig. 25B

| | 910 |
|---|---|
| Financial Object Sample Attributes | |
| Cash information | |
| Bank name: | Centretown Bank |
| Address: | 250 Main Street |
| Contact: | Peter Smith, Branch Manager |
| Account Number: | 1298-33-4705 |
| | |
| Event references: | |
| Event Relationships: | 99-6374 (Payment) | fig. 25C

Assurance Report Rubric: Illustrative Example
Assurance Report Decision Rubric (for the example).

Assurance report comparisons          1202

| | If "Yes" | If "No" |
|---|---|---|
| Was an assurance report requested? | In accordance with your request, we concluded an examination of the outcome display you requested. This examination consisted of various automated assurance procedures combined with the results of manual assurance procedures performed. | In accordance with your request, no assurance is provided to the outcome display. |
| Was the outcome report a value creation report? | You required a value creation outcome display. By definition, a value creation outcome display is based on judgments made about future events and related assumptions. Actual events and related assumptions may differ significantly from those used to generate the outcome display. No assurance can be given that future events and related assumptions will. | You required a value realization outcome display, which is heard mainly on events and transactions which have occurred in the past. |
| Does the level of detail requested fall within materiality limits? | Our procedures are designed to detect material error. For the purpose of this assurance report, a material error is defined as an error greater than $1,000,000. | Our procedures are designed to detect material error. For the purpose of the assurance report, a material error is defined as an error greater than $1,000,000. You have chosen a level of detail in which most values fall below this threshold. We are therefore not able to offer assurance on the outcome. |
| Is the outcome display mathematically correct? | We checked the mathematical accuracy of the outcome display and found it to be correct. | We checked the mathematical accuracy of the outcome display and found it to be incorrect and terminated our assurance procedure. We can therefore provide no assurance of the outcome. |
| Was the correct calculation engine used? | We checked that the calculations used to generate the outcome display were the appropriate ones for responding to your request. | We checked the that the calculations used to generate the outcome display were appropriate for responding your requests and found an error. We are therefore not able to offer assurance on the outcome display. |

| | If "Yes" | If "No" |
|---|---|---|
| Has the calculation engine been verified? | We verified that the calculations used to generate the outcome display has been previously validated in detail and that no alterations were made since the validation was performed | We discovered that the calculations used to generate the outcome display have been altered since the were last validated in detail. We are there not able to offer assurance on this outcome. |
| Was the correct event/assumption filter used? | We checked that the filter to select the events and assumptions that generated the outcome display was the appropriate one for responding to your request. | We checked that the filter to select the events and assumptions that generated the outcome display were appropriate for responding to your request, and discovered an error. We are therefore, not able to offer assurance. |
| Has the event/assumption filter been verified? | We verified that the filter that selected the events and assumptions used to generate the outcome display has been previously validated in detail and that no alterations were made since this validation was performed. | We discovered that the filter used to select the events and assumptions that generated the outcome display has been altered since they were last validated in detail. We are therefore not able to offer assurance on the outcome. |
| Are all events linked to assumptions and vice versa? | We verified that all events are linked to assumptions and that all assumptions are linked to events. | We discovered an error in the event/assumptions matrix in that there were unmatched events/assumptions. We are therefore not able to offer assurance to the outcome display. |
| Do all events fall within the specified time period? | We verified that the events fall within the same period you specified for the outcome display. | We discovered that some events used to generate the outcome display fall outside the time period you specified for the outcome display. We are therefore not able to offer assurance to this outcome display. |
| Are there any inconsistent assumptions? | We checked the consistency of the assumption and discovered no inconsistencies. | We checked the consistency of the assumptions and discovered one or more inconsistencies. We are therefore not able to offer assurance to the outcome display. |
| Are all assumptions within defined limits? | We verified all assumptions fall within previously defined limits. | We discovered that some assumptions fall outside previously defined limits. We are therefore not able to offer assurance to the outcome display. |

| | If "Yes" | If "No" |
|---|---|---|
| Are outcomes calculated within defined limits? | We verified all assumptions fall within previously defined limits. | We discovered that some assumptions fall outside previously defined limits. We are therefore not able to offer assurance to the outcome display. |
| Does all other data fall within defined limits? | We verified all assumptions fall within previously defined limits. | We discovered that some outcomes fall outside previously defined limits. We are therefore not able to offer assurance to the outcome display. |
| Were verified assurance procedures performed within the past year? | We verified that all relevant manual assurance procedures were performed within the past year to verify the reliability of the overall system. | We discovered that relevant manual assurance procedures were not performed within the past year that are relevant to assuming the reliability of the overall system. We are therefore not able to offer assurance to this outcome display. |
| Did results of manual procedures fall within acceptable parameters? | We verified that the results of manual assurance procedures fall within acceptable parameters. | In performing our manual procedures, we discovered some results that fall outside acceptable parameters. We are therefore not able to offer assurance to the outcome display. |
| Does the outcome display comply with applicable standards set by authoritative bodies? | We verified that the outcome display complies with applicable standards set by authoritative bodies. | We verified that the outcome display does not comply with applicable standards set by authoritative bodies. We are therefore not able to offer assurance to this outcome display. |

FIGURE 31C

CONTINUOUSLY UPDATED DATA PROCESSING SYSTEM AND METHOD FOR MEASURING AND REPORTING ON VALUE CREATION PERFORMANCE THAT SUPPORTS REAL-TIME BENCHMARKING

CROSS-REFERENCE TO RELATED APPLICATIONS

This application is a divisional application of U.S. application Ser. No. 10/173,904, filed Jun. 17, 2002, and entitled "Continuously Updated Data Processing System and Method for Measuring and Reporting on Value Creation Performance that Supports Real-Time Benchmarking", which is a continuation-in-part application of U.S. application Ser. No. 09/809,544, filed Mar. 14, 2001, and entitled "Continuously Updated Data Processing System and Method for Measuring and Reporting on Value Creation Performance that Supports Real-Time Benchmarking," which is a continuation-in-part application of U.S. application Ser. No. 09/809,502, filed Mar. 14, 2001, and entitled "Data Processing System and Method for Analysis of Financial and Non-financial Value Creation and Value Realization Performance of a Business Enterprise for Provisioning of Real-time Assurance Reports" and of U.S. Application of U.S. application Ser. No. 09/809,758, filed Mar. 14, 2001, entitled "Data Processing System and Method for Analysis of Financial and Non-financial Value Creation and Value Realization Performance of a Business Enterprise", which are continuation-in-part applications of U.S. application Ser. No. 09/586,722, filed Jun. 5, 2000, entitled "Data Processing System and Method for Analysis of Financial and Non-financial Value Creation Performance of a Business Enterprise" and of U.S. application Ser. No. 09/587,646, filed Jun. 5, 2000, entitled "Data Processing System and Method that Provides an Integrated and Comprehensive User Interface for Analysis of Value Creation Performance of a Business Enterprise" which are respective continuation-in-part applications of U.S. application Ser. No. 09/574,569, filed May 17, 2000, entitled, "Continuously Updated Data Processing System for Measuring Financial Value Creation". All of the above-referenced applications are fully and completely incorporated herein by reference.

BACKGROUND OF THE INVENTION

The present invention relates to a data processing system that measures performance in creating and realizing value by a business enterprise based on past and anticipated future events. More particularly, the present invention relates to a data processing system and method that supports the provision of real time benchmarking through a network of benchmarking service providers.

A fundamental principle of traditional accounting and financial reporting methods is that the performance of a business enterprise is derived from transactions between the enterprise and other parties, such as customers, suppliers and employees. Consequently, traditional accounting can be characterized as measuring value realized through such transactions. Traditional accounting systems can thus be characterized as transaction-based.

This arrangement proved to be satisfactory through what can be characterized as the manufacturing era. In today's world, however, the most important assets of many enterprises are not plant and equipment but rather knowledge, ideas, and skills. For the most part, knowledge-based assets are not acquired through third-party transactions, but are rather developed in-house. As such, they are not adequately captured by traditional accounting methods.

As a result of these shortcomings of traditional accounting with respect to knowledge intensive companies, it is apparent that capital markets are missing important information needed to rationally assess the performance of a business enterprise. It has been argued that traditional accounting methods are a declining predictor of stock prices and produce largely irrelevant reports for companies with long research and development pipelines. Without adequate accounting for knowledge-intensive enterprises, capital markets will perform sub-optimal resource allocation.

Many recent developments have taken place in the field of accounting and financial reporting though none fully addresses these problems. These include: Economic Value Added (EVA); Balanced Scorecard, Intellectual Capital Management (ICM), Economic Resource Planning (ERP); and the Global Reporting Initiative (GRI). An attempt has been made to mitigate some of traditional accounting's shortcomings with management's discussion and analysis (MD&A) sections in annual reports, but MD&A disclosure is itself in bad condition, with no clear standards, methodology, or reporting principles. Capital markets are not routinely supplied with information that would permit monitoring of strategy implementation, value creation, and risk management.

Thus, with the increased time-lag often found between value creation and value realization, an accounting model that focuses only on the latter is increasingly irrelevant for intensively knowledge-based enterprises—and, indeed, enterprises in general are increasingly knowledge-based. Traditional financial statements have simply not provided sufficient information about knowledge assets.

When value creation was closely followed by value realization (the mouse trap was manufactured in March and sold in April) concentrating on just value realization alone was good enough. It is no longer good enough today. A biopharmaceutical research company may spend research and development funds on a potential drug discovery for ten years before successful commercialization and revenue streams commence. The growing deficits resulting from research and development write-offs displayed by traditional accounting during those ten years do not convey timely and relevant information. It is not that traditional accounting methods focussed on value realization should be abandoned. They are important, but they are not sufficient.

An additional drawback to traditional transaction-based accounting techniques is that they tend to rely on summarization of transactional data on a monthly, quarterly, or annual basis in order to provide periodic financial statements and reports. However, what is needed in today's fast-paced environment is a method of providing continuously updated information on value creation and realization.

An additional drawback to traditional accounting techniques is that they tend to capture only one dimension of value: namely, financial value. However, financial value is not the only dimension of value that is relevant to understanding enterprise performance. For example, non-financial factors, such as avoiding harm to the natural environment, or contributing to a healthier community, may not yield direct financial benefits to the enterprise in the short-run, but may be as important in strategic terms as increasing the financial returns to shareholders.

A further drawback to traditional accounting techniques is that they tend to measure performance from the perspective of only one stakeholder: that is, shareholders. However, in the modern economy, achieving a full understanding of enterprise performance requires knowledge of the extent to which the enterprise is meeting the expectations of other stakeholders, such as customers, employees, suppliers, business partners, and the communities and society within which the enterprise operates.

Therefore, what is needed, by contrast to conventional techniques, is a technique for providing value creation information for a business enterprise from the perspectives of a variety of stakeholders, not just shareholders. What is further needed is a method of providing an integrated perspective on both financial and non-financial value creation. What is also needed is a technique for providing measurements of the performance of a business enterprise in creating value based upon projections of future events and related benefits that result from such events. It is to these ends that the present invention is directed.

In addition, there is a need for a technique for providing continuously updated measurements of the performance of a business enterprise in creating and realizing value based on past and future events, and related benefits that will result from such events.

Such an event-based system should be organized on fundamentally different principles than today's transaction-based accounting systems. This creates the prospect that an enterprise that wishes to track value creation performance, as well as traditional value realization performance, would need to maintain two entirely different systems: an event-based value creation performance measurement and reporting system, and a transaction-based value realization accounting system. Maintaining two separate systems can be inefficient and costly.

Thus, a method of adapting a continuously updated event-based system so that it is capable of producing traditional accounting reports and financial statements, in addition to measuring and reporting on value creation performance is needed.

Another drawback of traditional accounting is that it provides a general purpose set of value realization financial statements for a particular period of time, in a single format, as specified by Generally Accepted Accounting Principles (GAAP). There is thus a need for a stakeholder-user to be able to select the attributes of a particular outcome display that is updated in real-time.

An important feature of traditional value realization accounting has been the development of standards and procedures that enable an independent third party auditor or independent internal auditor to provide assurance to users of financial statements. Provision of assurance in this way enhances the credibility of financial information, and is an important element in the proper functioning of capital markets.

Assurance has traditionally been provided in the form of a standardized audit report, whereby an assurance provider attests to the accuracy of financial or non-financial information based on evidence obtained through an audit conducted in accordance with generally-accepted auditing standards. In the past, it was not necessary to customize an assurance report to the needs of a particular user, since traditionally, audit reports were usually provided on financial statements prepared in a standardized format.

For information produced by a continuously updated data processing system for measuring and reporting on value creation and value realization to be of maximum utility to stakeholders, it is desirable to provide methods by which assurance can be provided by third party or independent internal auditors.

There are significant differences between a traditional financial accounting system and a continuously updated data processing system for measuring and reporting on value creation and value realization that have major implications for assurance providers. For example, it is desirable in a continuously updated data processing system for measuring and reporting on value creation and value realization that assurance procedures be automated so that they can be undertaken in real time, in parallel with the generation of the outcome displays on which assurance is being provided. It is also desirable that, where appropriate, stakeholder-users be able to specify the level of assurance they require, and that assurance reports be customized in order to be relevant to the particular outcome display to which they refer, taking into account the choices made by a stakeholder-user in selecting the attributes of a particular outcome display. It is also desirable that certain real time automated procedures and the generation of an assurance report in real-time be performed independently by the third party assurance provider on a parallel system.

In providing continuously updated information on value creation performance, one of the needs of business enterprises is to benchmark their performance against other comparative companies. It is desirable to provide benchmarking information on value creation performance in real-time, in a manner that enables comparisons to be made with comparable firms, functions or data in a manner that protects the confidentiality of enterprise information. It is to these and other ends that the present invention is directed.

SUMMARY OF THE INVENTION

The invention affords a data processing system and method for assessing the performance of a business enterprise in creating and realizing value. More particularly, the invention affords a data processing system and method that supports the provision of real-time benchmarking through a network of benchmarking service providers.

The system provides a stakeholder-user with up-to-the-minute value creation information regarding the business enterprise. Stakeholder-users may also review underlying assumptions, make alterations to the assumptions and see the results of value creation analysis based on those altered assumptions. In addition, stakeholder-users may contribute performance-related information reflecting their own experience with the enterprise for incorporation into the data regarding the value creation performance of the enterprise.

The system further provides reports (outcome displays) on value creation performance of the enterprise tailored for each of the key stakeholder groups of the enterprise.

The system addresses shortcomings of conventional financial accounting techniques by measuring and reporting future value streams, not just historical transactions, measuring and reporting value streams for all key stakeholders, including both financial and non-financial value; and measuring and reporting value creation on a continuous, real-time basis.

In shifting the focus from shareholders to a broader set of stakeholders, information may be obtained to evaluate value creation performance from the perspective of the stakeholder groups. The invention addresses this by providing two types of stakeholder interactivity. First, the system may provide an opportunity for stakeholders to input data regarding corporate performance as they have experienced it from a customer, employee, or other stakeholder perspective. Secondly, the stakeholders may interact with the system, thus enabling them to select the information that is most relevant to them.

The system further provides continuously updated outcome displays on value realization performance similar to outcome displays that would otherwise be available from a transaction-based accounting system.

In an aspect, the invention affords a method for providing real-time benchmarking information relating to the performance of a business enterprise comprising the steps of developing a data structure including information related to the performance of a business enterprise; initiating a request for benchmarking information to a benchmarking network including one or more benchmarking service providers, each of the benchmarking service providers having one or more associated clients, the benchmarking service providers relaying the request for benchmarking information to their clients; responding to the request for benchmarking information by providing relevant benchmarking information to the associated benchmarking service providers; and aggregating the received benchmarking information to yield composite benchmark information relating to the performance of the business entity.

The data structure may include information relating to the value creation performance of a business enterprise, information relating to the value realization performance of a business enterprise, or information relating to the performance of a business enterprise as measured by generally accepted alternative performance reporting formats. Further, the data structure includes a plurality of future and past events and related assumptions. The benchmarking request may be repeatedly generated based on the occurrence of one or more events. Alternatively, accumulation of benchmarking information may take place continuously in the background.

In features of the invention, the initiating step further comprises initiating a request for benchmarking information to a first benchmarking service provider, and relaying that request to the one or more additional benchmarking service providers in the benchmarking network. For each notified client, the responding step further comprises searching for relevant benchmarking information from associated data structures and providing the relevant benchmarking information to the associated benchmarking service providers. Further, the aggregating step further comprises firstly aggregating by each of the associated benchmarking service providers the relevant benchmarking information from each of the responding client systems, providing the aggregated benchmarking information to the first benchmarking service provider, and secondly aggregating the aggregated benchmarking information with the relevant benchmarking information provided to the first benchmarking service provider from its client systems. In addition, benchmarking service providers may agree to continuously pool commonly requested benchmarking information in order to speed the response time of the system in response to benchmarking requests.

In another aspect, the invention affords a system for providing real-time benchmarking information relating to the performance of a business enterprise. The system comprises a memory device for storing a data structure including a plurality of first assumed variables that have an influence on a non-financial value stream of the business enterprise and including a plurality of second assumed variables that have an influence on a financial value stream of the business enterprise, a calculation engine for determining a first outcome of the non-financial value stream of the business enterprise based upon events characterized by the first assumed variables, the first outcome influencing at least one of the second assumed variables and for determining a first present value of the financial value stream of the business enterprise based upon the first outcome and based upon the second assumed variables, an outcome display module for selecting outcome display reporting parameters for generating reports from information stored in the memory device, the outcome display reporting parameters being associated with certain ones of the first and second assumed variables stored in the memory device, a filter coupled with the calculation engine for selecting those certain ones of the first and second assumed variables from the memory device to be delivered to the calculation engine, and a benchmarking module for providing benchmarking information relating to the comparable performance of a particular business enterprise with other business enterprises.

In features of the invention, present and future events are characterized by the first and second assumed variables. In addition, the calculation engine repeatedly determines a series of updated outcomes of the non-financial value stream of the business enterprise and a series of updated present values of the financial value stream of the business enterprise based upon any assumed variables in the data structure including any assumed variables that have changed in response to the occurrence or non-occurrence of one or more events. The benchmarking information is preferably provided in real-time and is continuously updated based upon any assumed variables in the data structure being changed in response to the occurrence or non-occurrence of one or more events.

BRIEF DESCRIPTION OF THE DRAWINGS

FIG. 13 illustrates an event matrix data structure for storing events and their related assumptions in accordance with the present invention when operating in value creation mode;

FIG. 17 illustrates an exemplary determination of outcome variance;

FIG. 19 illustrates an exemplary arrangement of data in the event matrix in which user identities are stored in association with assumptions;

FIG. 24 is a diagrammatic view of the event matrix module of FIG. 23 illustrating an example of certain event attributes for storing event information that may be used by the system while operating in value realization mode;

FIG. 25A is a diagrammatic view of a customer object record that may be stored in the object database;

FIG. 25B is a diagrammatic view of a product object record that may be stored in the object database;

FIG. 25C is a diagrammatic view of a financial object record that may be stored in the object database;

FIGS. 31A, 31B, and 31C illustrate an exemplary representation of the results of applying particular assurance procedure decision rules to generate a customized assurance report in accordance with the invention.

DETAILED DESCRIPTION OF A PREFERRED EMBODIMENT

Figure 1A:
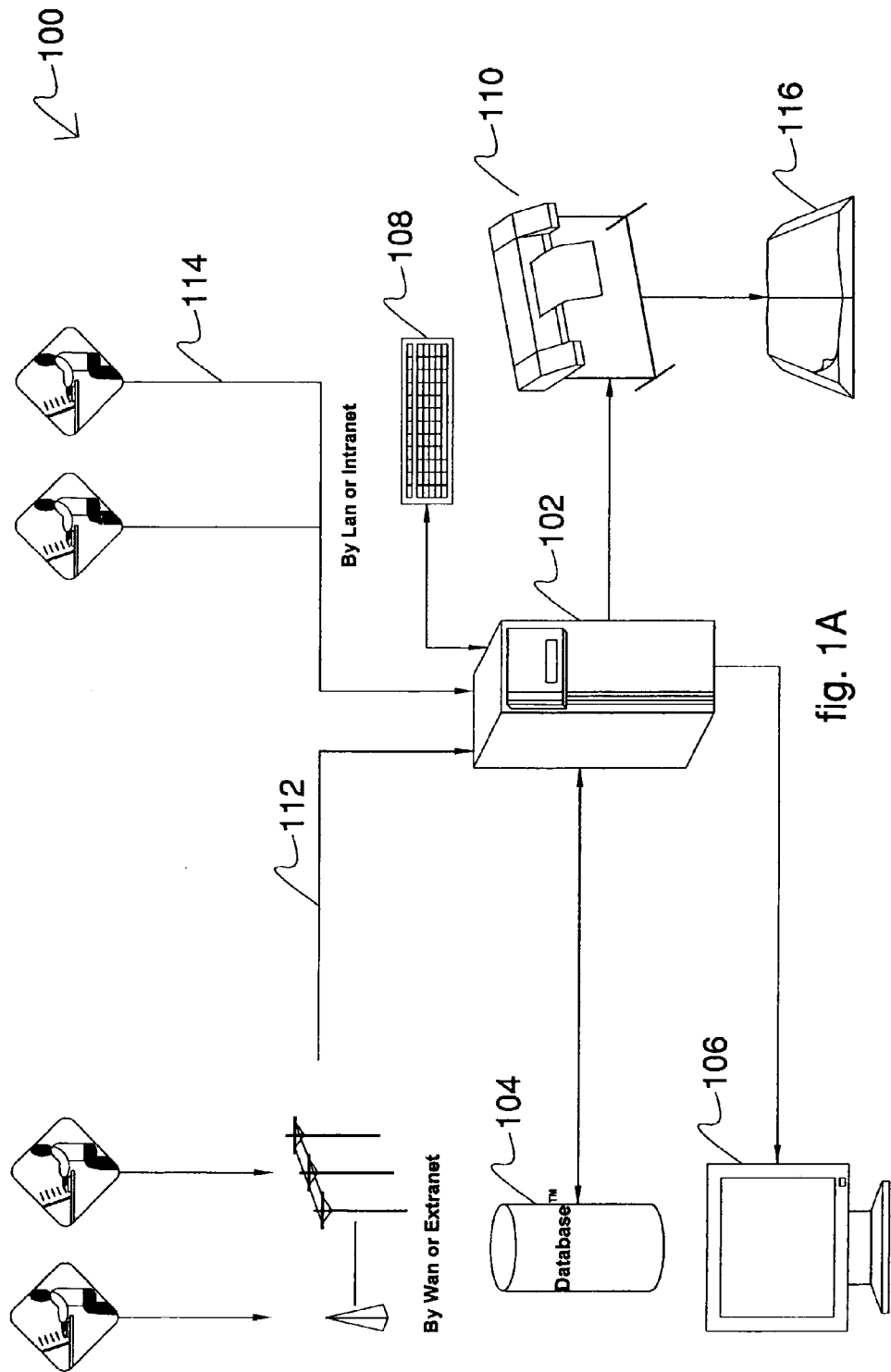
FIG. 1A illustrates a block diagrammatic view of a computer network system in accordance with the present invention.

FIG. 1A illustrates a block diagrammatic view of a computer network system 100 in accordance with the present invention. The system 100 may include a central processing unit (CPU) 102, a database 104, a display 106, a keyboard and mouse 108, a printer 110 and may interface with remote systems via a wide area network (WAN) or extranet 112 and local area network (LAN) or intranet 114. Printed outcome displays 116 may be provided by the printer 110.

Users may access the system 100 directly using the keyboard 108 and monitor 106, or remotely over the LAN or intranet 114, the WAN or extranet 112, or the World Wide Web. Results can be displayed on the local monitor 106, or printed by the local printer 110. Alternately, the results can be displayed by a remote computer monitor or printer (not shown).

It will be apparent that the computer network system 100 is conventional and that various modifications or substitutions may be made. The system 100 may embody the present invention by configuring the CPU 102 to operate in accordance with stored software programs so as to interact with data stored in the database 104, as explained herein.

Data that is relevant to performance of a business enterprise may maintained in the database 104 (FIG. 1A). As used herein, "business enterprise" is intended to encompass for profit, not-for-profit and governmental organizations. The database 104 may be in form of a relational database. Input and output from the database 104 may be in the context of value creation or value realization.

The value creation context permits selection of one of four different "perspectives" into the data (e.g., each perspective may be an organization or arrangement of the data). These perspectives may include: a perspective that reflects the company's strategy for creating and realizing value, referred to herein as the value creation and realization formula; a value stream model perspective; a value creation capacity perspective; and a value creation for multiple stakeholders perspective.

The value creation and realization formula perspective provides a succinct overview of the business enterprise's strategy for creating and realizing value. This can include, for example, an identification of the goods or services to be provided by the business, an identification of the enterprise's position in any related value chain, an identification of the enterprise's strategy with respect to alliances, an identification of the enterprise's approach to financing its present and future operations, an identification of likely consumers of the goods or services, an identification of various markets to be entered and a time schedule in which those markets are anticipated to be entered. Thus, the database 104 may store such parameters in a matrix referred to herein as the formula matrix.

The value stream model perspective is described in more detail herein and relates to performance measurement of the business enterprise with respect to future value creation. This may include, for example, storing measurements of present financial value of one or more value streams of the business enterprise based upon projections of future events, including assumptions regarding the future events, probabilities of their occurrence and monetary amounts expected to be realized should they occur.

For the purposes of this document, a "value stream" for a business enterprise is an aggregation of financial and non-financial benefits flowing to the business and arising from a minimum set of activities that are necessary to give rise to the benefits. A "future value stream" refers to those benefits which have not yet occurred with respect to a particular point in time, such as the present. An "historical value stream" refers to those benefits that have already been realized with respect to a particular point in time. A "financial value stream" refers to those benefits that are reducible to cash or cash equivalents. A "non-financial value stream" refers to those benefits that are not readily reducible to cash or cash equivalents. For example, a non-financial benefit may be enhanced customer loyalty. In addition to benefits, a value stream may have associated costs, such as cash outflows.

Events give rise to the benefits associated with value streams. An historical event may give rise to a benefit that has already been realized with respect to a particular point in time. For example, a sale of goods in the past (an historical event) may have already resulted in a financial benefit to the seller of the goods, in which case, the benefit belongs to an historical value stream. In addition, historical events may result in a benefit that has yet to be realized. For example, a license agreement already entered into (an historical event) may result in periodic payments that are not yet payable with respect to a particular point in time, in which case, these benefits are part of a future value stream. A series of related events are referred to herein as an "event stream." The database 104 may store parameters relating to events, benefits and value streams in a matrix referred to herein as the event matrix.

The value creation capacity perspective relates to the capabilities, infrastructure and networks required by the business enterprise for carrying out its strategy for creating and realizing value. Value creation capabilities may include, for example, manufacturing capability and innovation capability. The value creation infrastructure may include, for example, office space and capital equipment, such as telephone and computer systems. Value creation networks may include, for example, relationships with other business enterprises, such as suppliers, customers and distributors. Thus, the database 104 may store such parameters in a matrix referred to herein as the capacity matrix.

The value creation for multiple stakeholders' perspective relates to measurement of financial and non-financial value creation for key stakeholders. For example, a key stakeholder may be a shareholder in the business enterprise, in which case, the shareholder may be provided with measurements and analysis of financial value of the enterprise based upon future events. As another example, the stakeholder may be one of the business enterprise's customers. In which case, customers may be periodically surveyed to identify their expectations with regard to value creation and their level of satisfaction. The results of the survey may be stored in the database 104 and tracked over time so that trends in the survey results may be analyzed. It will be apparent that data relevant to other types of stakeholders, such as employees, suppliers and business partners, or the community or society at large, may be included in the database 104. The database 104 may store such parameters in a matrix referred to herein as the stakeholders' matrix.

While data in the database 104 can be accessed from any of these perspectives as appropriate, for convenience, a specific dataset (e.g., a collection of assumed variables and events) is primarily associated with each particular perspective. Thus, a unique data structure or matrix may be associated with each of the four different perspectives.

The value realization context permits selection of one of a number of value realization outcome displays, including outcome displays that provide information similar to that provided by conventional transaction-based accounting systems. However, in accordance with the invention, the outcome displays are provided by applying an appropriate filter and calculation engine to the event-based information in the database to generate the selected report.

Figure 1B:
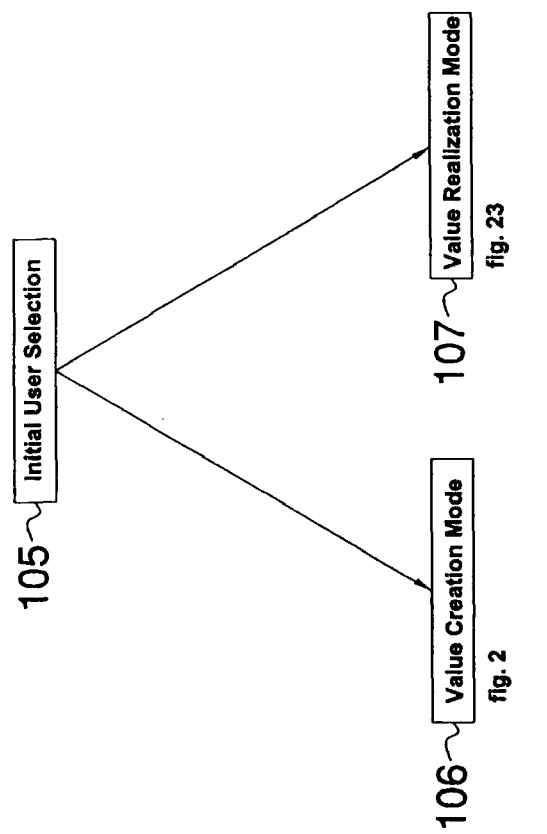
FIG. 1B illustrates a diagrammatic view of initial choices that may be available to a user in determining whether to view value creation or value realization information when using the system of the invention.

FIG. 1B is a diagrammatic view of initial choices (initial selection 105) available to a user in determining whether to view value creation (value creation mode 106) or value realization information (value realization mode 107).

Figure 2:
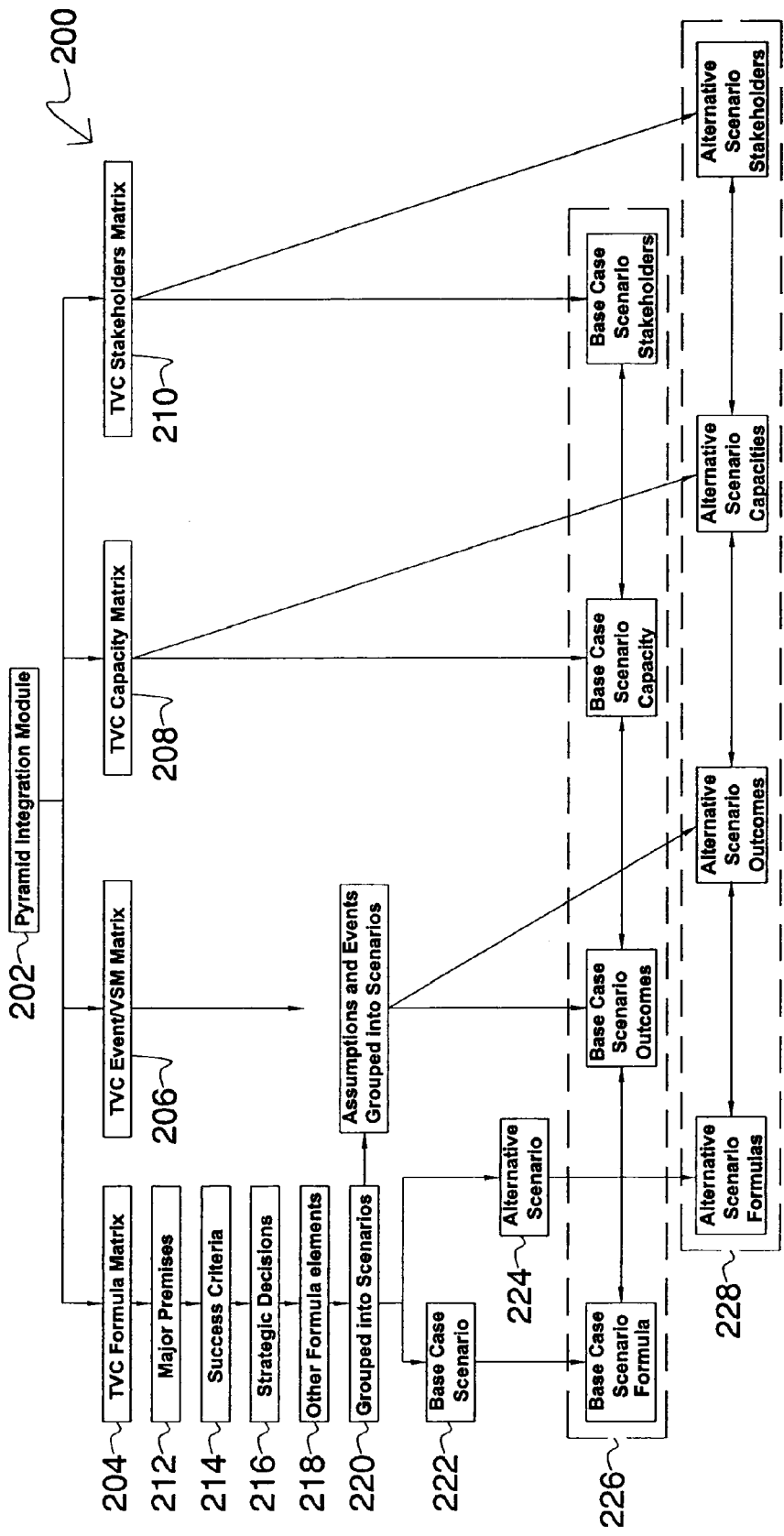
FIG. 2 illustrates a block diagrammatic view of software architecture for enabling the value creation mode of the computer system of FIG. 1A in accordance with the present invention.

FIG. 2 illustrates a block diagrammatic view of a software architecture 200 for enabling the value creation mode of the present invention for the computer system 100 of FIG. 1A. The software architecture 200 includes a number of software modules 202-220, each of which controls the CPU 102 to perform certain functions, as explained herein. An integration module 202 reconciles the four different perspectives and transfers information among them. Thus, for example, if data stored in the matrix associated with the value creation formula perspective is changed, the integration module 202 ensures that corresponding data stored in the matrices associated with the other perspectives is appropriately updated. As shown in FIG. 2, the integration module 202 interfaces with a formula matrix module 204, an event matrix module 206, a capacity matrix module 208 and a stakeholders' matrix module 210.

The formula matrix module 204 manages the data matrix stored in the database 104 (FIG. 1A) which is relevant to the formulation of a strategy for the business in creating and realizing value. The event matrix module 206 manages the data matrix stored in the database 104 which is relevant to the value stream model perspective. The capacity matrix module 208 manages the data matrix stored in the database 104 which is relevant to the value creation capacity perspective. The stakeholders' matrix module 210 manages data stored in the matrix that is relevant to the multiple stakeholders' perspective.

The formula matrix module 204 interfaces with a major premises module 212. The major premises module 212 allows a user to input and alter assumed variables stored in the database 104 (FIG. 1A). These may be, for example, assumptions regarding the industry of which the business enterprise is a part. The major premises module 212 also interfaces with a success criteria module 214 that allows a user to input and alter measures of success for the business enterprise.

The major premises module 214 also interfaces with a strategic decisions module 216. The strategic decisions module 216 allows a user to define different decision trees, within the data matrix associated with the formula matrix module 204, which depend upon various strategic options available to management of the business enterprise. The strategic decisions module 218 also interfaces with an other formula elements module 218 that allows a user to input and alter other criteria relevant to evaluation of the value creation performance of the business enterprise.

The other formula elements module 218 also interfaces with a scenario grouping module 220. The scenario grouping module 220 allows a user to assemble existing data and to add additional data representative of alternate scenarios for the future of the business enterprise. For example, a base case scenario 222 may be established by a particular assemblage of events and related assumptions (e.g., assumed variables) for the business enterprise. For example, the base case scenario may include a current operational scenario that the business enterprise is implementing. One or more additional alternate scenarios 224 may also be established including a different set of events and related assumptions for each alternate scenario. For example, the alternate scenarios may be under consideration for possible future adoption by the enterprise.

Thus, in value creation mode, the system 100 (FIG. 1A) provides an ability to analyze scenarios, consisting of particular groupings of events and related assumptions. As a result, a user may be provided with a plurality of outcomes 226 for the base case scenario, taken from each of the four perspectives. In addition, the user may be provided with a plurality of alternate outcomes 228 for each alternate scenario.

As is described herein, the same underlying determinations made by the system 100 in value creation mode can be deployed in two principal "contexts" (e.g., conditions under which determinations are employed). In a first context, the system 100 generates comparisons between the base case and alternative future scenarios. Thus, the first context (also referred to herein as "vision view") facilitates the choice of an optimal future scenario to maximize value creation of the business enterprise. Accordingly, the first context is particularly useful for strategic planning. In a second context, the system 100 compares the organization's actual value creation performance during a period of time to the performance predicted at the beginning of that time period. Thus, in the second context (also referred to herein as "performance view"), the value creation performance of the business enterprise may be evaluated with the benefit of hindsight and measured against value creation that was previously predicted for the enterprise.

Figure 3:
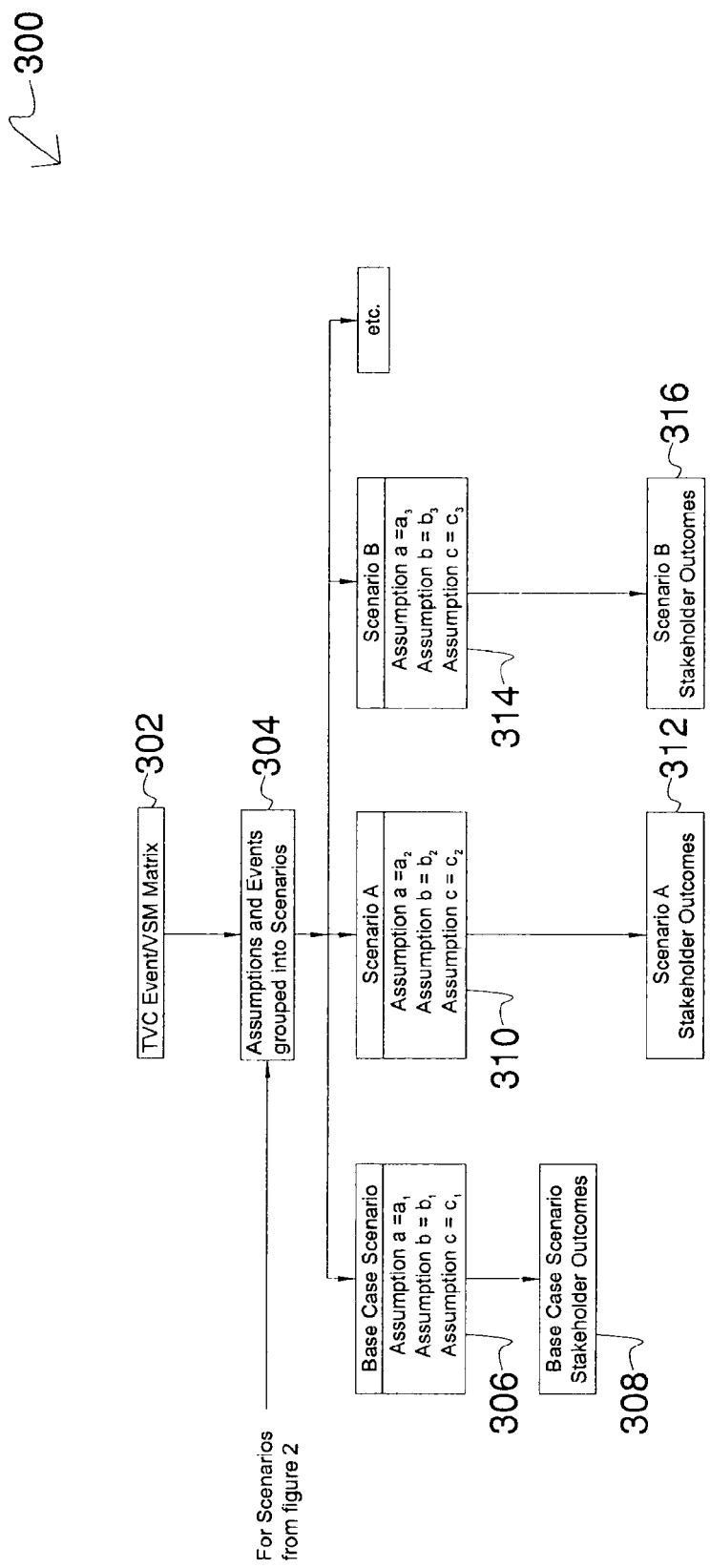
FIG. 3 illustrates a flow diagram showing determination of outcomes based upon different assumptions.

FIG. 3 illustrates a flow diagram 300 showing determination of outcomes in value creation mode based upon different assumptions. For example, the CPU 102 can be controlled to determine the outcomes 226 (FIG. 2) from the groups of scenarios 220 (FIG. 2) in accordance with the flow diagram 300 of FIG. 3. In a state 302, data relevant to the various scenarios may be retrieved from the database 104 (FIG. 1A) to the CPU 102 (FIG. 2). Then, in a state 304, the data for the assumptions and their related events may be assembled into scenarios.

As explained above, the event matrix stored in the database 104 is a relational database in which assumptions (e.g., assumed variables), events, and their related probabilities are collected and grouped into the various base case and alternative scenarios. Some assumptions may be scenario-independent and, thus, are constant throughout all the scenarios. Other assumptions, however, may vary scenario by scenario. Thus, for example, an assumption ("Assumption a") may be set at value $a_1$ in the base case scenario, at value $a_2$ in a first alternate scenario ("Scenario A"), and at value $a_3$ in yet another alternate scenario ("Scenario B"). Each of the scenarios yields "scenario stakeholder outcomes" as further described below. The scenario stakeholder outcomes (and how they vary over time) for the base case may be used for performance tracking. The other scenario outcomes may be used as "what-if" comparisons for strategic planning.

Next, program flow may move to a state 306 where equations for determining present value are applied to the events and assumptions for the base case scenario (exemplary computations are discussed herein). Then, from the state 306, program flow moves to a state 308 where outcomes determined by the computations performed in the state 306 are presented. For example, the outcomes may include a monetary amount (a financial outcome) determined to be the present value of the future value streams of the business enterprise based upon the base case assumptions. Alternately, the outcomes may include measurements of non-financial value creation.

In addition, from the state 304, program flow may move to a state 310. In the state 310, equations for determining present value are applied to the events and assumptions for the first alternate scenario ("Scenario A"). Then, from the state 310, program flow may move to a state 312 where outcomes determined by the computations performed in the state 306 are presented. For example, the outcomes may include a monetary amount determined to be the present value of the future value streams of the business enterprise, or a non-financial metric, based upon the Scenario A events and assumptions. Further, from the state 304 program flow may move to a state 314. In the state 314, equations for determining present value are applied to the events and assumptions for the second alternate scenario ("Scenario B"). Then, from the state 310, program flow may move to a state 312 where outcomes determined by the computations performed in the state 306 are presented. For example, the outcomes may include a monetary amount determined to be the present value of the future value streams of the business enterprise, or a non-financial metric, based upon the Scenario B assumptions.

Figure 4:
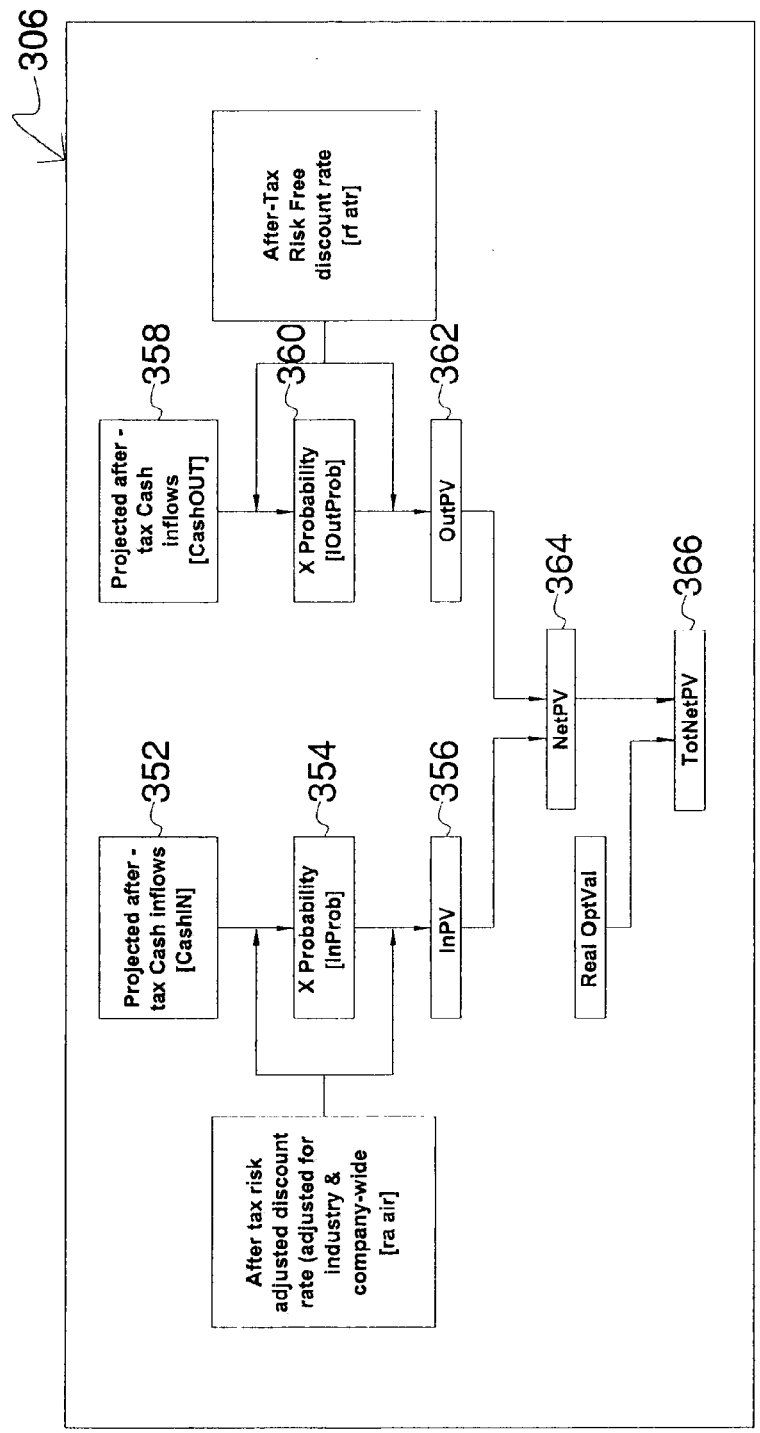
FIG. 4 illustrates a flow diagram for determining net present value of future financial values streams of a business enterprise in accordance with the present invention.

FIG. 4 illustrates a flow diagram 306 for determining net present value based upon value creation in accordance with the present invention. For example, the flow diagram of FIG. 4 may be performed in the state 306 of FIG. 3. In a state 352, an amount of a projected cash inflow ("CashIN") for a future financial value stream of the business enterprise may be adjusted by a factor that accounts for the time period between the present and the time that the cash inflow is expected. For example, the factor may be an after-tax, risk-adjusted discount rate ("ra_atr"). The amount of cash inflow, CashIN, may be an assumed variable that influences a future financial value stream for business enterprise. An event may occur, for example, which triggers the cash flow. Next, program flow may move to a state 354 where the projected cash inflow determined in the state 352 may be adjusted by a estimated probability that the cash flow will be realized. From the state 354, program flow moves to a state 356.

In the state 356, any additional influences on the future financial value stream for the business (e.g., projected cash inflows) for the same or additional future financial value streams may be adjusted, as in the states 352 and 354 and summed (e.g., aggregated) to determine a total present value for the future financial value streams of the business enterprise. The computations performed in the states 352-356 may expressed as follows (for example, the selected stakeholder category may be "shareholders"):

The present value of projected after-tax cash inflows may be given by:

$$InPV = \sum_{1}^{n} CashIN_i \times \left(\frac{1}{1+ra\_atr}\right)^i \times InProb$$

where CashIN represents the projected after-tax cash inflow for a specific year; ra_atr is the after-tax risk-adjusted discount rate (adjusted for industry and company-wide risks); InProb is the probability (as assessed by the user or by management of the business enterprise) of the inflows occurring; and InPV is the discounted present value of cash inflows.

The value:

$$\sum_{1}^{n} CashIN_i \times \left(\frac{1}{1+ra\_atr}\right)^i$$

represents the conventional discounted cash flow (DCF) formula for computing a present value (PV) of $CashIN_1$ in year 1, $CashIN_2$ in year 2, etc.

In a state 358, an amount of a projected cash outflow ("CashOUT") for a future financial value stream may be adjusted by a factor that accounts for the time period between the present and the time that the cash outflow is expected. For example, the factor may be a risk-free, after-tax discount rate ("rf_atr"). Next, program flow may move to a state 360 where the projected cash outflow determined in the state 358 may be adjusted by a estimated probability that the cash outflow will occur. From the state 360, program flow moves to a state 362.

In the state 362, any additional projected cash outflows for the same or any additional future financial value streams may be adjusted, as in the states 358 and 360 and summed to determine a total present value for the business enterprise that is attributable to cash outflows. The computations performed in the states 358-362 may expressed as follows (for example, selected the stakeholder category may be "shareholders"):

The present value of projected after-tax cash outflows is given by:

$$OutPV = \sum_{1}^{n} CashOUT_i \times \left(\frac{1}{1 + \text{rf\_atr}}\right)^i \times OutProb$$

where CashOUT represents the projected after-tax cash outflow for a specific year; rf_atr is the risk-free after-tax discount rate; OutProb is the probability (as assessed by the user or by management of the business enterprise) of the outflows occurring; and OutPV is the discounted present value of cash outflows.

Next program flow moves to a state 364 where the total present value of projected cash outflows may be subtracted from the total present value of projected cash inflows to determine a net present value for the future value streams of the business enterprise.

The net present value (NetPV) computed in the state 364 may be given by:

NetPV=InPV−OutPV where NetPV is the net of the present values of cash inflows and outflows.

Then, program flow moves from the state 364 to a state 366 where the effect of real options value (if any) included in any of the enterprise's strategies may be incorporated in the computation. Thus, the present value computed in the state 366 may be given by:

TotNetPV=NetPV+RealOptVal where RealOptVal is the "real options value" of the ability to defer certain expenses until future events suggest that further investment is warranted (similar to taking an option on a stock before advancing the full investment price of the stock). The real options value may be determined conventionally by reference to the Black-Scholes equation.

It will be apparent that the above formulas are exemplary and are taken from the perspective of a shareholder. Other formulas may be used to calculate present values for any of the other stakeholder groups. For example, from the perspective of a stakeholder that is a joint venture partner, the events, their associated probabilities of occurrence and their associated financial benefits will result in different financial outcomes than those experienced by a shareholder.

Figure 5:
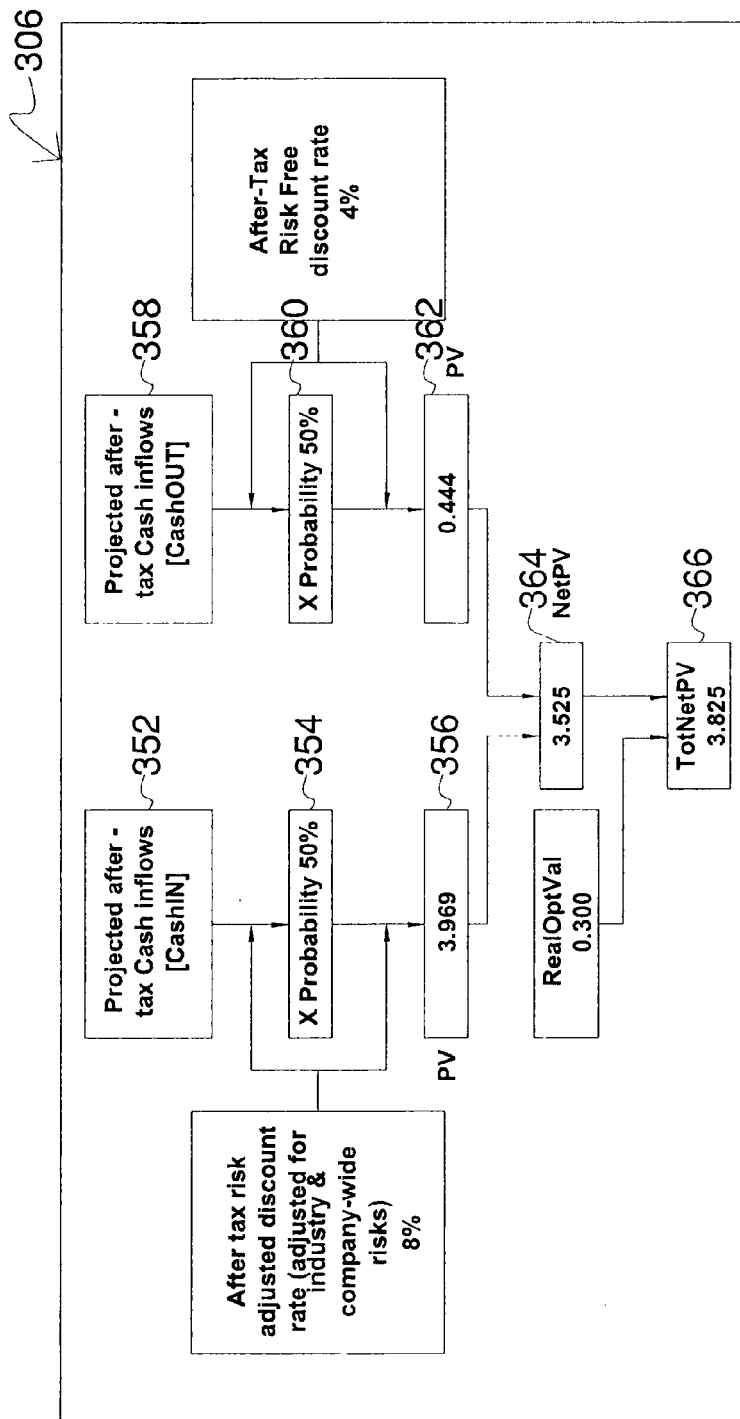
FIG. 5 illustrates the flow diagram of FIG. 4 including exemplary projected cash flows and related probabilities.

FIG. 5 illustrates the flow diagram 306 of FIG. 4 including exemplary projected cash flows and related probabilities. The example considers a case where a pharmaceutical company anticipates the sale of rights to manufacture a particular drug 3 years in the future for $10.000 million. Therefore, in the state 352, CashIN is equal to $10.000 million. In addition, the after-tax risk-adjusted discount rate, which is adjusted for industry-wide and company-wide risks, is assumed to be 8%. Therefore, ra_atr used for this example for cash inflows is equal to 0.08. Since with the drug project is just through Phase III Clinical Trials, the probability that the drug will be approved by the Food and Drug Administration (FDA) and final commercialization is estimated at 50%. Therefore, InProb for this example is 50%.

In that case, the above formula:

$$InPV = \sum_{1}^{n} CashIN_i \times \left(\frac{1}{1 + \text{ra\_atr}}\right)^i \times InProb$$

simplifies to:

$$InPV = 10.000 \times \left(\frac{1}{1.08}\right)^3 \times 50\% = 3.969$$

Also in the example, the expenses associated with commercialization of the drug are estimated to be $2.000 million. The after-tax risk-free discount rate, rf_atr, used for cash outflows is assumed to be 4%. In addition, the same probability of 50% is associated with the outflow.

Accordingly, the formula:

$$OutPV = \sum_{1}^{n} CashOUT_i \times \left(\frac{1}{1 + \text{rf\_atr}}\right)^i \times OutProb$$

simplifies to:

$$OutPV = 2.000 \times \left(\frac{1}{1.04}\right)^3 \times 50\% = 0.444$$

and so

NetPV=InPV−OutPV=3.969−0.444=3.525

Depending upon the circumstances, the rates for ra_atr and rf_atr may be larger or smaller. In addition, under certain circumstances it may be appropriate to use a surplus cash after-tax short-term investment-rate (rather than an after-tax risk-free rate) for cash outflows.

Adding a real options value of $0.300 million (calculation not shown in this example but may be performed in accordance with conventional techniques) yields:

TotNetPV=NetPV+RealOptVal=3,525+0.300=3,825

Figure 6:
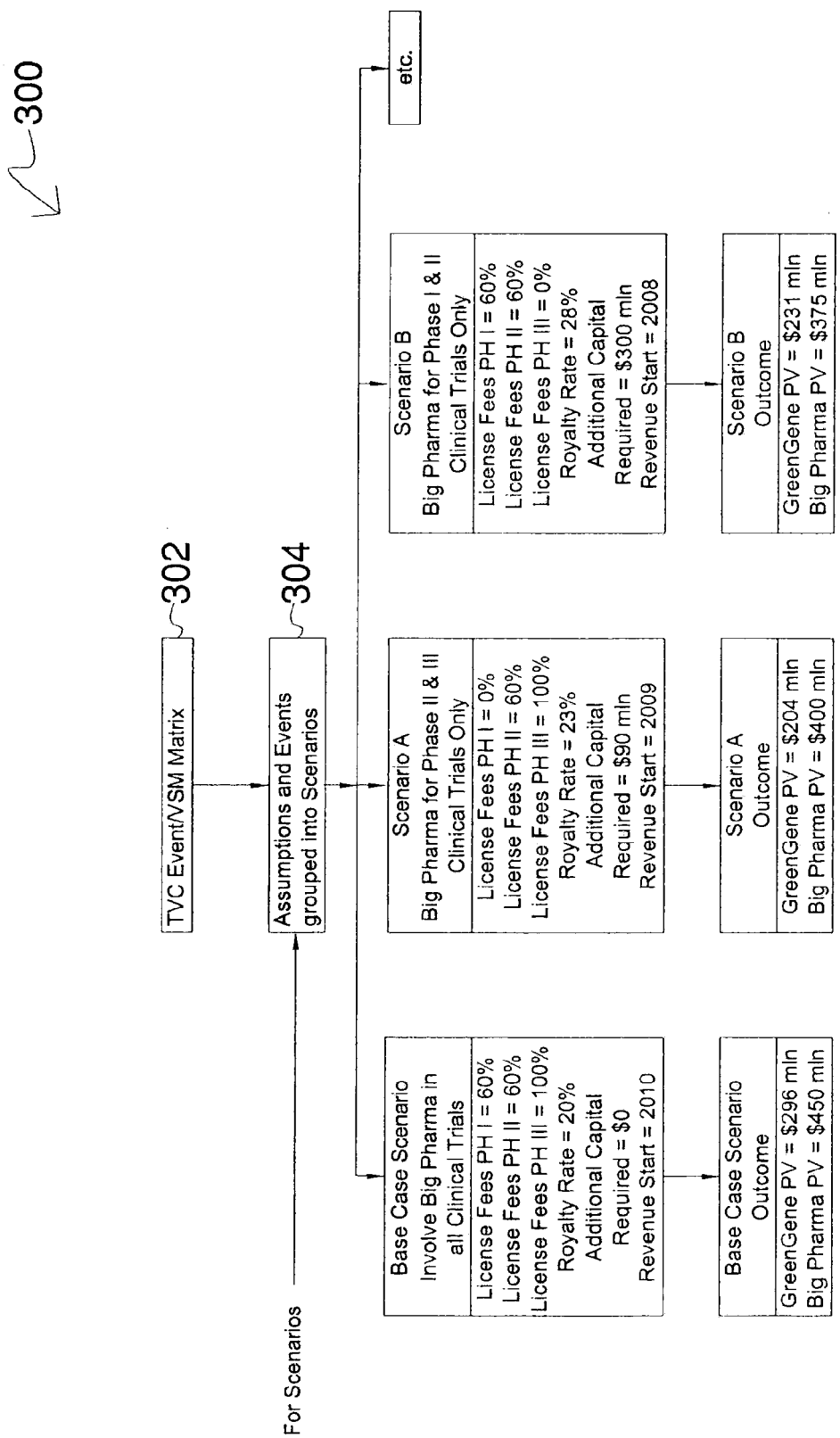
FIG. 6 illustrates the flow diagram of FIG. 3 including exemplary values for various assumptions.

As a more complex example, FIG. 6 illustrates the flow diagram of FIG. 3 including exemplary values for various assumptions (e.g., assumed variables). In the example, a fictional pharmaceutical company, referred to herein as "Company A," is involving a larger company as a partner, referred to herein as "Big Pharma," in all its clinical trials. As a base case scenario, license fees are assumed to be 60% for Phase I trials, 60% for Phase II trials, and 100% for Phase III Trials and ongoing royalties on subsequent commercialized sales are assumed to be 20%. With this amount of projected license fees, no further capital is expected to be required since the initial capital was raised with the base case scenario in mind. Commercialization and related revenues is expected to start in the year 2010. To determine the present value of the future financial value streams of the business enterprise taking into account this base case scenario, computations may be performed in accordance with the flow diagram illustrated in FIG. 4. However, the details of the computations are not shown in FIG. 6. The outcome for the base case scenario, for example, may be a present value (PV) of $296 million.

In addition, two alternative scenarios may be presented. In a first alternate scenario ("Scenario A"), the company conducts the Phase I trials on its own and only involves Big Pharma partner in Phase II and III trials. Because of the lesser financial commitment of Big Pharma, it would normally pay a higher royalty rate on ultimate sales. However, this scenario may require Company A to raise additional capital of $90 million to make up for the missing Phase I license fees. As an offsetting factor, commercialization and related revenues are expected to start in the year 2009. This is because a Big Pharma has its own ongoing manufacturing operations to consider with research and development tending to be a minor sideline. Consequently, Company A itself is expected to act more quickly than Big Pharma. Therefore, commercialization in Scenario A is expected to occur more quickly in comparison to the base case scenario.

Therefore, if Company A conducts the Phase I trials on its own, they will be completed somewhat sooner, thus advancing the final commercialization date. In computing the outcome, the discounted cash flow calculations utilized to determine the present value reflect the lower license fees (unfavorable), the higher royalty rates (favorable), and the earlier commercialization date (favorable). The net effect in this assumed example, is a computed present value (PV) of $204 million. Clearly, at present, Company A achieves a better outcome with the base case scenario. Accordingly, the better choice is to direct the company along the path indicated by the base case scenario.

Various factors, however, may change over time. If, as a result of revised assumptions (revenues, costs, timing, etc.) the recomputed Scenario A ever turns out to be more favorable than the recomputed base case scenario, then Company A will likely change its strategic decisions and opt for Scenario A.

In a second alternate scenario ("Scenario B"), Company A conducts the very long and expensive Phase III trials on its own and involves Big Pharma as a partner in only the Phase I and II trials. Compensating factors expected to result from this more significant change are an increase of the royalty rate to 28% and acceleration of the commencement of commercialization to the year 2008. However, Company A may have to raise an additional $300 million capital to finance the Phase III trials. When the present value is computed with all of these changes factored in, present value under Scenario B may be found to be $231 million. Again, the base case scenario at remains the most favorable. Updated assumptions may continue to be collected in the database 104 (FIG. 1A) for each of these scenarios, as various events transpire so that, at any time, management can decide to change strategic direction should an alternative scenario prove optimal at some point in the future.

FIG. 6 also shows the comparative values for the Big Pharma stakeholder. While this is not shown in the example, the system may generate the present value of the base case and each alternative scenario for multiple stakeholders. The difference in the computations is that from the perspective of the Big Pharma company there will be different assumptions made about cash inflows and outflows and their associated probabilities.

Some scenarios may eventually cease to be viable alternatives. For example, assuming Company A has contracted with Big Pharma to participate in the Phase I Clinical Trials, Scenario A is no longer a continuing option. As such, Scenario A may be dropped from the database 104 (FIG. 1A). Depending on how the contract with the Big Pharma has been drawn up, however, Scenario B may continue to be a viable option that may be revisited at a later time (e.g., as the time for the Phase III Clinical Trials draws closer).

As noted above, a "financial value stream" refers to those benefits that are reducible to cash or cash equivalents, whereas, a "non-financial value stream" refers to those benefits which are not readily reducible to cash and cash equivalents. More specifically, non-financial value streams are quantified by various metrics that measure value creation performance of the business enterprise with respect to the value creation expectations of stakeholders. Those value creation expectations are related to benefits that are not readily reducible to cash and cash equivalents. A non-financial outcome is an expected quantification, such as a numeric value or a yes/no result, expected to result from a particular non-financial value stream.

As is the case future financial value streams, the determination of non-financial value streams or outcome metrics can be viewed in either vision view, in which case the system calculates a future projected outcome based on assumed variables, or in performance tracking view, where the system compares a target or future outcome with actual achieved performance.

Figure 7:
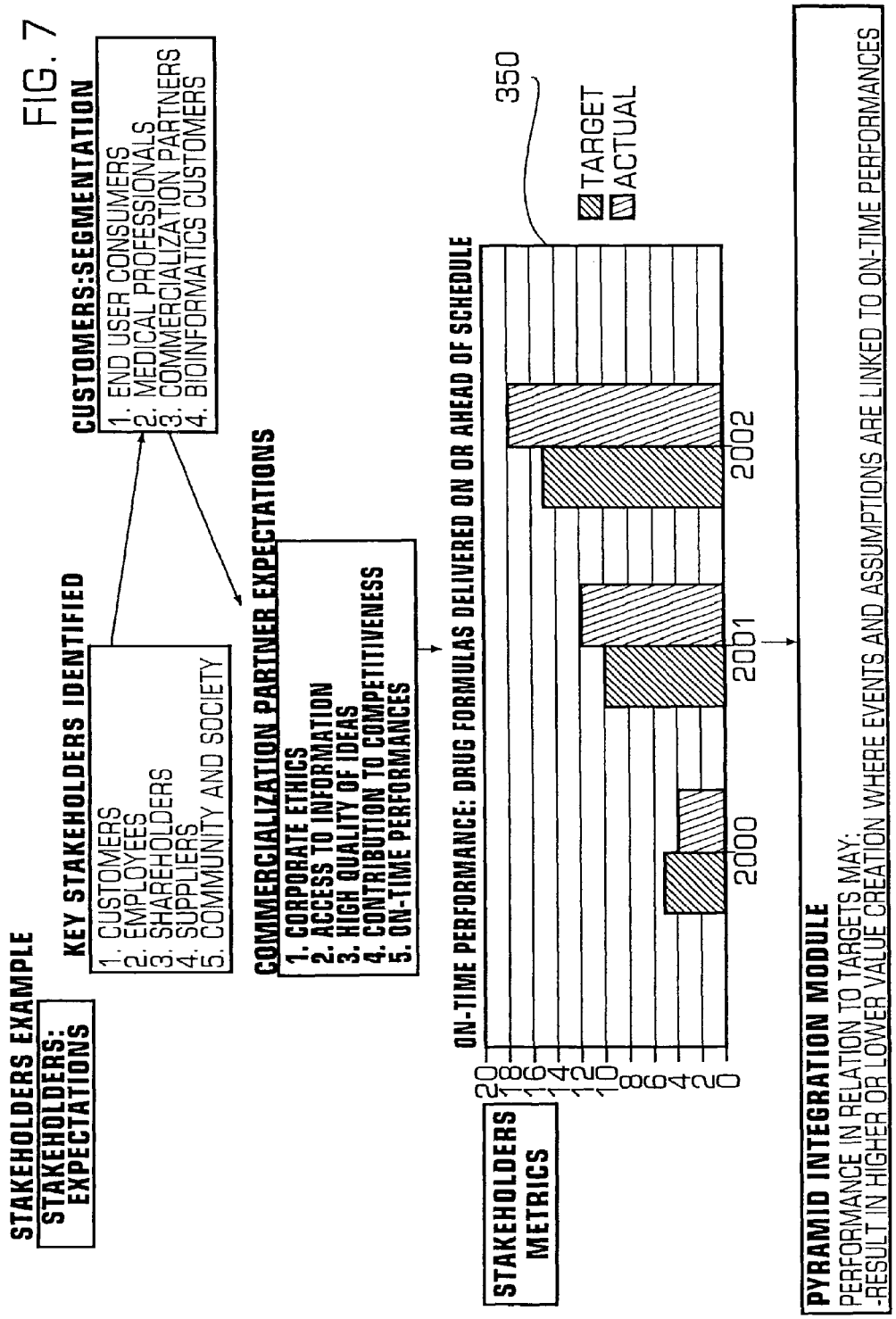
FIG. 7 illustrates a chart showing a comparison between targeted and actual values for on-time performance, a non-financial outcome.

To further illustrate, numerous non-financial value streams related to expectations of various categories of stakeholders are possible. An example of a non-financial value stream for stakeholders who are customers is "on-time performance." For Company A, a pharmaceutical company, a quantifiable metric for on-time performance may be the number of drug formulas which are delivered on, or ahead of, a predefined schedule in a given year. This metric may be predicted by computing an outcome based upon assumed variables and influencing events. In addition, historic values for this metric may be measured and compared to the predicted values. FIG. 7 illustrates a chart 350 showing a comparison between targeted and actual numbers of drug formulas delivered on or ahead of schedule.

The on-time Performance relates to the expectations of a class of stakeholders of Company A (e.g., customers). An exemplary formula for calculating a metric for on-time performance (i.e. a non-financial outcome) in vision mode (i.e. the metric is prospective of on-time performance rather than historic) may be as follows:

$$\text{future (or target) on-time performance} = (A \times D) + (A \times E) + (A \times F)$$

Where assumed variables are as follows: A is the number of active drug development projects; D is the percentage of projects expected to generate viable formulas in the current year; E is a factor that is related to innovation capabilities defined in a capacity matrix; and F is a factor that is related to employee productivity which is related to employee value creation in the stakeholder matrix.

Each of these assumed variables may be linked to an event in the event/assumption matrix stored in the database 104 (FIG. 1A). For example, the assumed value, A, for the number of active drug development projects may change if an event occurs defined as the company launching one or more new projects. As another example, the percentage, D, of projects expected to generate viable formulas in the current year may be linked to past external events (e.g., an industry average). Further, the factor, E, in the capacity matrix may also be linked to future events relating to innovation. Also, the factor, F, in the stakeholder matrix may be linked to future events relating to employee productivity which is linked to company performance with respect to respect and recognition of employees.

As shown in FIG. 7, the calculated target outcome for 2001 is 10. This value may result from the following assumed values:

A=25 (there are 25 active drug development projects);

D=60% (based on industry averages, 60% of these projects should result in generating a formula for further testing and development);

E=−20% (since Company A was recently established, its innovation capability is still ramping up, and E is assigned a value that represents a discount attributable to lower innovation capability than the industry average); and F=0% (is it is assumed that the company will meet the value creation expectations of employees with respect to respect and recognition, with the result that this event/assumed variable has neither a positive or negative influence on the outcome).

In a performance tracking mode, the previously calculated outcome value for on-time performance (in vision mode) may be compared to actual historic performance. Significant differences between anticipated and actual performance may be indicative of a performance problem in the company that management should address, or alternatively, may indicate that assumed variables are incorrect and the model needs to be re-calibrated accordingly. Thus, FIG. 7 shows exemplary historic values for each of the years 2000, 2001 and 2002 compared to projected outcome values for those same years.

The metric for on-time performance may, in turn, be linked to other financial or non-financial assumed variables and related events. For example, the event/assumption matrix may contain an event related to customer expectations with respect to on-time performance. A significant discrepancy between previously projected on-time performance (in vision mode) and actual on-time performance (in performance-tracking mode) may trigger this event, which in turn may be linked to assumed variables which influence the timing of future commercialization revenues. Thus, a computed non-financial outcome may be an event which triggers a computation of a financial outcome and may also be an input (e.g., by influencing an assumed variable) to the computation of the financial outcome.

Another example of a non-financial value stream for stakeholders who are employees is "respect and recognition." An example of a metric for respect and recognition may be the number of employees who are awarded official recognition by company management in a given year. Another example of a metric for respect and recognition may be attrition rate of employees in a given year. A further example of a metric for respect and recognition may be results of a survey of, or feedback from, employees which asks them to assess how well company management is doing in this regard.

An example of a non-financial value stream for stakeholders who are shareholders is "access to information." An example of a metric for access to information may be a number of press releases generated by the company in a given year. Another example of such a metric may be results of a survey of, or feedback from, shareholders which asks them to assess how well company management is doing in this regard.

An example of a non-financial value stream for stakeholders who are suppliers is "collaboration on new opportunities." An example of a metric for this value stream may be a number of new supply channels opened to a given a supplier in a given year. Another example of such a metric may be results of a survey of, or feedback from, suppliers which asks them to assess how well company management is doing in this regard.

An example of a non-financial value stream for stakeholders who are the community and society at large in which the company operates may be "environmental responsibility." An example of a metric for this value stream may be measured levels or quantities of various recognized environmentally hazardous substances that are generated by the company. Another example of such a metric may be results of a survey of, or feedback from, members of the community which asks them to assess how well company management is doing in this regard.

The various non-financial value streams and non-financial outcomes may be grouped into the following categories: capability metrics; infrastructure metrics; and networks metrics. Accordingly, events and assumed variables which influence these non-financial value streams and outcomes can be stored in corresponding matrixes in the database 104, along with the events and assumed variables which influence financial value streams.

Figure 8:
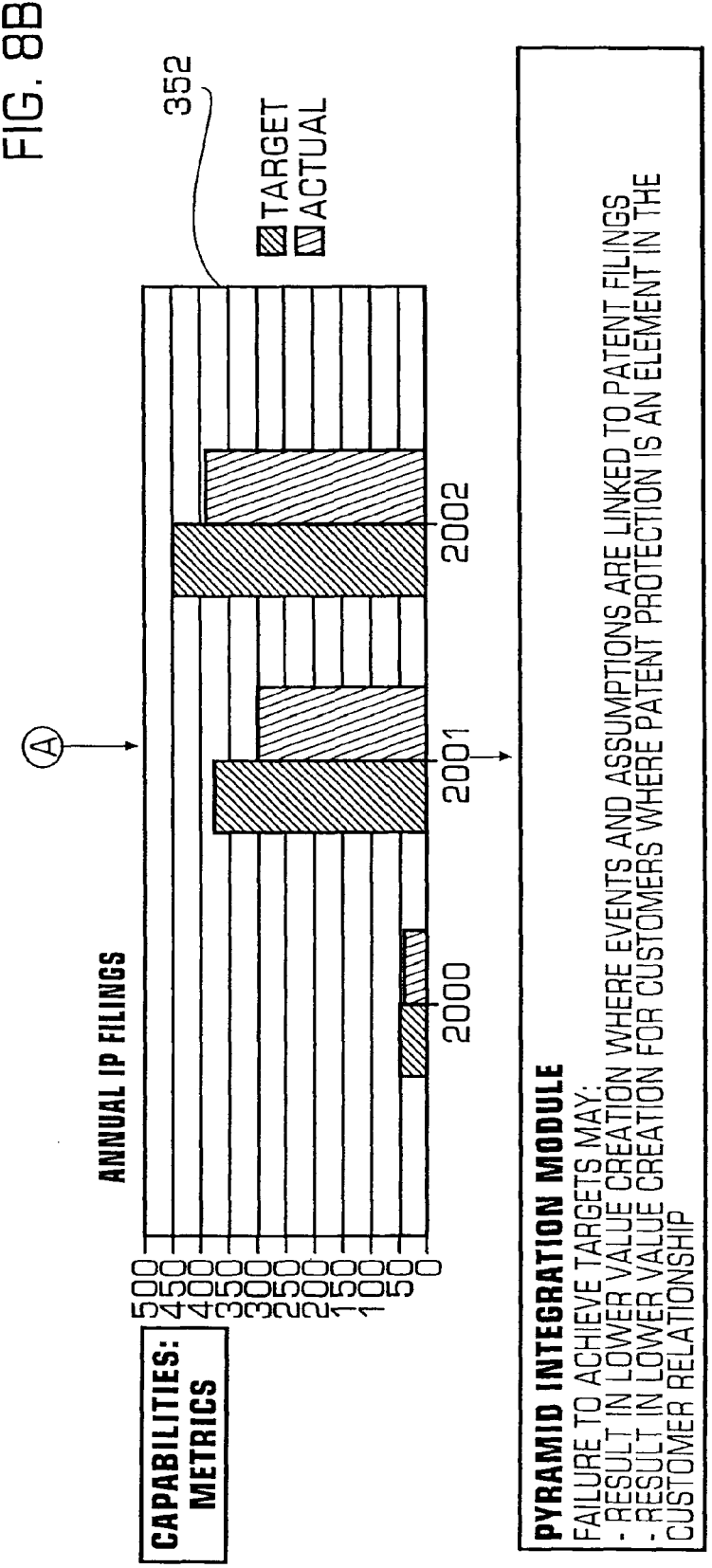
FIG. 8 illustrates a chart showing a comparison between targeted and actual values for annual IP filings, another non-financial outcome.

An example of a non-financial outcome in the above-described capability metrics category is "annual intellectual property (IP) filings." FIG. 8 illustrates a chart 352 showing a comparison between targeted and actual numbers of IP filings made (e.g., a number of patent applications). To determine the number of annual IP filings as a non-financial outcome metric in vision mode (i.e. prospectively) for Company A, a formula may be expressed by:

$$\text{future (or target) annual IP filings} = A \times B \times C$$

Where assumed values are as follows: A is the number of active drug development projects;

B is the average number of scientists per development project; and C is the average number of patents targeted per scientist per year.

Each of the assumed values may be linked to an event in the event/assumption matrix stored in the database 104 (FIG. 1A). For example, the assumed value, A, for the number of active drug development projects may change if an event occurs defined as the company launching one or more new projects. As another example, the assumed value, B, for the number of scientists per development project may change if the company an event occurs defined as a success in recruiting a targeted group of scientists. Accordingly, occurrence or non-occurrence of events in the event matrix may trigger computation of a non-financial outcome.

As shown in FIG. 8, the calculated value for 2001 is 375. This may result from the following assumed values:

A=25;

B=6; and

C=2.5.

In a performance tracking mode, the calculated outcome value for annual IP filings may be compared to actual performance. Thus, as shown in FIG. 8, projected values are compared to actual values for the years 2000, 2001 and 2002. Significant differences between anticipated and actual performance may be indicative of a performance problem in the company that management should address, or alternatively, may indicate that assumed variables are incorrect and the model needs to be re-calibrated accordingly.

As noted above, the value for annual IP filings in performance-tracking mode may, in turn, be linked to other financial or non-financial assumed variables and related events. The system 100 (FIG. 1A) may compare the actual performance in annual IP filings with a previous calculation of annual IP filings in vision mode. A significant discrepancy may trigger an event in the event/assumption matrix related to annual IP filings which, in turn, may trigger computation of a financial value. For example, the annual IP filings event may influence assumed variables related to future licensing revenue from patents.

Figure 9:
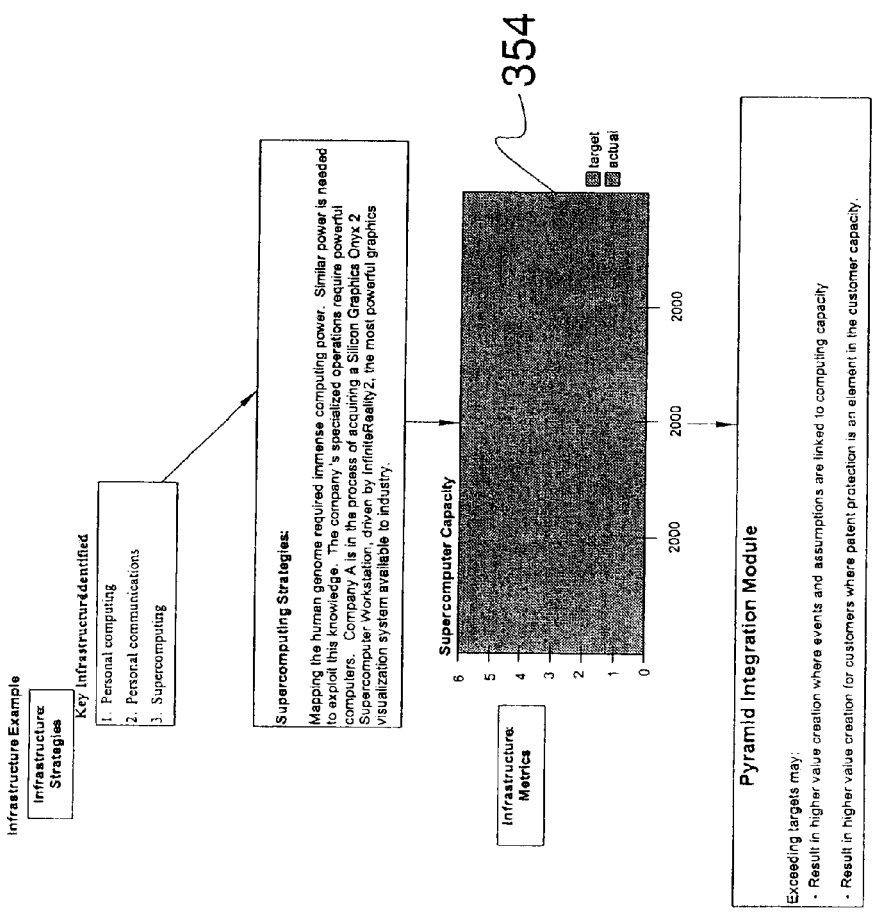
FIG. 9 illustrates a chart showing a comparison between targeted and actual values for supercomputing capacity, yet another non-financial outcome.
Figure 10:
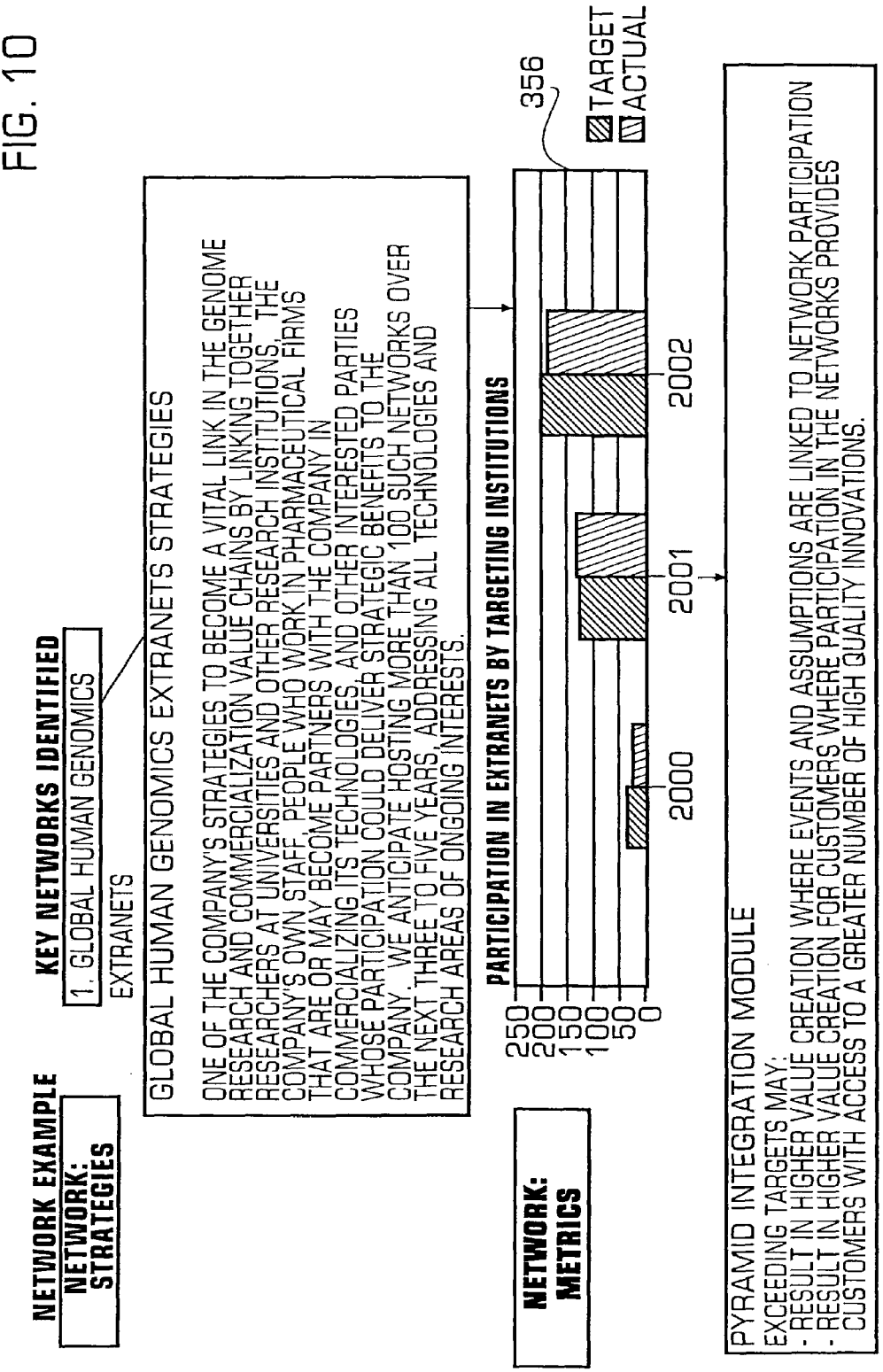
FIG. 10 illustrates a chart showing a comparison between targeted and actual numbers of extranets, a further non-financial outcome.

An example of a non-financial outcome in the above-described infrastructure metrics category is "supercomputing capacity." FIG. 9 illustrates a chart 354 showing a comparison between targeted and actual levels of normalized computing capacity, for example, measured in millions of instructions per second (MIPS). An example of a non-financial outcome in the above-described network metrics category is "global human genomics extranets." FIG. 10 illustrates a chart 356 showing a comparison between targeted and actual participation in extranets by targeted institutions.

As can be seen, these non-financial value streams and outcomes are not readily reducible to financial values, however, they may influence financial value streams. Thus, the non-financial value stream metrics and non-financial outcome metrics generated by the system can be grouped into two categories: those which produce outcome metrics that are themselves classified as events for purposes of generating financial value creation outcomes and hence, may result in modifications to financial value creation outcomes; and those which are not classified as events.

An example of a non-financial outcome which may, itself, be a event which influences a financial value stream is the annual IP filings metric, as discussed above. An event in the event/assumption matrix may be related to whether annual IP filings are significantly above or below a predefined threshold. An assumed variable related to this event may be future licensing revenue, which in turn will influence future financial value streams. Thus, if the non-financial outcome indicates that annual IP filings are above the predefined threshold, this fact may result in an increased probability that revenue will be derived from technology licensing activities. Accordingly, a probability applied to determine a present value of a future financial value stream, as explained herein, may be increased, which will, in turn, increase the present value for the corresponding value stream.

Another example of a non-financial outcome which may influence a financial outcome is the metric representative of employee respect and recognition, as discussed above. The performance of the company in meeting this expectation may be tracked, for example, by a survey of employees. An event in the event/assumption matrix may be related to whether such a survey reveals that company performance in this respect is significantly below or significantly above a defined threshold. An assumed variable related to this event may be employee productivity, which in turn may influence the amount and timing of future financial value streams. In addition, this metric of respect and recognition may also influence other non-financial value streams, such as that related to on-time performance.

Thus, events may be linked to non-financial metrics (and vice versa), including future non-financial value streams (e.g., stakeholder expectations with respect to value creation to the extent these are non-financial) and to non-financial outcomes in the capacity matrix (e.g., capabilities, infrastructure, networks). In addition, certain non-financial metrics, in turn, are defined as events in the event/assumption matrix and, hence, may influence future financial value streams in addition to future non-financial value streams.

As mentioned, non-financial outcomes may be determined based upon associated assumed variables and their influencing events. A formula matrix may be created for an enterprise and stored in the database 104 (FIG. 1A). The formula matrix may define, for example, what financial and non-financial value streams are to be modeled, what key scenarios must be examined in the event/assumption matrix, what key capabilities must be tracked in the capacity matrix, what the relevant stakeholder groups are that must be incorporated into the stakeholder matrix, etc. In other words, the formula matrix sets up the key parameters of the overall system.

Events and assumed variables are organized in several data structures. Events and assumed variables related to financial value creation outcomes are organized in the event/assumption matrix, as described above. Assumed variables relating to non-financial value streams or outcomes may be organized in a stakeholder matrix or a capacity matrix in the database 104. All assumed variables that have an influence on a future financial or non-financial value stream of the business enterprise are linked to at least one future or past event for each assumed variable that influences the corresponding assumed variable. Note that some assumed variables may be located in the capacity or stakeholder matrix, but may be linked to events in the event matrix. In addition, certain outcome metrics relating to capacity or stakeholders may be events in the event/assumption matrix.

Figure 22:
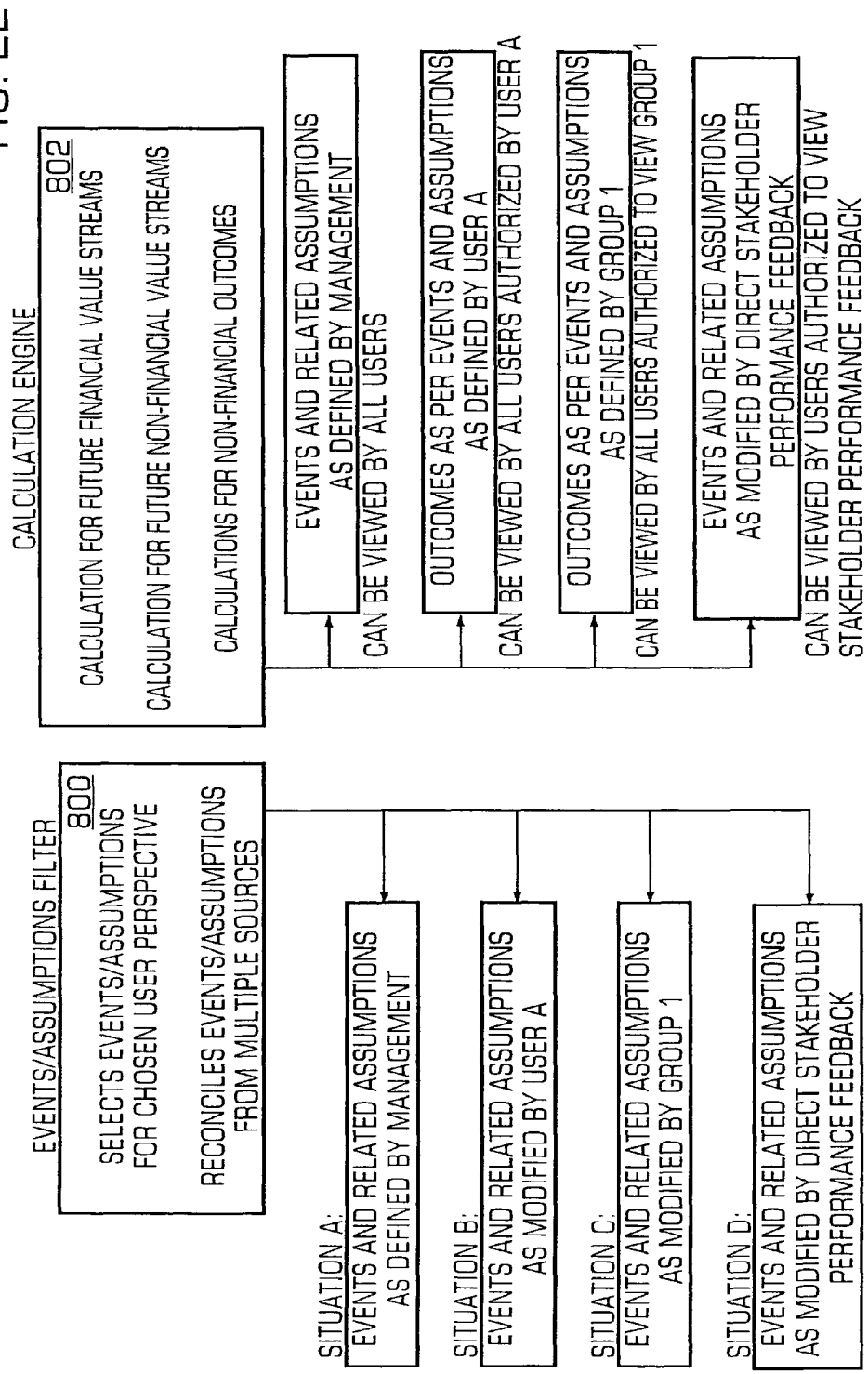
FIG. 22 illustrates an event/assumption filter and calculation engine for determining various different outcomes based on the stored assumptions of various users.

A generic formula for calculating a metric that represents a non-financial value stream or non-financial outcome may be given as follows:

$$\text{Non-financial outcome metric} = f(\text{assumed variables}_{1-n})$$

where n=the number of assumed variables linked to events that influencing the specified non-financial outcome. Thus, the non-financial outcome metric is a function of a number, n, of assumed variables. Software which controls the CPU 102 to determine the financial and non-financial outcomes as explained above is referred to herein as the "calculation engine" 400 (FIG. 22).

Figure 11:
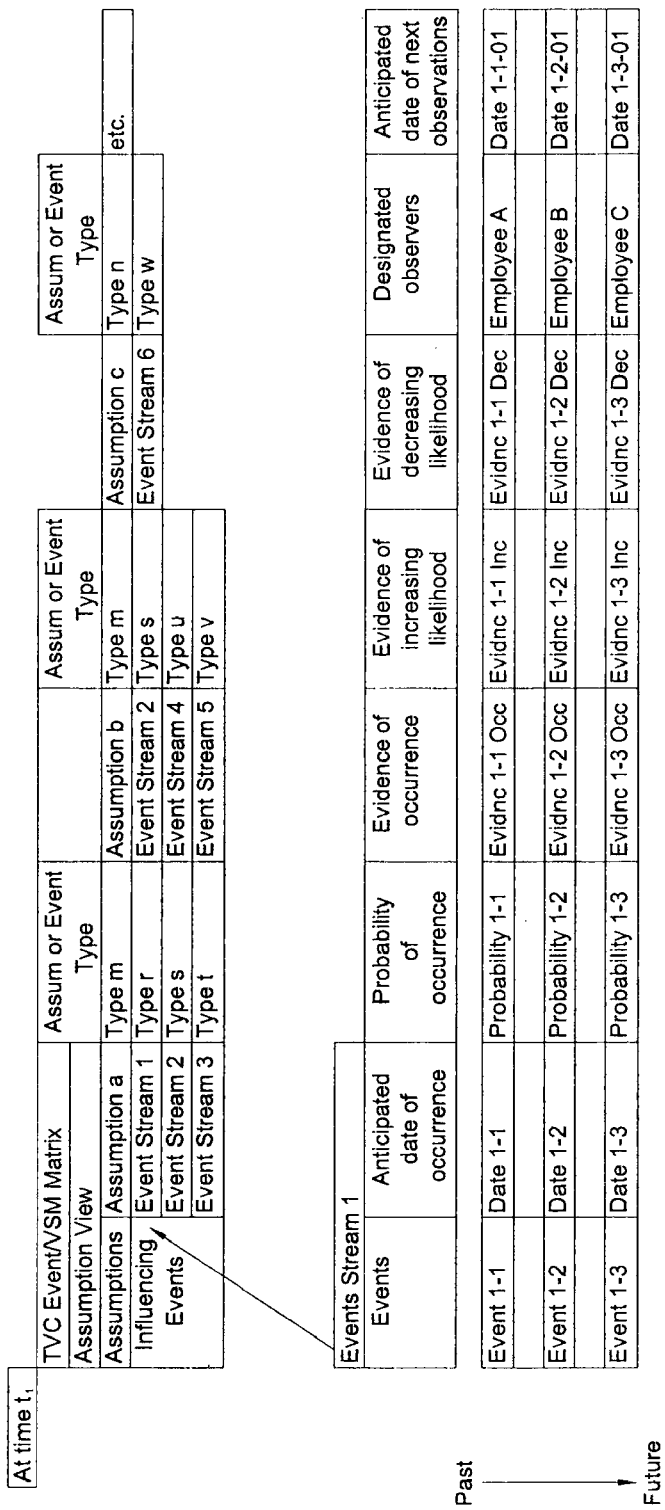
FIG. 11 illustrates an event matrix data structure for storing assumptions and their related events in accordance with the present invention when operating in value creation mode.

FIG. 11 illustrates an event matrix data structure 400 for storing assumptions (e.g., assumed variables) and their related events in accordance with the present invention when operating in value creation mode. As stated previously, the event matrix 400 stored in the database 104 (FIG. 1A) is a relational database in which assumptions, events, and their related probabilities are collected for both financial and non-financial value streams. The system 100 is event-driven. That is, each assumption is based on various projected events that are expected to influence the related assumption. If over a period of time, the projected future events all come to pass exactly as anticipated, then the assumptions in the matrix 400 remain unchanged. However, if a projected event does not occur, or if it occurs in a different way or to a different extent than originally projected, or if a previously unanticipated event occurs, then the related assumption may be modified in the matrix 400.

In FIG. 11, the matrix 400 contains the assumed variables that are utilized as a basis for computing the outcomes (e.g., present value for financial values streams or outcomes associated with non-financial value streams) of the future financial and non-financial value streams of the business enterprise, the related projected events (e.g., a related event stream) upon which the assumptions depend, and management's assessment of the probability of those events occurring. The assumption-event-probability relationships within the matrix 400 can be displayed in either of two ways. In an "assumption view," the system 100 presents the assumptions and, for each assumption, shows the influencing events. The assumption view is shown in FIG. 11. In an "event view," the system 100 focuses first on events and, then, for each event shows the "affected assumptions." The event view of the event matrix 400 is shown in FIG. 13.

As an illustration, FIG. 11 (assumption view) shows that "Assumption a" is influenced by Event Streams 1, 2, and 3, while "Assumption b" is influenced by Event Streams 2, 4, and 5. Note that more than one assumption may be influenced by the same event stream (e.g., both Assumption a and Assumption b may be influenced by Event Stream 2).

Each event stream can be further decomposed into specific component events in that stream. Thus, Event Stream 1 may include projected Event 1-1, Event 1-2 and Event 1-3. For each event, the matrix 400 may include additional information. This may include, for example,
an anticipated date of occurrence, a probability of occurrence (as assessed by management), what will constitute evidence of occurrence, if and when the event occurs, and, prior to the event actually occurring, evidence of increasing likelihood that it will occur. In addition, evidence of decreasing likelihood that it will ever occur may be included. Also, an observer may be designated who will be charged with the responsibility of assessing these early warnings (whether evidence of increasing likelihood or evidence of decreasing likelihood) and for observing actual evidence of occurrence if the event, in fact, occurs. These observer-reported observations regarding the event stream may be continuously fed into the matrix 400, which in turn will affect the assumptions and therefore the projected outcomes based upon computation of the present value. Because the occurrence or non-occurrence of an event may trigger a re-computation of one or more of the outcomes, the system 100 (FIG. 1A) may be said to be event-driven.

Figure 12:
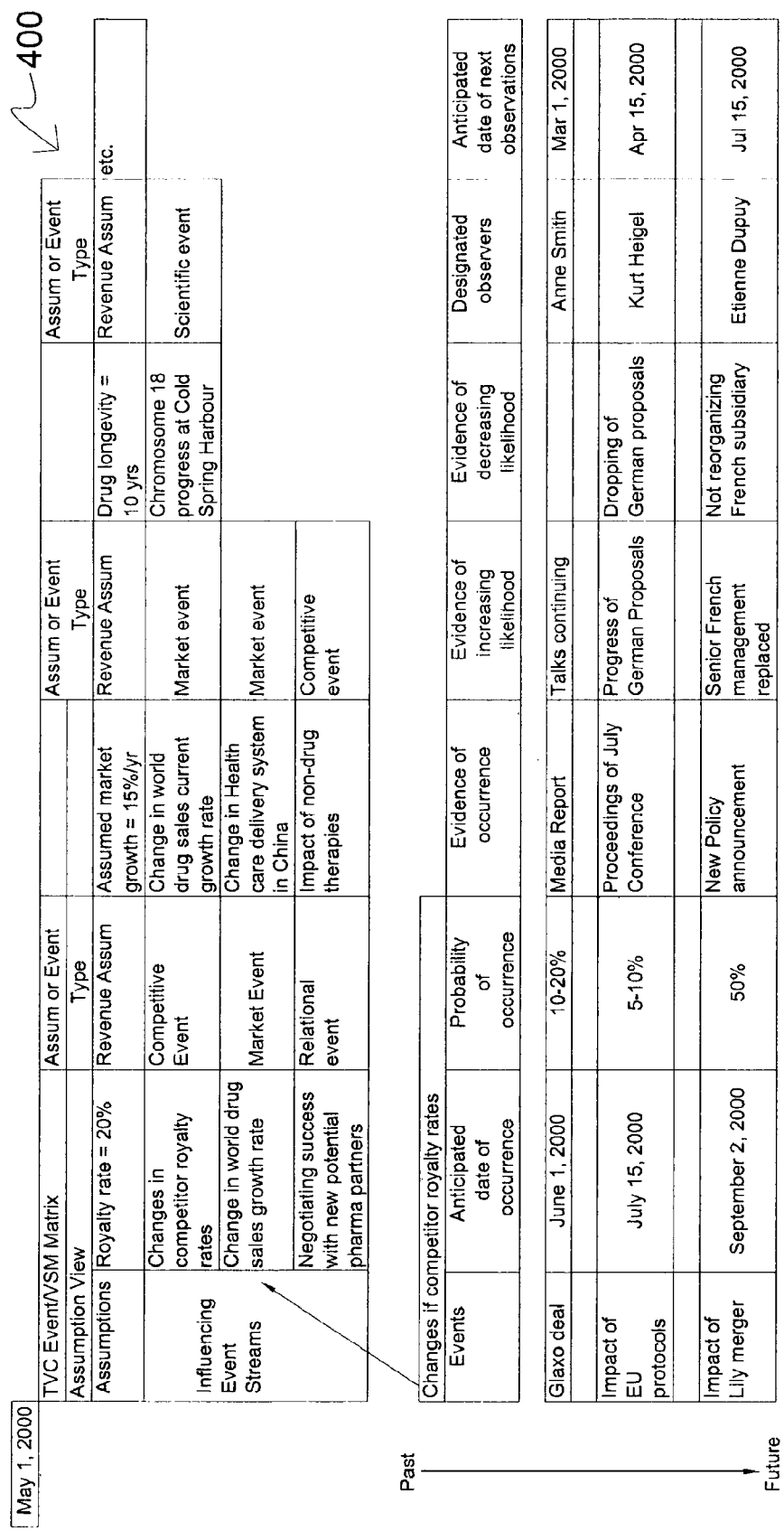
FIG. 12 illustrates the event matrix data structure of FIG. 11 including exemplary assumptions and related events.

FIG. 12 illustrates the event matrix data structure 400 of FIG. 7 including exemplary assumptions and related events. In this example of a small portion of the event matrix 400, i.e., three assumptions and their related events, are considered. One is the assumption that Company A will earn a royalty rate of 20%. This assumption, in turn, will be influenced by three identified event streams: changes in competitor royalty rates, which would influence Company A's negotiations with potential Big Pharma partners; changes in the growth rate of world drug sales (e.g., a markedly higher rate might put downward pressure on royalty percentages); and Company A's negotiating success with other new potential partners (e.g., success in other negotiations would make the assumed royalty rate more likely).

Another assumption in the example is the assumed market growth rate for bio-tech drugs of 15% a year. This is a relatively high growth rate but reflects the explosion of opportunities that are anticipated to follow the impending completion of the Human Genome Project (the complete mapping of the human genome). This assumed future growth rate will be influenced by three identified event streams: changes in the current growth rate of world drug sales (e.g., a downturn in the current rate would suggest the possibility of a lower than previously forecast future growth rate); a change in the health care delivery system in China (e.g., certain developments would open up that country for western bio-tech drugs, which would double or triple the potential market size); and the impact of non-drug therapies (e.g., if they increase in popularity, there may be a downturn in drug sales).

A third assumption in this small portion of the matrix 400 is the longevity assumption that a new Company A drug will last for 10 years after commercialization before it becomes obsolete as a result of a new, leap-frogging scientific discovery.

Each of the event streams can be further analyzed into specific component events in that stream. In this example, the event stream "changes in competitor royalty rates" contains at least three events. The rumored deal with a competitor (referred herein fictionally as "Company B") would raise the bar and generally lead to higher royalties. Such a deal might occur by Jun. 1, 2000 but Company A management attributes a probability to this happening of only 10% to 20%. If it ever occurs, it will be immediately publicized by the scientific media.

In the meantime, whether talks are continuing (increasing likelihood) or become stalled (decreasing likelihood) is something that designated observer "Anne Smith" is charged with the responsibility of monitoring. It is expected that the next relevant observation she can likely make will be around Mar. 1, 2000, although unexpected changes in timetable are possible. Another anticipated influencing event is the impact of new EU protocols that could have the effect of lowering royalty rates generally. Company A management estimates that there is only a 5% to 10% probability of these protocols ultimately being agreed upon. If they are adopted, it would most likely be on Jul. 15, 2000 following the July EU Conference. Evidence of increasing likelihood would be progress in the consideration of the recent German proposals while decreasing likelihood would be suggested if the German proposals get dropped. Designated observer, "Kurt Heigel" will be monitoring this situation and will likely have an updated observation to make by mid April.

Finally, the impact of a recent merger of another competitor (referred to herein as "Company C") could have a minor reducing influence on royalties and Company A management estimates the effect is 50% probable. The effect is anticipated to be more likely if it turns out that the French senior management team of Company C is replaced and less likely if it turns out that there will be no reorganization of the French subsidiary. A designated observer, "Étienne Dupuy" may be monitoring this situation and will likely have an updated observation to make by early July.

The event matrix 400 also characterizes each assumption by type. Having such an organized typology of assumptions helps to assure that all relevant assumptions have been identified and stated explicitly. Assumptions can be classified, for example, as: revenue assumptions; expense assumptions; discount rate assumptions; and timing assumptions.

Another aspect of the system 100 (FIG. 1A) may be an organized typology of events. For example, events may be characterized as follows: (a) enterprise events, which are internal to or involving the enterprise, and which include: relational events (e.g., negotiations with a potential strategic partner); operational events (e.g., the completion of Phase II clinical trials); contractual events (e.g., the signing of a royalty agreement); transactional events (e.g., the receipt of license fees); observational events (e.g., observations made during marketing research); and decisional events (e.g., the decision to drop Drug A and develop Drug B); (b) external events, which are wholly outside the enterprise but ultimately influencing it, and which include: market events, which affect an entire industry; competitive events (e.g., the threat of a newly successful competitor); and supply events, which affect the availability of needed resources; (c) event implications, which include: new opportunities, which are clearly indicated; new confirmatory evidence that the future is unfolding as previously assumed; new contradictory evidence that the future may not be unfolding as assumed; and new threats, which are clearly identified.

FIG. 13 illustrates an event matrix data structure for storing events and their related assumptions in accordance with the present invention when operating in value creation mode. As mentioned, in the event view, the system 100 (FIG. 1A) displays events and, then, for each event shows the affected assumptions. In this figure, the event streams shown are Event Stream 1, Event Stream 2, and Event Stream 3. The first affects Assumptions a, d, and e; the second affects Assumptions a, b, and f; the third affects only Assumption a.

In addition, assumptions (i.e. assumed variables) stored in the event matrix 400 (FIGS. 11-13) are preferably arranged in a hierarchy (referred to herein as an "assumption hierarchy"). Thus, an assumption at one level may be influenced by assumptions at one or more lower, more detailed, levels. These lower level assumptions may be considered "underlying assumptions" relative to the assumptions which are influenced by them. For example, management of the business enterprise may assess that the probability of a particular revenue-generating event occurring over a six-month period is 30% for the first month, 10% for the second month, 7% for the third month and 1% for each of the fourth, fifth and sixth months. These assumptions for the individual months are underlying assumptions relative to an overriding assumption that the event has a 50% probability of occurring within the six-month period (30%+10%+7%+1%+1%+1%=50%). This overriding variable of 50% and the underlying variables of 30%, 10%, 7%, 1%, 1% and 1% may be stored in the event matrix 400 and may be inserted into a calculation of present value for that particular value stream. If the first month passes without the event occurring, then the 50% value may be reduced to 20% (10%+7%+1%+1%+1%=20%) and the present value determined again based upon the new, lower probability.

The system 100 (FIG. 1A) may determine four types of outcomes for each stakeholder: financial value creation, which includes the Present Value of future value creation streams;
non-financial value creation, which includes appropriate metrics to reflect value streams that cannot be conveniently denominated in cash and cash equivalents; financial value destruction, which includes the Present Value of future value destruction streams; and non-financial value destruction, which includes appropriate metrics to reflect value destruction potential that cannot be conveniently denominated in cash and cash equivalents.

Figure 14:
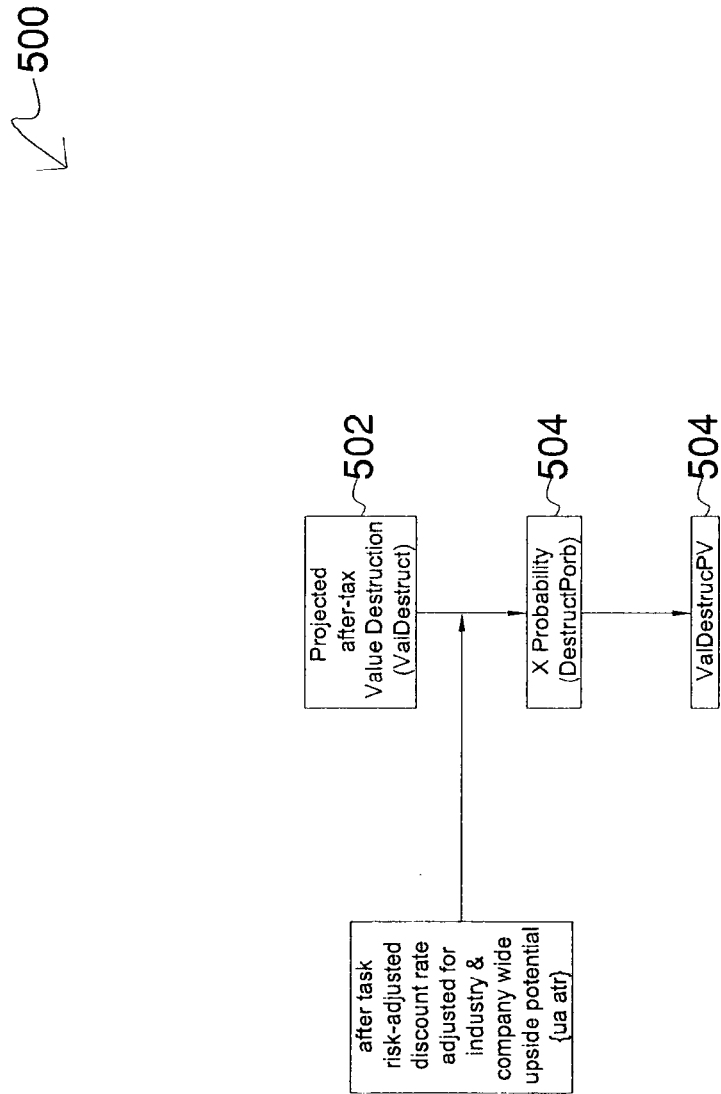
FIG. 14 illustrates a flow diagram for determining the effect on present value based on value destruction and its related probability in accordance with the present invention.

In any venture, there is always the potential for the loss of one's initial investment if the project fails. In such a case, the present value would be zero. However, it is not always that case that one's potential loss is limited to one's initial investment. Accordingly, the financial value destruction calculation is relevant in situations where the potential loss is greater than the investment at risk. FIG. 14 illustrates a flow diagram 500 for determining the effect on present value based on financial value destruction and its related probability.

The steps for calculating financial value destruction parallel those described herein for calculating financial value creation. In a state 502, a projected after-tax cash value is ascertained for a financial value destruction instance. Then, program flow moves to a state 504 where the cash value is adjusted by an ascertained probability that the value destruction will occur. For example, the cash value may be multiplied by the probability. From the state 504 program flow moves to a state 506. In a state 506, a result of the adjustment performed in the state 504 may be presented.

Figure 15:
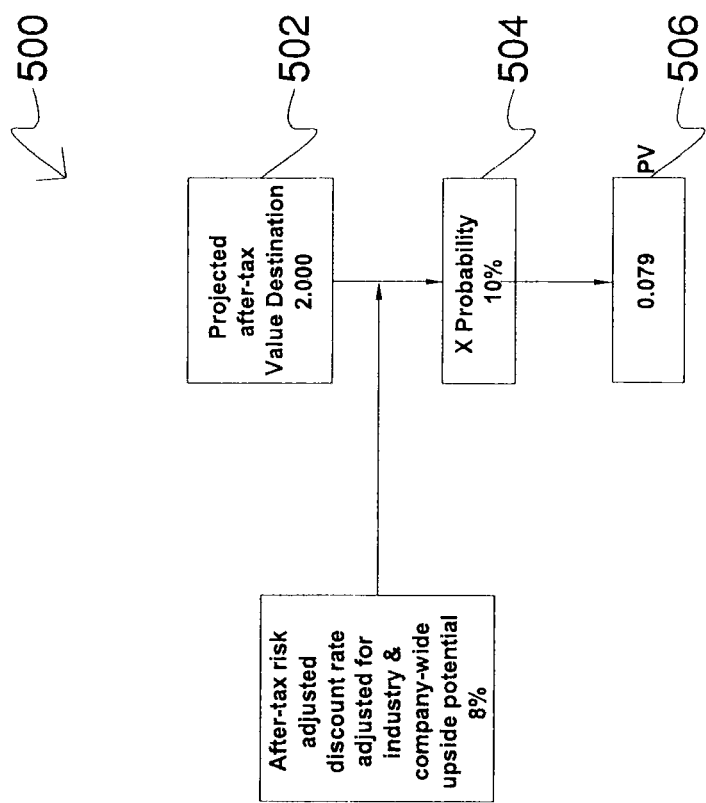
FIG. 15 illustrates the flow diagram of FIG. 14 including an exemplary value destruction and related probability.

FIG. 15 illustrates the flow diagram of FIG. 14 including an exemplary value destruction and related probability. In the value destruction example, Company A has become aware that under one scenario under consideration, if it decides to terminate a certain project, it risks losing one of its key lead scientists, which may in turn result in a loss of key contacts that are essential to the success of a second major project valued at $2 million. Thus, the cash value ascertained in the state 502 is $2 million. The probability attached to this combination of circumstances is 10%. Thus, in the state 504, when discounted at 8% (an after-tax non-risk adjusted discount rate, "ua_atr"), and multiplied by the 10% probability factor, the equation $$ValDestrucPV = \sum_{1}^{n} ValDestruc_i \times \left(\frac{1}{1 + \text{ua\_atr}}\right)^i \times DestrucProb$$

yields a present value of $79,000. This value may be presented as an outcome in the state 506.

Figure 16:
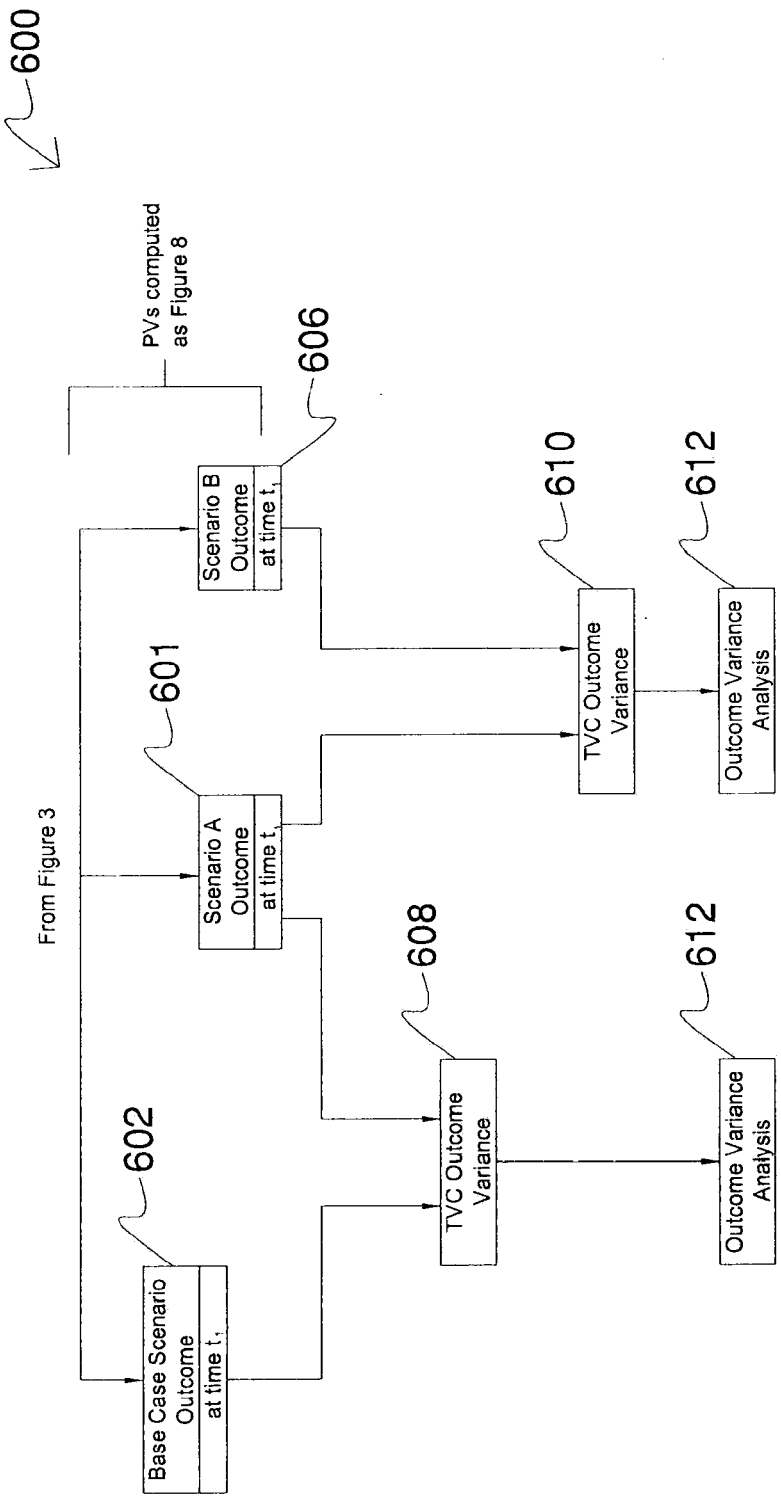
FIG. 16 illustrates a flow diagram for determining an outcome variance for different future scenarios in accordance with the present invention.

FIG. 16 illustrates a flow diagram for determining an outcome variance for different future scenarios in accordance with the present invention. In states 602, 604, and 606 outcomes, such as present values, for each of the base case scenario, and one or more additional scenarios (e.g., Scenarios A and B) may be determined, as explained herein. For tracking performance over time, the outcomes for the base case scenario may be determined with respect to a first point in time, while the outcomes for the alternate scenarios may be determined with respect to a later point in time.

Then, the various outcomes of these scenarios may be compared in states 608 and 610. This may be accomplished, for example, by determining an outcome variance using the following equation:
where $t_2 > t_1$:

$$\text{OutcomeVar}_{A>bc} = \text{TotNetPV}_A - \text{TotNetPV}_{bc} \times (1 + ra\_atr)^{(t_2-t_1)}$$

This equation is equivalent to taking the present value (PV) at the beginning of the period in question, and adding a cost of capital return (COCr), and comparing the result to the calculated present value (PV) at the end of the period.

If the outcome variance is zero, then the organization has earned exactly the returns expected during the period. Normally, however, there will be a difference between the actual present value (PV) and the expected present value (PV) after adding the cost of capital return.

A next step that may be performed by the system 100 (FIG. 1A) in the states 612 and 614 is an analysis of the changes in events and related assumptions that, in combination, account for the Outcome Variance. This analysis may be important to ensuring management accountability for the selection of events and assumptions in the event matrix 400 (FIGS. 7, 13).

A similar type of analysis can be performed to compare one or more scenarios at a particular point in time.
where $t_2 = t_1$:

$$\text{OutcomeComp}_{B>A} = \text{TotNetPV}_B - \text{TotNetPV}_A$$

In the case, the equation is used to compare the outcomes of the scenarios under comparison. A similar analysis of the reasons for the difference in outcomes can be performed to identify the critical differences in events and assumptions between the scenarios and may be important to strategic planning for the enterprise.

FIG. 17 illustrates an exemplary determination of outcome variance. In FIG. 17, using the example for Company A, the calculation of an outcome variance of $53.929 million is shown based on applying a cost of capital return (COCr) to the present value (PV) at the beginning of the period (i.e. an opening present value), and comparing the result to the calculated PV for the current period.

This is followed by an analysis of the changes in events and assumptions that account for the calculated difference. In this illustration, the difference is accounted for by changes in 8 events or related assumptions:

Five changes in events or related assumptions caused PV to be higher than previously calculated: (1) expected increase in future sales for BioInformatics Tool #4; (2) expected increase in biotech sales world wide (which will also results in an increase in Company A sales); (3) a revision upward of the expected sales for Biotech Drug #26; (4) an upward increase in general sales growth based on the world sales increases the previous; and (5) slightly higher investment income performance.

Three changes in events or related assumptions caused PV to be lower than previously calculated: (1) slight overrun in R&D spending; (2) an expectation that this overrun would continue into the future; and (3) a higher donation to the World Health Organization (because of the positive outcome variance).

Figure 18:
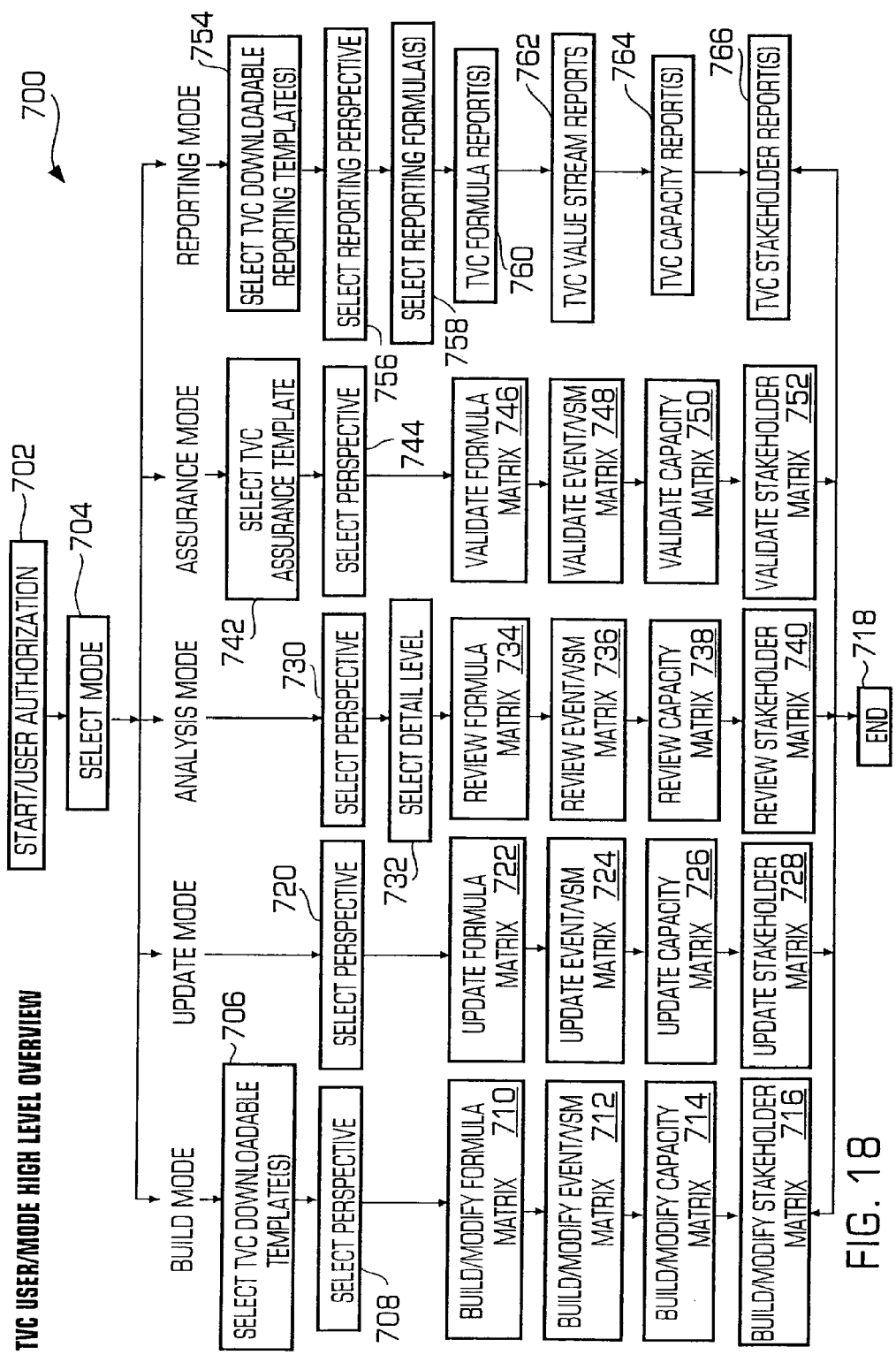
FIG. 18 illustrates a flow diagram for operation of the computer system of FIG. 1A including various modes of user interaction in accordance with the present invention.

FIG. 18 illustrates a flow diagram 700 for operation of the computer system 102 of FIG. 1A including various modes of user interaction in accordance with the present invention. Program flow begins in a start and user authorization state 702.

In the state 702, a verification of the identity of a user (e.g., a stakeholder-user) who is attempting to access the system 100 (FIG. 1A) may be determined. This may include, for example, obtaining the user's identity, verifying the user's password and checking and recording a time stamp for the user' session. In addition, the user may be restricted from performing certain actions based upon the user's identity. Thus, different users may have different levels of authorization. This may include restricting the user to only be able to view certain designated information in the various matrices, or allowing the user to also modify certain designated information. Further, the user may be restricted to a particular mode (e.g., build mode or analysis mode) and access method (e.g., intranet or extranet). In addition, the user may be restricted to a particular level of detail such that only certain designated levels of the assumption hierarchy may be unavailable to the user for viewing or making changes. Generally, however, a user may be permitted to store an alternate assumption for any of the assumptions that the user is authorized to view. Assuming that in the state 702, the stakeholder-user is authorized to proceed, program flow moves to a state 704.

The system 100 may support five different types of users when operating in value creation mode. These may include: builders, who may be building, installing or modifying the system 100; updaters, who may be updating information (e.g., assumed variables) stored in the database 104 (FIG. 1A); stakeholders, who may be using the system 100 to conduct analysis; assurers, who may have an responsibility to attest to the accuracy of information provided by the system 100; and reporters, who may wish to generate a report from the system 100. Accordingly, each user may be grouped or classified as a member of one of these groups or as a member of some other group, such as experts at value creation modeling, according to the user's identification.

To accommodate these users, the system 100 may operate in five different corresponding sub-modes of operation. The modes include: a build sub-mode, in which a builder may build, install or modify the system 100; an update sub-mode, in which a updater may update information in the database 104; an analysis sub-mode, in which a stakeholder may conduct analysis; an assurance sub-mode, in which an assurer may interact with the system in order to perform various assurance operations, and a reporting sub-mode, in which a reporter may generate various outcome displays. Accordingly, in the state 704, the user selects a sub-mode of operation for the system 100 (FIG. 1A) under which the user may interact with the system 100, including interaction with data stored in the database 104 (FIG. 1A).

The build sub-mode provides an interface by which the user may initialize the system 100 (FIG. 1A) for a particular business enterprise. Accordingly, the build sub-mode is generally a starting point for a user who is starting from scratch to build a data set for a particular business. This may include creating the event matrix 400, or other type of matrix in the database 104 (FIG. 1A).

More particularly, assuming the user selects the build sub-mode in the state 704, program flow moves to a state 706. In the state 706, the user may select a downloadable template from a plurality of such templates. For example, downloadable templates for various different industries, sectors, or functions performed by the enterprise may be pre-stored at a centralized location in the network 100 (FIG. 1A). For example, the templates may be downloadable from the Internet. Such a template may assist the stakeholder-user in using the build sub-mode by providing some of the information the database 104 (FIG. 1A) which the user would otherwise provide manually. This information could include assumptions that are typical for the industry or sector, and relevant to the functions performed by the enterprise, such as research and development, manufacturing, distribution, and so forth.

From the state 706, program flow moves to a state 708. In the state 708, the user may select one of the four perspectives on the business enterprise (e.g., data arrangements) in which the user desires to work in the build mode. As mentioned, these perspectives include: (1) information relating to the enterprise's value creation and realization formula; (2) information relating to the enterprise's value stream model; (3) information relating to value creation capacity of the business enterprise; and (4) information relating to value creation for multiple stakeholders of the business enterprise.

Assuming the user selects the value creation and realization formula, program flow may move to a state 710. In the state 710, the user may specify or modify the value creation and realization components for the enterprise. These may include, for example, success criteria, key decisions, major premises, value creation capacity components, and identification of key stakeholders.

Alternately, if in the state 708, the user selects the value stream model, program flow may move to a state 712. In the state 712, the user may specify or modify the value stream model for the enterprise. This may include, for example, identification of value streams and their related events and assumptions and specifying how outcomes (e.g., financial and non-financial) are to be determined based upon value creation and value destruction events.

If in the state 708, the user selects the value creation capacity, program flow may move to a state 714. In the state 714, the user may specify or modify the value creation capacity matrix for the business enterprise. This may include, for example, identifying components (e.g., capabilities, infrastructure and networks) needed by the enterprise to realize its value creation goals and identifying metrics for each of these components (e.g., capability metrics, infrastructure metrics and network metrics).

If in the state 708, the user selects value creation for multiple stakeholders, program flow may move to a state 716. In the state 716, the user may specify or modify the multiple stakeholders matrix for the business enterprise. This may include, for example, identifying relevant stakeholders (e.g., shareholders, customers, suppliers and distributors), and identifying appropriate value creation metrics for each (e.g., customer satisfaction levels or measures of how well the enterprise interacts with its suppliers and distributors).

From any of the states 710-716 program flow may move to an end state 718 in which the session with the stakeholder-user may terminate. Alternately, program flow may return to the state 704 where the stakeholder-user may select another mode of operation for the system 100 (FIG. 1A).

Assuming the user selects the update mode in the state 704, program flow moves to a state 720. In the state 720, the stakeholder user may select one of the four perspectives on the business enterprise in which the user desires to work in the update mode. The update sub-mode provides an interface by which a stakeholder-user to make updates to the data in the database 104 (FIG. 1A) for a particular business enterprise. This may include updating the event matrix 400 (FIGS. 11-13) as events occur that affect assumptions and related value streams. Alternately, this may include updating any of the other data, such as for the formula matrix, the capacity matrix or the multiple shareholders matrix, stored in the database 104.

If the user selects the value creation and realization formula, program flow may move from the state 720 to a state 722. In the state 722, the user may update information contained in the value creation and realization formula. This may include updating the success criteria, key decisions, major premises, capacity components and the stakeholder matrix.

Alternately, if in the state 720, the user selects the value stream model, then program flow moves to a state 724. In the state 724, the user may update existing information and may record new information in the event matrix 400 (FIGS. 11-13). This may include updating the events and assumptions as events occur and assumptions change over time. For example, a designated observer may make a change in response to the occurrence or non-occurrence of an event. This may also include the user selecting a level of detail to view and record value stream information, such as at a designated level in the assumption hierarchy (assuming that the user has authorization to access information at the requested level). In addition, the user may select a particular value stream out of several stored value streams Preferably, each entry in the event/assumption matrix 400 (FIGS. 11-13) (and the related assumptions in the capacity matrix and the stakeholder matrix) is tagged with a reference to the user who provided the information. For example, the user's identity may be stored in the database 104 (FIG. 1A) in association with each element of information which was provided by that user. Accordingly, the information may be arranged according to who provided the information. Thus, a complete set of entries may be tagged and grouped as provided by management of the business enterprise. This grouping can be considered a base case or "official" scenario.

Each other stakeholder-user, or group of users, may develop alternate scenarios. For example, a user may substitute one or more of their own assumptions for those of the base case scenario to develop an alternate scenario. Similarly, the alternate scenarios of individual users may be grouped. Accordingly, in the state 724, the user may also select a particular scenario, out of the base case scenario and several stored alternate scenarios, in which the user may change any information relating to a particular event or assumption. For example, FIG. 19 illustrates an exemplary arrangement of data in the event matrix 400 including some entries from the base case scenario and other entries from other users (in this case, Users A, B and C). The FIG. 19 shows that user identities are stored in association with their stored assumptions. Three events are depicted in the event/assumption matrix 400. Event 1 was defined by Management, as was Assumption a. Users B and C, however, have provided alternative values for Assumption a. Event 2 was defined by Management. Assumptions b, c, and d are related to Event 2, and no alternative values have been provided by users. Event 3, however, was added by User A, as was the related Assumption e. User B, who has been authorized to view the stored assumptions of User A, has defined an alternative value for Assumption e.

Figure 20:
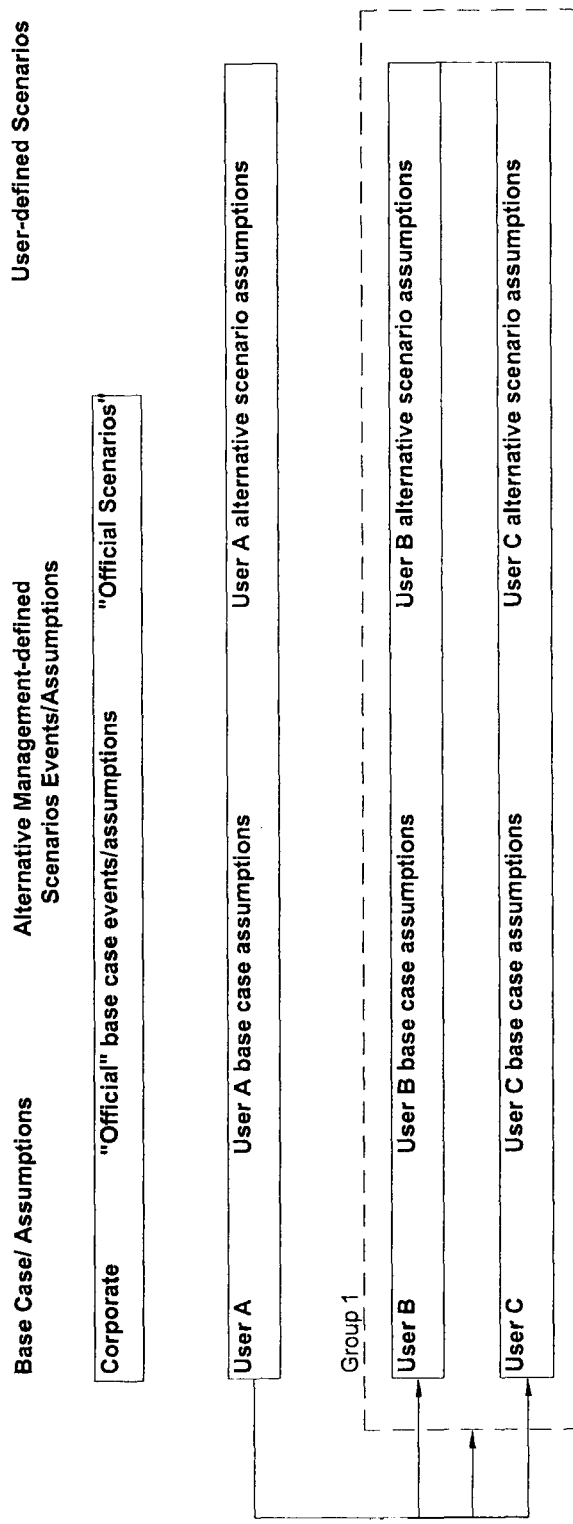
FIG. 20 illustrates groupings of information from the matrix 400 which was provided by various stakeholders.

FIG. 20 illustrates groupings of information from the matrix 400 which was provided by various stakeholders. This includes the official base case scenario and multiple alternate scenarios for stakeholder-users (in this case, User A, User B and User C). The alternate scenarios may be further arranged, as shown in FIG. 20, in groups according to the contributors of the alternate assumptions (in this case, Users B and C). Each stakeholder-user when using the system 100 may have an opportunity to specify what perspective to work with (e.g., formula, value stream model, capacity, or stakeholder perspectives) and to specify the particular user or group of users (e.g., the management perspective or the management perspective as modified by the selected user or user group) who provided the data that the user to work with. For example, User A can look at the alternations to the base case made by User B and C individually, and at the alterations to the base case of Users B and C as a Group (e.g., Group 1, as represented in FIG. 20 by the dotted line rectangle).

More particularly, each user, if authorized to do so, may choose to amend an "official" base case scenario, amend an official alternative scenario, or create their own alternative scenario. In addition, User A has the ability to view the combined changes made by a group of users—in this case, Users B and C. Further, User C may give permission for User A to review User C's customized scenarios. This functionality may limited to company insiders, or alternatively, made available to outsiders, and even, if the company uses the system 100 (FIG. 1A) to report information externally, investment analysts. In the preferred embodiment, each user is able to make changes to his or her alternative scenarios, but may only view the alternative scenarios of another user without making changes.

To facilitate grouping of contributions, users are preferably assigned to various user groups when first accessing the system 100. These groups may be used when authorizing users and groups of users to view stored assumptions and to make changes to them.

If, in the state 720, the user selects the value creation capacity, then program flow moves to a state 726. In the state 726, the user may update information contained in the capacity matrix of the database 104 (FIG. 1A). This may include, for example, updating the metrics for capabilities, infrastructure and networks or updating a specific capacity component. This may also include the user selecting a level of detail prior to updating information in the capacity matrix.

In the state 720, the user may also select updating the stakeholder matrix. In which case, program flow may move to a state 728. In the state 728, the user may update information contained in the stakeholder matrix of the database 104 (FIG. 1A). This may include, for example, updating stakeholder metrics or receiving feedback from the stakeholder regarding the value creation performance of the business enterprise from his or her perspective. Updating performed in the state 728 may also include the stakeholder-user selecting a level of detail at which the stakeholder information is presented and selecting a particular stakeholder perspective from among the various different stakeholders, prior to the user updating the information.

Figure 21:
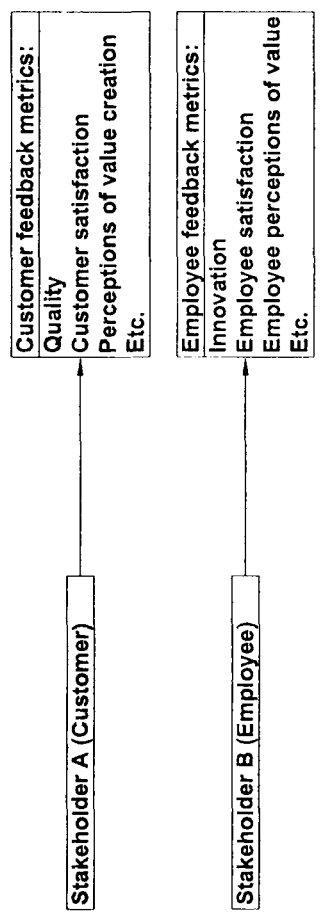
FIG. 21 illustrates various metrics for which feedback may be provided by users or stakeholders in accordance with the present invention.

The system 100 (FIG. 1A) may provide real-time data collection to encourage stakeholder-users to provide feedback on the performance of the organization from their perspective. Appropriate filters may be established to ensure that the data obtained is meaningful and representative. On-time performance can be used to illustrate the potential for direct performance feedback from stakeholders. Customers could be given the opportunity to provide their own feedback, from their perspective, on Company A's on-time performance. If their feedback confirmed the internal information maintained by the company, this feedback would serve the validate the calculations with respect to customer value creation. On the other hand, if the feedback from the customer stakeholders indicated significant differences from the company's internal information, this could be indicative of incorrect internal information, or alternative, incorrect perceptions on the part of customers. In either case, this information would alert Company A's management to the need for action to address the problem. FIG. 21 illustrates various metrics for which feedback may be provided by users or stakeholders in accordance with the present invention.

From any of the states 722-728, program flow may move to the end state 718, terminating the session with the stakeholder-user. Alternately, program flow may return to the state 704.

Assuming the user selects the analysis sub-mode in the state 704, program flow moves to a state 730. In the state 730, the user may select one of the four perspectives on the business enterprise in which the user desires to work in the analysis mode. The analysis sub-mode provides an interface by which a stakeholder-user may assess the value creation performance of the business enterprise by reviewing the various matrices in the database 104 (FIG. 1A), making changes (e.g., forming alternate scenarios) and, then, reviewing projected outcomes based upon the changes. Then, program flow may move from the state 730 to a state 732.

In the state 732, the stakeholder-user may select a level of detail in which the selected value creation information is presented. For example, the user may select a specific level in the assumptions hierarchy (assuming that the user has appropriate authorization). The user may also select to review information regarding the business enterprise as a whole or information regarding a specific value stream.

If the user selected the value creation and realization formula in the state 730, then program flow moves to a state 734. In the state 734, the user may then review information from the value creation and realization formula matrix stored in the database 104 (FIG. 1A). This may include, for example, reviewing the success criteria, key decisions, major premises, capacity components, information regarding key stakeholders, formula variance analysis information, benchmarking information and outcome displays in various formats.

Alternately, assuming that the user selected the value stream model in the state 730, then program flow moves to a state 736. In the state 736, the user may then review information from the event matrix which is stored in the database 104 (FIG. 1A). This may include, for example, selecting a specific value stream, scenario or time period for analysis. This may also include reviewing event entries, assumptions, benchmarking information, outcome displays in various formats and outcomes. The outcomes reviewed in the state 736 may include, for example, present and future, financial and non-financial, value creation determinations, value destruction determinations, and outcome variance determinations.

If, in the state 730, the user selects the capacity matrix for analysis, program flow moves to a state 738. In the state 738, the user may then review information from the capacity matrix stored in the database 104 (FIG. 1A). This may include, for example, selecting a specific capacity component (e.g., capabilities, infrastructure or networks). For each component, this may also include reviewing the associated metrics. In addition, in the state 738, the user may also review variance analysis, benchmarking and outcome displays in various formats for the capacity matrix.

Alternately, assuming that in the state 730, the user selects the stakeholder matrix for analysis, the user may review information from the stakeholder matrix. Accordingly, program flow may then move to a state 740. Analysis in the state 740 may include, for example, the user selecting a level of detail at which information regarding a stakeholder perspective is to be reviewed and selecting a specific stakeholder perspective from the several different stakeholder perspectives. Analysis in the state 740 may also include the user reviewing stakeholder metrics for the selected stakeholder perspectives. In addition the user may also review variance analysis, benchmarking and outcome displays in various formats for the stakeholder matrix.

FIG. 22 illustrates an event/assumption filter 800 and calculation engine 802 for determining various different outcomes based on the stored assumptions of various users. In calculating future financial and non-financial value streams, the system may select from the relational database 104 (FIG. 1A) entries that are tagged as contributed by the selected user or user group, and use those entries to feed into the calculation of financial and non-financial value streams and other non-financial outcomes.

As shown in FIG. 22, an event/assumptions filter 800 may be used to select from the event matrix 400 (FIGS. 11-13) of the relational database 102 the appropriate events and related assumptions. In the case of Situation A, the events and assumptions selected by the filter 800 are the ones defined by management of the business enterprise and, thus, represent the base case scenario. These events and assumptions may then be submitted to the calculation engine 802, which applies the various formulas and methods described herein for determining financial and non-financial outcomes. Thus, the outcomes are per the events and assumptions as defined by management.

In the case of Situation B, the event/assumptions filter 800 may select management-defined events and assumptions, except in the case where User A has stored one or more alternative assumptions, in which case those alternative assumptions will be used. Thus, the outcomes determined by the engine 802 are per the events and assumptions defined by User A.

In the case of Situation C, the event/assumptions filter 800 may select management-defined events and assumptions, except in the case where any member of Group 1 has stored an alternative event or assumption, in which case those stored alternative event or assumptions will be used. Accordingly, the outcomes determined by the engine 802 are as per events and assumptions as defined by Group 1.

In cases where more than one member of Group 1 has stored an alternative to a particular event or assumption, the default action of the event/assumptions filter 800 may be to select the stored alternative which represents the greatest difference from the management-defined event or assumption. The event/assumptions filter 800 may also be configured to use a calculated average or mean of stored events or assumptions for the selected group, and may be configured to prompt a user to make a specific selection among alternative stored events and assumptions. Further, the filter 800 may iterate through a number of calculations and produce a report showing a range of outcomes between the most pessimistic and most optimistic stored events and assumptions for the selected group.

Note that these selections and determinations may be done at different levels of detail, depending on the levels of detail is permitted to the user, as in state 702 (FIG. 18), or which the user has selected, as in state 732 (FIG. 18).

Situation D of FIG. 22 represents determination of outcomes based on direct feedback recorded from stakeholders on performance. As mentioned, where authorized (as in state 702 of FIG. 18), a stakeholder-user may be permitted to provide direct, real-time feedback to the enterprise on its performance with respect to that stakeholder's value creation expectations, as in state 728 of FIG. 18. For example, a stakeholder-user who is a customer that is authorized to provide direct performance feedback may have defined an expectation with respect to on-time performance. The system may determine an outcome for a future non-financial value stream with respect to on-time performance. An authorized stakeholder-user, in viewing the outcomes of the calculations with respect to on-time performance may also choose to substitute a different value, based on their own experience related to on-time performance, for the outcome that would otherwise be calculated by the system.

In this situation, the event/assumptions filter 800 may substitute the stakeholder-provided value, or where many stakeholders have provided feedback, may provide a sum or average (as appropriate) of the stakeholder-provided values, for the appropriate non-financial value streams. The calculation engine 802 may then determine financial and non-financial outcomes, as described herein based upon the stakeholder feedback.

From any of the states 732-740, program flow may move to the end state 718, terminating the session with the stakeholder-user. Alternately, program flow may return to the state 704 where the stakeholder-user may select another sub-mode of operation for the system 100 (FIG. 1A).

Together, the update and analysis modes provide user interactivity to make changes and view the results. Accordingly, the system 100 (FIG. 1A) may track user-defined assumptions and provide users with an ability to alter events and assumptions and see the impact of these changes on calculated outcomes for each group of stakeholders. Preferably, the stakeholder-users may record their altered assumptions so that their customized scenarios will be available for review on their next visit, or by other stakeholder users, and can be customized further.

In sum, several aspects of stakeholder-interactivity have been described including: a stakeholder-user storing events and assumptions that may be viewed and later modified on a subsequent visit; a stakeholder-user viewing the stored events and assumptions of other users or groups of users, and the outcomes of these stored events and assumptions, where authorized to do so; and management viewing a summary of stored events and assumptions to obtain the viewpoints of various groups of stakeholders regarding the management-defined events and assumptions. This may result in management reviewing and updating the management-defined events and assumptions as appropriate. In addition, a stakeholder-user may provide direct performance feedback to the enterprise on value creation performance. Management or other users may, in turn, determine the impact on calculated outcomes of substituting direct stakeholder feedback for the values otherwise calculated by the system 100 (FIG. 1A).

Returning to FIG. 18, assuming the stakeholder user selects the assurance sub-mode in the state 704, program flow moves to a state 742. The assurance sub-mode provides an interface by which stakeholder-users with assurance responsibilities may review results of various self-auditing routines and gather additional evidence necessary to support their attestation with respect to the value creation information. For example, this may include making sure there are no inconsistencies in the event matrix (e.g., inconsistent assumptions). In addition, this may include validating information in the database 104 (FIG. 1A) by performing benchmarking by which the value creation performance of the business enterprise is compared against other enterprises in the same industry, or with similar characteristics.

In the state 742, the stakeholder-user may select an assurance template. For example, the assurance template may be downloadable from a centralized database and may contain pre-programmed self-auditing routines that may be performed by the system 100 (FIG. 1A), and may also support the gathering of specific types of evidence to support an assurance opinion. From the state 742, program flow may move to a state 744. In the state 744, the user may select one of the four perspectives on the business enterprise upon which the user desires to obtain assurance-related information.

Then, if the user selects the formula matrix, program flow moves to a state 746 where selected assurance-related information may be obtained from, and selected assurance-related procedures, including self-auditing routines, may be applied to, the formula matrix in the database 104 (FIG. 1A). Alternately, if the user selects the event matrix, program flow moves to a state 748 where selected assurance-related information may be obtained from, and selected assurance-related procedures, including self-auditing routines, may be applied to, the event matrix in the database 104 (FIG. 1A). Assuming the user selects the capacity matrix, program flow moves to a state 750 where selected assurance-related information may be obtained from, and selected assurance-related procedures, including self-auditing routines, may be applied to, the capacity matrix. Alternately, if the user selects the stakeholder matrix, program flow moves to a state 752 where selected assurance-related information may be obtained from, and selected assurance-related procedures, including self-auditing routines, may be applied to, the stakeholder matrix.

From any of the states 746-752, program flow may move to the end state 718, terminating the session with the stakeholder-user. Alternately, program flow may return to the state 704 where the stakeholder-user may select another sub-mode of operation for the system 100 (FIG. 1A).

Assuming the stakeholder user selects the reporting sub-mode in the state 704, program flow moves to a state 754. The reporting sub-mode is one embodiment of an interface by which a stakeholder-user may generate various outcome displays regarding the value creation or value realization performance of the business enterprise. This may include, for example, generating various value creation outcome displays, generating accounting outcome displays which comply with the various accounting standards of different countries or standards-establishing entities, or generating outcome displays in other generally-accepted formats. Those skilled in the art will recognize that other outcome display generation schemes may be contemplated. The generation of outcomes displays will be described in more detail below.

In the state 754, the stakeholder user may select a reporting template. For example, the reporting template may specify available types of report formats which may be generated by the system 100 (FIG. 1A). From the state 754, program flow may move to a state 756. In the state 756, the user may select one of the four perspectives on the business enterprise from which the user desires to generate a report. Then, program flow moves to a state 758 where the user may select a specific reporting format from among several available formats.

From the state 758, program flow may move to a state 760 where selected outcome displays may be generated from the formula matrix in the database 104 (FIG. 1A). Alternately, if the user selects the event matrix, program flow may move to a state 762 where selected outcome displays may be generated from the event matrix in the database 104 (FIG. 1A). Assuming the user selects the capacity matrix, program flow may move to a state 764 where selected outcome displays may be generated from the capacity matrix. If the user selects the stakeholder matrix, program flow may move to a state 766 where selected outcome displays may be generated from the stakeholder matrix.

The foregoing has described operation of the system in value creation mode. A description of software architecture for operating in value realization mode to generate continuously updated outcome displays similar to those that might be generated by a traditional transaction-based accounting system follows below.

Figure 23:
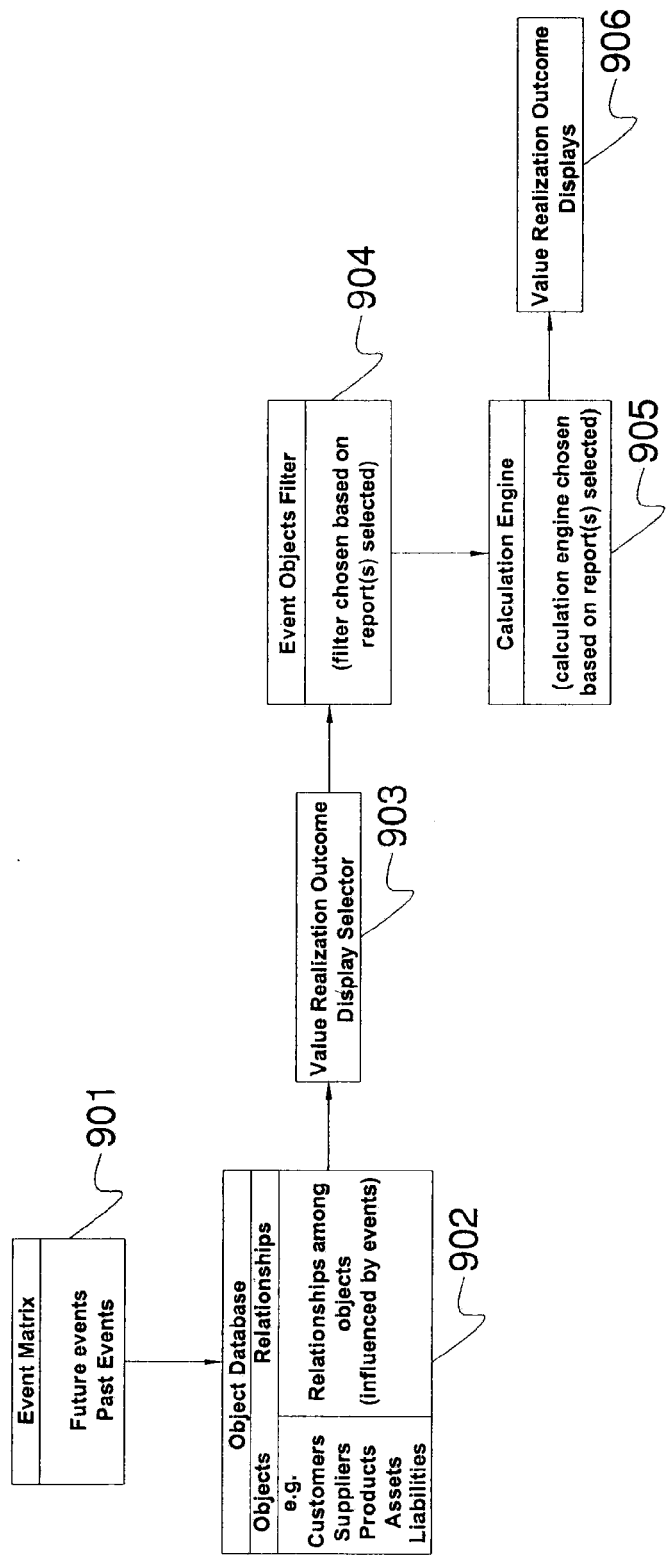
FIG. 23 illustrates a block diagrammatic view of a software architecture for enabling the system of the invention to operate in value realization mode.

FIG. 23 is a block diagrammatic view of a software architecture 900 for enabling the system 100 (FIG. 1A) of the invention to operate in a value realization mode. The software architecture 900 may include a number of software modules 901-905, each of which controls the CPU 102 to perform certain functions, as explained herein. The event matrix module 901 stores data with respect to future and past events. The object database module 902 stores information about various data objects and the relationships among those data objects. The value realization report selector module 903 enables a user to select among a number of alternative value realization outcome displays that the system is capable of generating. Based on the outcome displays selected by the user, the event/objects filter module 904 in combination with the calculation engine module 905 generates and displays the selected outcome displays. These modules will be described in more detail below.

FIG. 24 is a diagrammatic view of the event matrix module 901 of FIG. 23 illustrating an example of certain event attributes that may be utilized by the system while operating in value realization mode. Events in the event matrix 901 may be classified, for example, as future events 906a, and past events 906b. For each event in the matrix 901, information that may be recorded in the matrix 901 may include date information of initial entry of information into the matrix 907a, information identifying a user entering the information into the matrix 907b, date information of updating the information in the matrix 907c, information identifying a user entering updated information into the matrix 907d, assumption information 907f, event type information 907g, object relationship information 907h, and other information relating to an event record.

In FIG. 24 multiple event records are illustrated. For example, several past event records 906b are recorded in the matrix 901. Past event 99-4127 is illustrated as being entered into the matrix 901 on Jul. 2, 1999 by Alice C. Since the event has already occurred, it is a known order event and involved an order of 100 units of Product A by Customer A. Past event 99-4690 is illustrated as being entered into the matrix 901 on Jul. 20, 1999. Since the event has already occurred, it is a known manufacture event and involved the manufacture of 100 units of Product A. Past event 99-5201 is illustrated as being entered into the matrix 901 on Jul. 25, 1999 by John P. Since the event has already occurred, it is a known sale event and involved a sale of 100 units of Product A to Customer A. Past event 99-6374 is illustrated as being entered into the matrix 901 on Aug. 20, 1999 by Alice C. Since the event has already occurred, it is a known payment event and involved a $5,000 cash payment by Customer A for the purchased units. Accordingly, the events for a particular stream of transactions can be recorded in the event matrix 901.

The event matrix 901 also records future events 906a, as shown in FIG. 24. Future events 906a can be affected and updated accordingly by known event occurrences. For example, as shown in FIG. 24, future event 99-0 is illustrated as being entered into the matrix 901 on Jan. 1, 1999 as an assumed revenue event indicating 900,000 available units of Product A. After an order of 100 units was recorded in the event matrix 901 as described above, the future assumed revenue event 99-0001 is illustrated as being entered updating the event 99-0 information accordingly; in this case, updating the amount of available units of Product A. Other event stream information may be similarly stored and updated in the event matrix 901.

FIGS. 25A-C are respective diagrammatic views of object records that may be stored in the above described object database module 902. FIG. 25A is a diagrammatic view of a customer object record 908 that may be stored in the object database 902. Exemplary record fields for the customer object record 908 may include customer information, such as Name, Address, Contact information and other customer details, and event relationship identifiers that operate to dynamically link appropriate events stored in the event matrix 901 with particular object records stored in the object database 902. For example, in FIG. 25A, the customer object record 908 is shown having appropriate dynamic event identifiers relating to the information pertaining to Customer A stored in the event matrix 901 described above with reference to FIG. 24.

FIG. 25B is a diagrammatic view of a product object record 909 that may be stored in the object database 902. Exemplary record fields for the product object record 909 may include product information, such as name, components, price, cost, and other product details, and event relationship identifiers that operate to dynamically link appropriate events stored in the event matrix 901 with particular object records stored in the object database 902. For example, in FIG. 25B, the product object record 909 is shown having appropriate dynamic event identifiers relating to the information pertaining to Product A stored in the event matrix 901 described above with reference to FIG. 24.

FIG. 25C is a diagrammatic view of a financial object record 910 that may be stored in the object database 902. Exemplary record fields for the financial object record 910 may include cash information, such as bank name, address, contact information, and account number, and event relationship identifiers that operate to dynamically link appropriate events stored in the event matrix 901 with particular object records stored in the object database 902. For example, in FIG. 25C, the financial object record 910 is shown having appropriate dynamic event identifiers relating to the information pertaining to payment events stored in the event matrix 901 described above with reference to FIG. 24. Other object records can be created and the above are merely exemplary.

Figure 26:
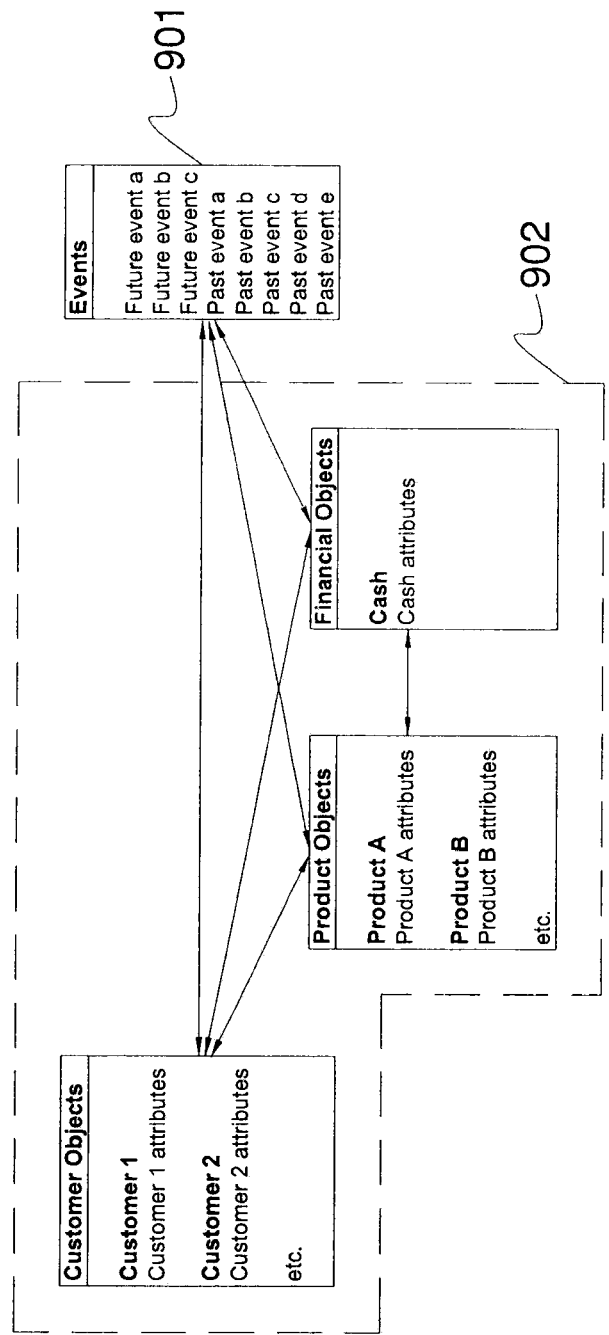
FIG. 26 is a diagrammatic view illustrating interaction between the event matrix module and the object database module for generating value realization outcome displays in accordance with the invention.

FIG. 26 is a diagrammatic view illustrating interaction between the event matrix module 901 and the object database module 902 shown in FIG. 23 for generating value realization outcome displays in accordance with the invention. This interaction can be illustrated by the following example. Assume that Company A manufactures Products A and B. Assume also that Customer 1 is a customer of Company A. Consider the following illustrative event stream as follows: (a) Customer 1 places an order with Company A for 100 units of Product A at $50 each; (b) Company A completes the manufacture of the 100 units of Product A that were ordered, at a unit cost of $25 each; (c) the 100 units of Product A are shipped to Customer 1, and an invoice is issued by Company A to Customer 1 for $5,000; (d) Customer 1 remits payment to Company A in the amount of $5,000.

In describing how the value realization mode of the present invention processes this event stream, it is useful to draw a contrast between the present invention and a traditional transaction-based accounting system. In such a traditional transaction-based accounting system, this event stream would normally be represented by two transactions as follows:

On shipment of the goods, the following entry would be made in the books of account:
Dr. Accounts receivable $5,000
Cr. Sales $5,000
Dr. Cost of goods sold $2,500
Cr. Inventory $2,500

On receipt of payment for the goods, the following entry would be made in the books of account:
Dr. Cash $5,000
Cr. Accounts receivable $5,000

By contrast, in the value realization mode of the present invention, this event stream may be recorded by modifying the relationships among events and objects in the event matrix 901 and object database 902. For example, assuming that in the current year (i.e., 1999), event A may be assigned an identification number 99-4127, event B may be assigned an identification number 99-4690, event C may be assigned an identification number 99-5201, and event D may be assigned the identification number 99-6374. These events are illustrated as being recorded in the event matrix 901 shown in FIG. 24 and described above.

Accordingly, for example, upon the occurrence of event A (99-4127), the system 100 (FIG. 1A) may record the particular event details of event A in the event matrix 901. The system 100 may also modify the attributes of the object record Customer A to include an event identifier reference to event A in the event matrix 901, and may modify the attributes of the object record Product A to include an event identifier reference to event A in the event matrix 901. Similarly, upon the occurrence of event B (99-4690), the system 100 (FIG. 1A) may modify the attributes of the object record Product A to include an event identifier reference to event B in the event matrix 901.

Upon the occurrence of event C (99-5201), the system 100 (FIG. 1A) may modify the attributes of the object record Customer A to include an event identifier reference to event C in the event matrix 901, and may also modify the attributes of the object record Product A to include an event identifier to event C in the event matrix 901. Since in value creation mode the system 100 (FIG. 1A) may have recorded as a future event that Customer A would purchase a certain quantity of goods from Company A, upon the occurrence of that known event (the purchase of some goods), the future event may be modified accordingly. Similarly, upon the occurrence of event D (99-6374) the system 100 (FIG. 1A) may modify the attributes of the object record Customer A to include an event identifier reference to event D in the event matrix 901, and may modify the attributes of the financial object record Cash to include an event identifier reference to event D in the matrix 901.

Further assume that after event C, a user makes a request for a value realization outcome display from the system 100 (FIG. 1A). Among the alternative outcome display formats presented to the user by the value realization report selector 906 (FIG. 22) is an outcome display on the status of the object Accounts Receivable. Outcome display generation is described in more detail below.

Figure 27:
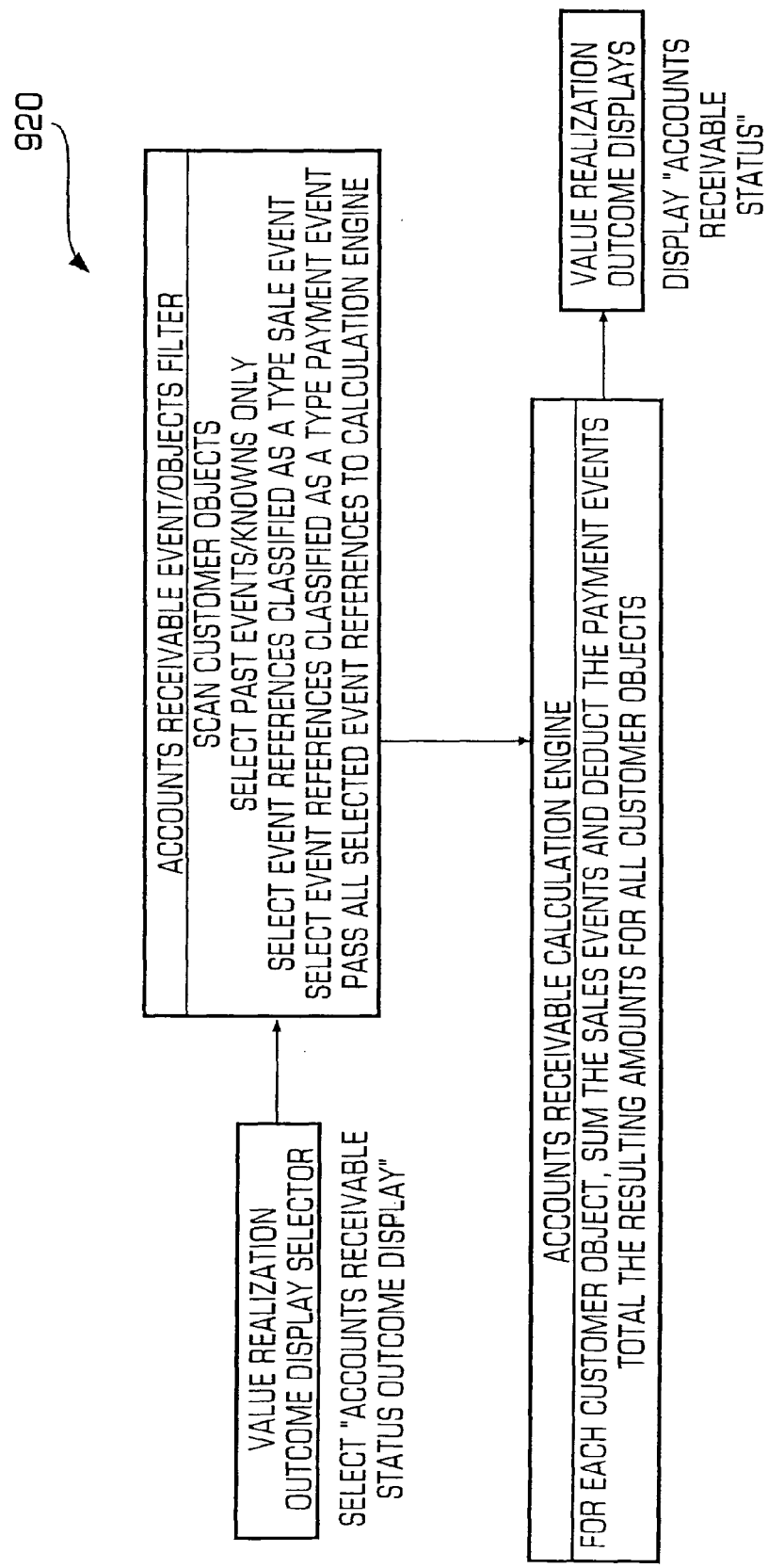
FIG. 27 is a diagram illustrating a process flow for generating value realization outcome displays in accordance with the invention.

In a traditional transaction-based accounting system, a report on the status of accounts receivable would be generated by printing out the accounts receivable subledger of the general ledger. In the value realization mode of the present invention, a report on the status of accounts receivable may be generated by applying an appropriate Event/Objects filter 904 to the event matrix 901 and passing the appropriate information to a calculation engine 905 as shown in FIG. 27.

Thus, in accordance with the example given above, an event/objects filter module 904 may scan the customer record object attributes for each customer and the associated event matrix 901, selecting past events (i.e., known results) from the event matrix 901, select event identifier references for sales and payment event types (other event types can be selected depending on the report desired), and pass the selected event identifier references (and their associated information) to the calculation engine 905. The calculation engine 905 may, for each customer object record, calculate the appropriate amounts related to each particular event and determine an accounts receivable report. The resulting outcome display may be presented to the user.

A similar procedure could be used to generate other value realization outcome displays, such as inventory status, sales summary, complete financial statements, and virtually any other report that is generated by a traditional transaction-based accounting system. For example, inventory status outcome displays can be generated by applying a filter that selects product object records, and filters purchase, manufacture and sales events, passing the filtered records to the calculation engine 905 for generating the value of the inventory. Similarly, a sales summary can be generated by applying a filter that selects customer object records and filters sales events for a particular period, passing the relevant information to the calculation engine 905 for generating the value of sales for the specific time period. Other outcome displays may be generated using a similar technique of filtering relevant information.

Complete financial statements as of specified time in accordance with generally-accepted accounting principles may be generated, for example by applying associated filters to summarize the various events and object relationships that comprise the balance sheet and the income statement, and a calculation engine that incorporates within it the rules and conventions embodied in GAAP as currently defined by the relevant authorities.

Note that the system 100 (FIG. 1A) can be configured such that an updated version of any selected outcome display report can be created whenever an event takes place. That is, the process of applying the appropriate event/object filter and applying the calculation engine can be made to be continuous, updating the result based on each new event. Consequently, the system 100 can therefore be described as capable of producing continuously updated value realization outcome displays.

An advantageous difference between the value realization mode of the present invention and a traditional transaction-based accounting system is that in the present invention the relationships among events and objects are a central focus of the system. In the event-based system 100 (FIG. 1A) objects may include customers, products available for sale, financial objects, such as cash, etc. Objects such as these are in effect constants; what changes is the relationships among them and the events in the event matrix 901. As events take place, the system redefines these relationships.

By contrast, in a traditional transaction-based accounting system, what is central is the transactions as they are recorded in the various journals and subledgers. All processing is built around transactions, combining them in various ways.

The foregoing demonstrates that the same event-based system architecture can be deployed in value creation mode to generate outcome displays that provide a forward-looking perspective on value creation performance of a business enterprise, and in value realization mode to provide a historical perspective on value realization performance of a business enterprise. A traditional transaction-based accounting system, however, is only capable of generating outcome displays on historical value realization. Combining the capability to generate value creation and value realization information from a single system provides an important benefit to business enterprises.

Figure 28:
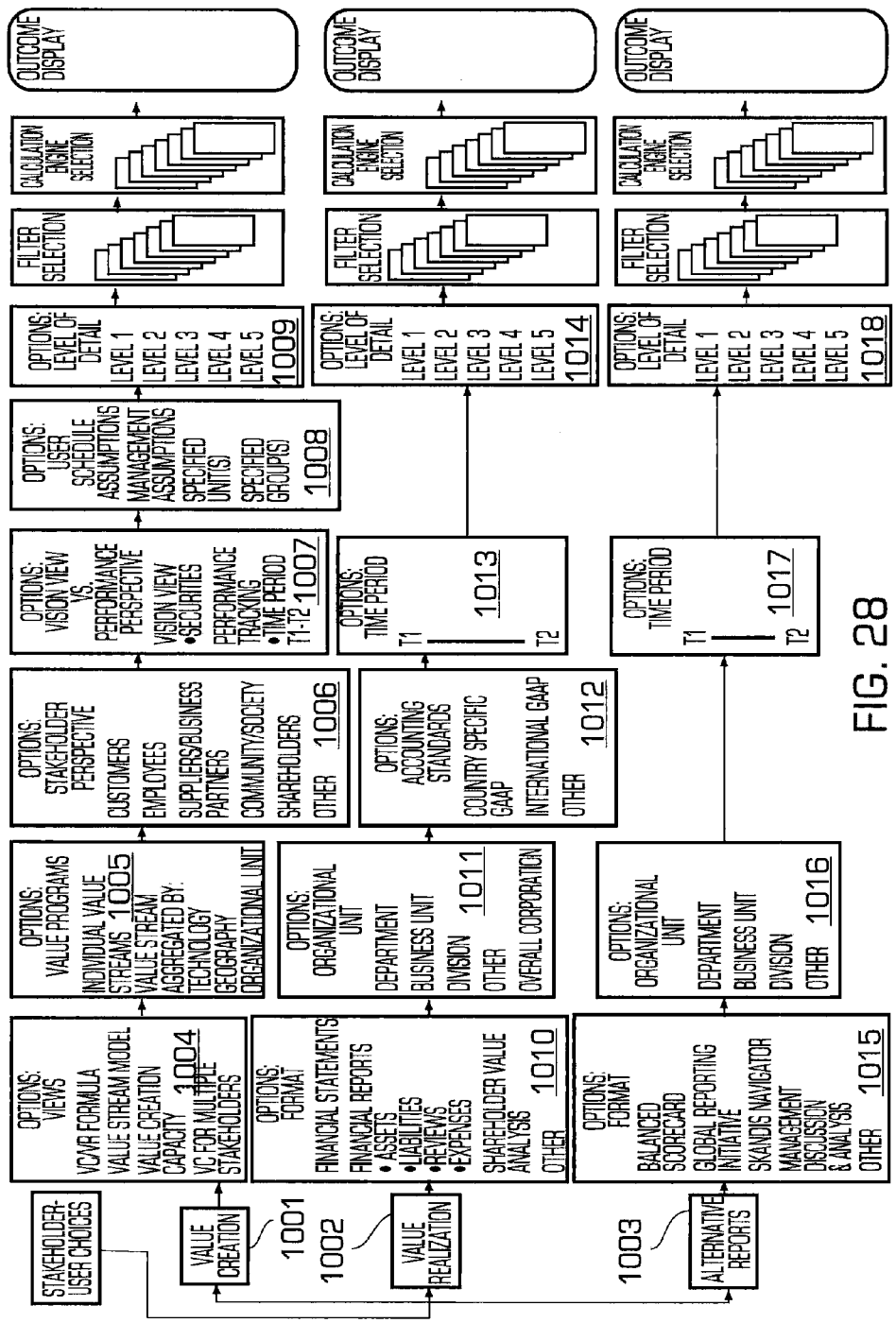
FIG. 28 illustrates an example of outcome display generation using an outcome display interface for formatting customized outcome displays based on choices made by a stakeholder-user using the invention.

FIG. 28 illustrates an example of an alternative scheme for generating outcome displays using an outcome display interface for formatting customized outcome displays based on choices made by a stakeholder-user using the invention. As shown in FIG. 28, choices relating to reporting mode may be selected by a user. Choices available may include value creation mode 1001, value realization mode 1002, or alternative reporting mode 1003. If a stakeholder-user selects value creation mode 1001, a user may select a reporting view that the stakeholder-user wishes to access 1004. Choices available to the stakeholder-user may include value creation/value realization formula, value stream model, value creation capacity, or value creation for multiple stakeholders. Other choices may also be available and the above are merely exemplary.

The user may also select value stream reporting options 1005. Available choices may include viewing a single value stream, in which case the options may include each value stream in the system, or viewing the value streams aggregated by technology, geography, or organizational unit. Other options may also be available and the above are merely exemplary.

A user may also select stakeholder perspective reporting options 1006. Choices within stakeholder perspective include customer perspective, employee perspective, supplier/business partner perspective, community/society perspective, shareholder perspective, or other stakeholder perspectives as may be available in the system.

A user may also select whether the system is operating in vision view versus performance tracking view 1007. In the case of vision view, the stakeholder-user may be asked to select one or more scenarios from a list of future scenarios that are available for comparison. The system may calculate outcomes for the chosen scenarios as described herein. In the case of performance tracking view, the user may specify any dates for generating a view. The system may calculate outcomes based on the events occurring between those time periods as described herein.

A user may also select different assumptions that the shareholder-user wishes to access 1009. Choices include viewing outcomes reflecting the official management events and assumptions, viewing results reflecting the changes to events and assumptions made by one or more specified users, and viewing the changes to events and assumptions made by one or more specified groups. Other selectable assumptions may also be available and the above are merely exemplary.

A user may also choose the level of detail that the stakeholder-user wishes to view. Choices may include a range of levels of detail between the highest (Level 1) view (minimum detail) to the lowest (Level 5) view (maximum detail). Users may make any of the above selections by interacting with the system 100, such as, for example, by selecting from available choices using a touchscreen or other interactive display device, or by selecting from available menus using an I/O device. Based on all of the foregoing choices, the system 100 (FIG. 1A) may select the most appropriate event/assumption filter 904 from among all the available value creation mode filters. Additionally, the system 100 (FIG. 1A) may select the most appropriate calculation engine 905 from among all of the available value creation mode calculation engines. For example, one of the calculation engines may contain the formula needed to generate a value stream model from a customer perspective. The selected filter 904 and calculation engine 905 may then generate the desired outcome display in accordance with the stakeholder-user choices, as described above. The outcome display reflects results based on all the events in the system 100 that match the chosen filter. Furthermore, as long as the user wishes to continue viewing a particular outcome display, the outcomes can be updated in real-time based on the occurrence of any additional events that fall within the parameters established by the event/assumption filter.

If the stakeholder-user chooses value realization mode from the different reporting modes, the user may select from different report formats that the user wishes to access 1010. Report format choices may include financial statements, financial outcome displays (which may include a variety of reports relating to assets, liabilities, revenues or expenses), shareholder value reports, or other value realization related reports as are available in the system.

A user may also select organizational unit outcome displays 1011. Available organizational unit outcome displays may include viewing outcome displays relevant to a particular department, business unit, division, other structure, or the overall corporation as a whole. Other reports may also be available and the above are merely exemplary.

A user may also select different accounting standards to use for report generation. Available standards may include that applicable to a particular country—e.g., U.S. GAAP, Canadian GAAP, etc., or that using international GAAP. Other standards may also be selected.

A user may also select time period criteria for reporting 1012. The stakeholder-user may select from different dates to generate outcome displays. Another available selection relates to the level of detail that the stakeholder-user wishes to view 1013. Choices may include a range of levels of detail between highest (Level 1) view (minimum detail) to lowest (Level 5) detail (maximum detail). As described above, users may make any of the above selections by interacting with the system 100, such as, for example, by selecting from available choices using a touchscreen or other interactive display device, or by selecting from available menus using an I/O device. Based on all of the foregoing choices, the system 100 may select the most appropriate event/object filter 904 from among all the available value realization mode filters. In addition, the system 100 may select the most appropriate calculation engine 905 from among all the available value realization mode calculation engines. For example, one of the calculation engines may contain the formulae that are necessary for generating a traditional accounting financial statement. The selected filter 904 and calculation engine 905 may then be used to generate the outcome display in accordance with the stakeholder-user choices. The outcome display reflects results based on all the events in the system that match the chosen filter. Furthermore, as long as the user wishes to continue viewing a particular outcome display, the outcomes can be updated in real-time based on the occurrence of any additional events that fall within the parameters established by the event/object filter.

If the stakeholder-user selects the alternative reporting mode, the user may select a reporting format that the stakeholder-user wishes to access 1015. Available choices may include a balanced scorecard report, a report in accordance with the guidelines of the global reporting initiative, a report in accordance with the format developed by Skandia (called the Skandia Navigator), a management discussion and analysis report (MD&A), or any other generally accepted reporting format which is available in the system.

The user may also select to generate a report for a particular organizational unit 1016, such as reports relevant to a particular department, business unit, division, other structure, or the overall corporation as a whole. Another choice relates to time period 1017. The stakeholder-user may select particular dates to generate outcome displays.

The user may also select the level of detail that the stakeholder-user wishes to view 1018. Available choices include a range of levels of detail between the highest (Level 1) view (minimum detail) and the lowest (Level 5) view (maximum detail). Users may make any of the above selections by interacting with the system 100, such as, for example, by selecting from available choices using a touchscreen or other interactive display device, or by selecting from available menus using an I/O device. Based on all of the foregoing choices, the system 100 (FIG. 1A) may select the most appropriate event/object filter 904 from among all of the available alternative reporting mode filters and may select the most appropriate calculation engine 905 from among all of the available alternative reporting calculation engines. For example, one of the calculation engines may contain the formulae that are necessary for generating a balanced scorecard report.

The selected filter 904 and calculation engine 905 may be used to generate the outcome display in accordance with the stakeholder-user choices. The outcome display reflects results based on all of the events in the system that match the chosen filter. Furthermore, as long as the user wishes to continue viewing the particular outcome display, the outcomes can be updated in real-time based on the occurrence of any additional events that fall within the parameters established by the event/object filter as described herein.

Figure 29:
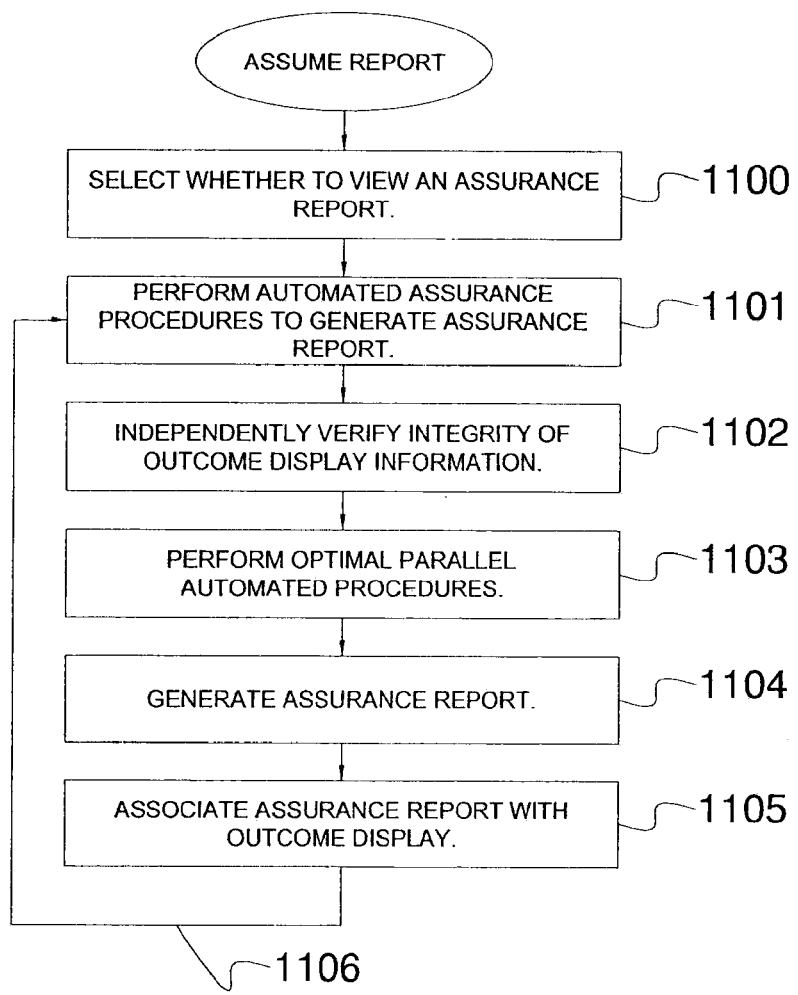
FIG. 29 is a flow chart illustrating an exemplary method by which a customized assurance report on an outcome display may be generated in real time based on various automated procedures in accordance with the invention.

FIG. 29 is a flow chart illustrating an exemplary method by which a customized assurance report on an outcome display may be generated in real time based on various automated procedures. Once a particular outcome display has been generated as described above, a stakeholder-user may make a choice as to whether the stakeholder-user wishes to view an assurance report (Step 1100). In some cases, they may also be able to choose among higher or lower levels of assurance.

Assuming a stakeholder-user chooses to view an assurance report, the system may perform a number of automated assurance procedures (Step 1101) to generate an assurance report. For example, the system may verify that the filter 904 and calculation engine 905 used to generate the outcome display are the appropriately associated given the stakeholder-user's outcome display parameter selections. The system may also verify the mathematical accuracy of the calculations performed by the calculation engine 905, and may verify that the outcome display information properly reflects any authoritative standards, such as U.S. GAAP or the like. The system may also verify the integrity of the underlying data in the database, through such procedures as event-assumption-object relationship tests, which ensure that all objects and assumptions are linked to events (and vice-versa), event-assumption-object consistency tests, which ensure that there are no inconsistencies between event-assumption or event-object relationships, assumptions limits tests, which ensure that all assumptions fall within limits established when they were first established (i.e., a market share assumption would be set such that it could not exceed 100%), outcome limits tests, which ensure that the outcomes calculated by the system fall within reasonable limits established during system installation, data validation tests, which ensure that all data in the system fall within specified parameters, and other tests as applicable.

To provide an assurance report on an outcome display, a number of assurance procedures may be independently performed to verify the integrity of the information provided in the outcome display (Step 1102). This may be performed by an individual assurance provider, or alternatively, this functionality may be provided automatically in the system. Exemplary assurance procedures might consist of manual or automatic tests performed at various times throughout a year to test the accuracy of information in the company's database. In addition to these tests, software may execute in parallel with that running on a client computer network, allowing an assurance provider to perform a number of parallel automated procedures (Step 1103), such as those described above.

Assuming the stakeholder-user has selected to view an assurance report, the report may be generated (Step 1104) by the parallel software running on the assurance provider's network. Alternatively, the assurance report may be generated by the system itself. The assurance report may be assembled from a library of assurance report components in accordance with decision rules established by the assurance provider, and which will be described in more detail below. For example, assurance report components may include records relating to the level of assurance detail, records relating to the nature of the procedures performed, and records relating to the results of applying such procedures. The decision rules specify how the assurance report components are assembled. Assembly may be based on the choices made by the stakeholder-user in selecting the attributes of the outcome display they wish to review, the results of the automated assurance procedures performed by the client system, as noted above, the results of the manual assurance procedures previously undertaken by the assurance provider, the results of the parallel automated assurance procedures performed by the parallel system running on assurance provider's computer network, as noted above, as well as other alternatives.

Once the assurance report has been compiled it may be linked with the outcome display by means of a hyperlink feature (Step 1105), or other similar associating principle. This aids to ensure that the assurance report is provided independently to the stakeholder-user, and that there is no opportunity of alteration of the assurance report by the client.

Provided a stakeholder-user continues to view a particular outcome display on which the stakeholder-user has requested an assurance report, the above procedures may continue to be performed on an iterative basis (Step 1106) to ensure that the assurance report is updated to reflect the results of additional events as they occur.

Figure 30A:
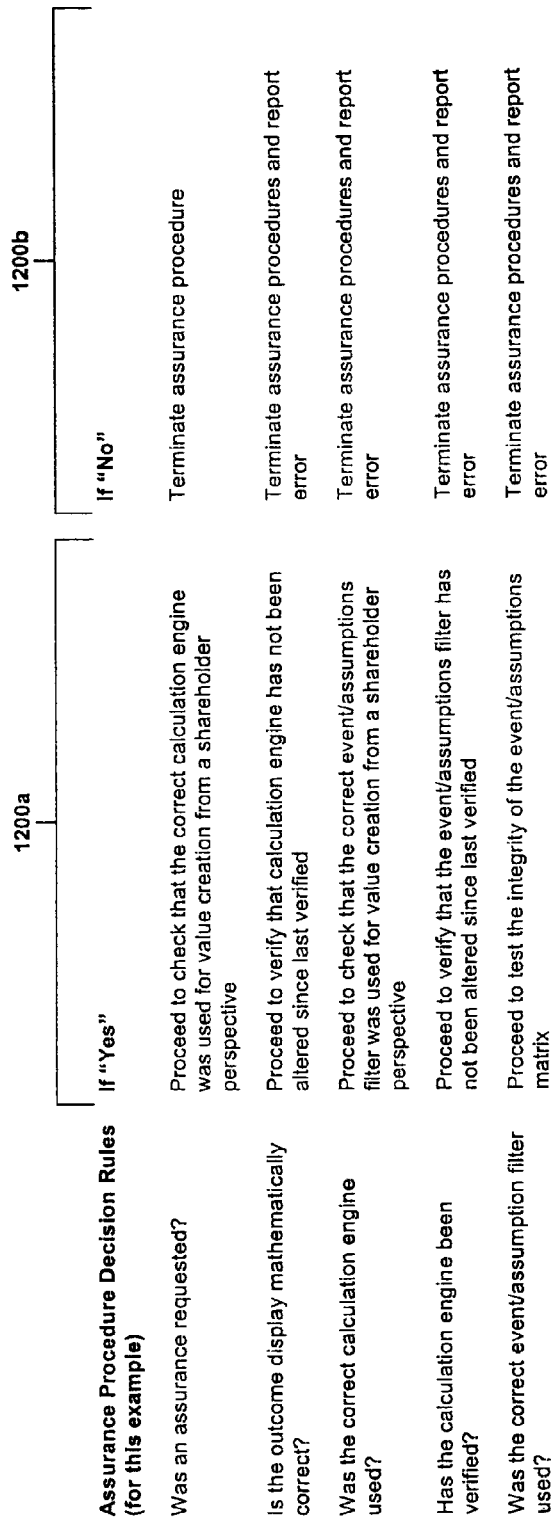
FIGS. 30A and 30B illustrate an exemplary representation of assurance procedure decision rules that may be used by the system to generate a customized assurance report.
Figure 30B:
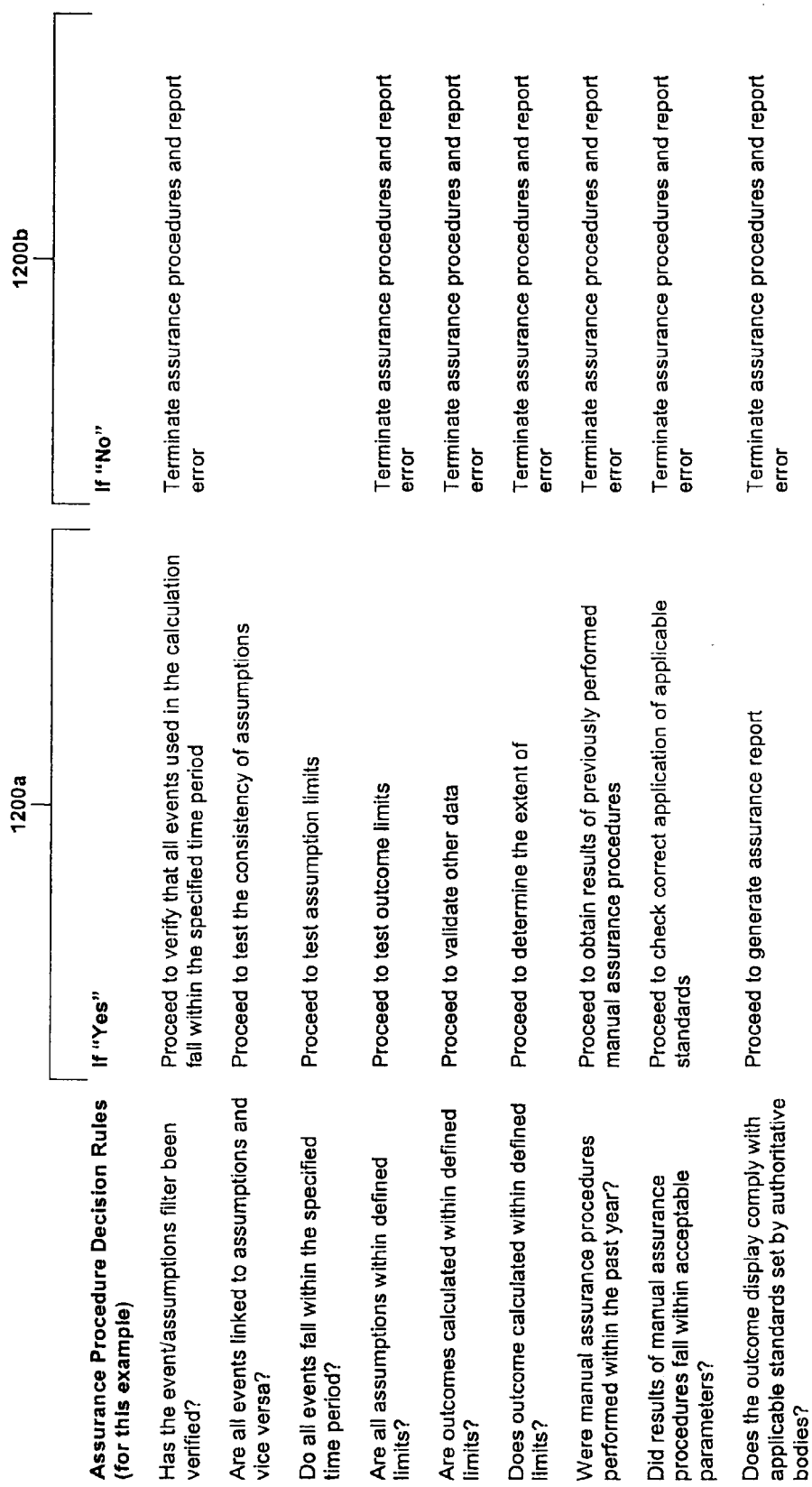

To more clearly illustrate the decision rules described above, assume that a stakeholder-user makes the following outcome display selections to view a particular value creation outcome display, for example, using the interface described above with reference to FIG. 28. Assume the stakeholder-user selects a value stream model, electing to view value stream A, from a shareholder's perspective, using performance tracking view for the past year, in accordance with management's official assumptions, at maximum detail, and requests an assurance report. FIGS. 30A and 30B illustrate exemplary assurance procedure decision rules that may be used to generate the assurance report for this example. Each decision rule may be associated with a first procedure (column 1200a) to be performed if the rule is satisfied, and a second procedure (column 1200b) to be performed if the rule is not satisfied. In accordance with these exemplary procedures, an assurance report can be generated for the outcome display being viewed providing a detailed analysis of the assurance procedure decision rules and indicating where assurance faults can be found in the generation of the outcome display information. The provided index of decision rules is complete enough to provide for all possible combinations of choices that a user might make in selecting an outcome display. Accordingly, the entire set of decision rules are available for assurance report processing; however, generally only those rules that are relevant to the particular outcome display are used by the system to generate the assurance report. This rule list is not exhaustive, and may be updated accordingly to include new rules or to change existing rules. FIGS. 31A, 31B, and 31C illustrate exemplary assurance report components that may be presented in an assurance report requested by a stakeholder-user. The reporting components 1202 may depend on the results of the analysis performed using the assurance procedure decision rules described above. Accordingly, a stakeholder-user can receive an assurance report relating to the outcome display being viewed so as to more readily rely on the displayed data as being accurate assessments of value creation and/or value realization.

Figure 32:
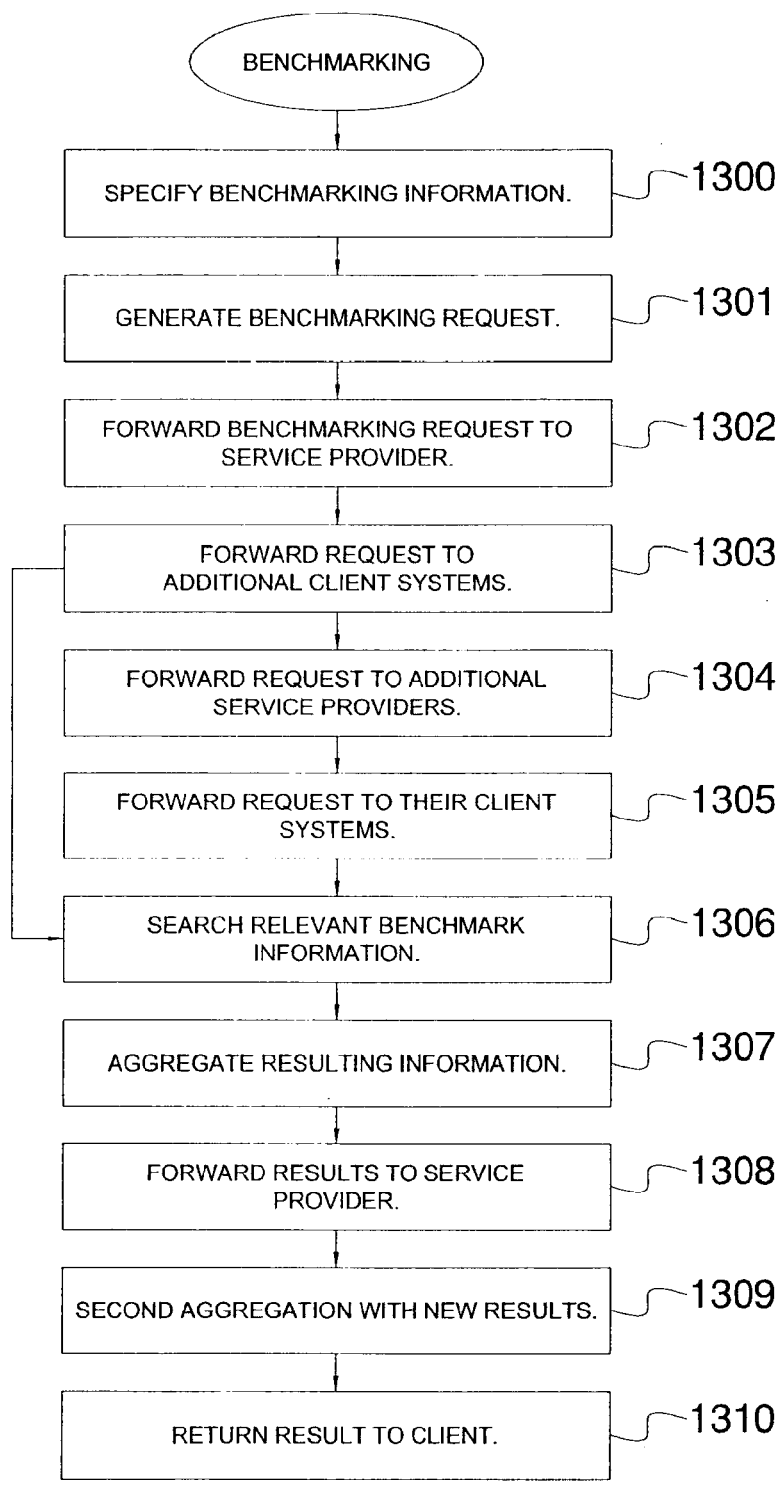
FIG. 32 is a flow chart illustrating a method for providing real-time benchmarking information relating to the performance of a business entity in accordance with the invention.

FIG. 32 is a flowchart illustrating a method for obtaining benchmarking information in real-time through a network of benchmarking service providers. As an example, referring to FIG. 32, Client A wishes to obtain benchmarking information. The invention enables an authorized individual (Client A) to specify the information it wishes to benchmark (Step 1300). Exemplary information may include key assumptions in its value creation model that it wishes to compare with assumptions used by other companies, value creation or value realization outcomes in a defined area of its business operations compared with outcomes obtained by competitors with similar operations, value creation capacity compared with value creation capacity in other companies, and value created or realized for specific stakeholders compared with value created for similar stakeholders in comparable companies, or any other aspect of enterprise performance.

Based on the choices made by the authorized individual at Client A, an electronic benchmarking request may be generated by the system (Step 1301) and forwarded to a designated benchmarking service provider (Step 1302).

Upon receipt of the client request, specialized software at the benchmarking service provider may automatically forward a request for relevant benchmarking information to all of its clients who subscribe to the benchmarking service (Step 1303). Additionally, upon receipt of the client request, specialized software at the benchmarking service provider may automatically forward a request for relevant benchmarking information to all other benchmarking service providers in the network (Step 1304). Upon receipt of the request from the requesting benchmarking service provider, specialized software at the other benchmarking service providers automatically forwards a request for relevant benchmarking information to all of their clients who subscribe to the benchmarking service (Step 1305). Accordingly, a client wishing to obtain benchmarking information is able to obtain comparative information from a larger number of comparable companies than is served by a single benchmarking service provider.

Upon receipt of a request from a benchmarking service provider for benchmarking information, a client system may automatically perform a search for relevant comparable information and automatically electronically forward this information to the requesting benchmarking service provider (Step 1306). Upon receiving the comparable information from one or more clients, the target benchmarking service provider(s) may automatically aggregate the comparable information received from one or more clients (Step 1307). The provider(s) may then electronically forward the aggregated information to the requesting benchmarking service provider (Step 1308).

Upon receiving the aggregated benchmarking information from the target benchmarking service providers, the requesting benchmarking service provider aggregates the aggregated information received with that received from its own clients (Step 1309) and forwards the resulting benchmarking information to Client A (Step 1310). The above process may be iteratively performed if a client wishes to access continually updated benchmarking information.

Alternatively, benchmarking service providers may agree to continuously pool and aggregate commonly requested benchmarking information in order to speed the response time of the system to client requests. Where the client request is for information that has been aggregated in this way, the request may be fulfilled from the continuously aggregated information.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computer implemented method for providing real-time benchmarking information relating to the performance of a business enterprise, comprising:
developing and storing in a memory device a data structure including information related to the performance of a business enterprise;
initiating a request, to a computer implemented benchmarking system, for benchmarking information including one or more benchmarking service providers, each of the benchmarking service providers having one or more associated clients, the benchmarking service providers relaying the request for benchmarking information to their clients, wherein the initiating step further comprises initiating a request for benchmarking information to a first benchmarking service provider, and relaying that request to the one or more additional benchmarking service providers in the benchmarking network;
responding, by the computer implemented benchmarking system, to the request for benchmarking information by providing relevant benchmarking information to the associated benchmarking service providers;
aggregating, by the computer implemented benchmarking system, the received benchmarking information to yield composite benchmark information relating to the performance of the business entity, wherein the aggregating step further comprises firstly aggregating by each of the associated benchmarking service providers the relevant benchmarking information from each of the responding client systems, providing the aggregated benchmarking information to the first benchmarking service provider, and secondly aggregating the aggregated benchmarking information with the relevant benchmarking information provided to the first benchmarking service provider from its client systems; and
wherein for each notified client, the responding step further comprises searching for relevant benchmarking information from associated data structures and providing the relevant benchmarking information to the associated benchmarking service providers.

2. The method of claim 1, wherein the data structure includes information relating to the value creation performance of a business enterprise.

3. The method of claim 1, wherein the data structure includes information relating to a value realization performance of a business enterprise.

4. The method of claim 1, wherein the data structure includes information relating to the performance of a business enterprise as measured by generally accepted alternative performance reporting formats.

5. The method of claim 1, wherein the data structure includes a plurality of future and past events and related assumptions.

6. The method of claim 5, wherein the benchmarking request is repeatedly generated based on the occurrence of one or more events.

7. The method of claim 1, further comprising providing a composite benchmarking information to a requesting client system.

8. The method of claim 1, wherein the benchmarking information relates to value creation performance.

9. The method of claim 1, wherein the benchmarking information relates to value realization performance.

10. The method of claim 1, wherein the benchmarking information is continuously pooled and updated and wherein the response to the request includes providing relevant benchmarking information from the continuously pooled information.

\* \* \* \* \*